United States Patent
Ishikawa et al.

(10) Patent No.: US 10,497,979 B2
(45) Date of Patent: Dec. 3, 2019

(54) POWER STORAGE DEVICE AND ELECTRONIC DEVICE

(71) Applicant: SEMICONDUCTOR ENERGY LABORATORY CO., LTD., Atsugi-shi, Kanagawa-ken (JP)

(72) Inventors: Jun Ishikawa, Kanagawa (JP); Kazuhei Narita, Kanagawa (JP); Teppei Oguni, Kanagawa (JP); Aya Uchida, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 44 days.

(21) Appl. No.: 15/513,499

(22) PCT Filed: Sep. 30, 2015

(86) PCT No.: PCT/IB2015/057470
§ 371 (c)(1),
(2) Date: Mar. 22, 2017

(87) PCT Pub. No.: WO2016/055908
PCT Pub. Date: Apr. 14, 2016

(65) Prior Publication Data
US 2018/0233780 A1    Aug. 16, 2018

(30) Foreign Application Priority Data

Oct. 10, 2014 (JP) .................. 2014-209116
Nov. 4, 2014 (JP) .................. 2014-224466
Dec. 1, 2014 (JP) .................. 2014-242776

(51) Int. Cl.
*H01G 11/06* (2013.01)
*H01M 10/05* (2010.01)
(Continued)

(52) U.S. Cl.
CPC ........ *H01M 10/0569* (2013.01); *H01G 11/06* (2013.01); *H01G 11/26* (2013.01);
(Continued)

(58) Field of Classification Search
None
See application file for complete search history.

(56) References Cited

U.S. PATENT DOCUMENTS

| 8,349,503 B2 | 1/2013 | Saruwatari et al. |
| 9,236,606 B2 | 1/2016 | Tadano |

(Continued)

FOREIGN PATENT DOCUMENTS

| CN | 001835272 A | 9/2006 |
| CN | 101604746 A | 12/2009 |

(Continued)

OTHER PUBLICATIONS

International Search Report (Application No. PCT/IB2015/057470) dated Jan. 12, 2016.

(Continued)

*Primary Examiner* — Scott J. Chmielecki
(74) *Attorney, Agent, or Firm* — Nixon Peabody LLP; Jeffrey L. Costellia

(57) ABSTRACT

A power storage device with high capacity is provided. Alternatively, a power storage device with high energy density is provided. Alternatively, a highly reliable power storage device is provided. Alternatively, a long-life power storage device is provided.

A power storage device is characterized by comprising a separator, a first electrode, a second electrode, an electrolytic solution, in which the separator is provided between the first electrode and the second electrode, the first electrode includes an active material layer and a current collector, the first electrode includes a pair of coating films between which (Continued)

the current collector is sandwiched, the active material layer includes a region in contact with the current collector, the active material layer includes a region in contact with at least one of the pair of coating films, and the electrolytic solution includes an alkali metal salt and an ionic liquid.

28 Claims, 40 Drawing Sheets

(51) Int. Cl.

| | |
|---|---|
| H01M 10/0569 | (2010.01) |
| H01G 11/26 | (2013.01) |
| H01G 11/62 | (2013.01) |
| H01M 10/058 | (2010.01) |
| H01G 11/60 | (2013.01) |
| H01G 11/64 | (2013.01) |
| H01M 2/14 | (2006.01) |
| H01M 4/134 | (2010.01) |
| H01M 4/66 | (2006.01) |
| H01M 10/0525 | (2010.01) |
| H01M 10/0567 | (2010.01) |
| H01M 4/36 | (2006.01) |
| H01M 6/16 | (2006.01) |
| H01M 4/133 | (2010.01) |
| H01M 4/02 | (2006.01) |
| H01M 4/136 | (2010.01) |
| H01M 4/58 | (2010.01) |

(52) U.S. Cl.
CPC ............ *H01G 11/60* (2013.01); *H01G 11/62* (2013.01); *H01G 11/64* (2013.01); *H01M 2/14* (2013.01); *H01M 4/134* (2013.01); *H01M 4/366* (2013.01); *H01M 4/662* (2013.01); *H01M 4/663* (2013.01); *H01M 10/058* (2013.01); *H01M 10/0525* (2013.01); *H01M 10/0567* (2013.01); *H01M 4/133* (2013.01); *H01M 4/136* (2013.01); *H01M 4/5825* (2013.01); *H01M 6/16* (2013.01); *H01M 2004/027* (2013.01); *H01M 2004/028* (2013.01); *H01M 2300/0045* (2013.01); *Y02E 60/13* (2013.01); *Y02T 10/7011* (2013.01)

(56) References Cited

U.S. PATENT DOCUMENTS

| | | |
|---|---|---|
| 9,461,302 B2 | 10/2016 | Park et al. |
| 10,020,478 B2 | 7/2018 | Tadano |
| 2006/0204855 A1 | 9/2006 | Saruwatari et al. |
| 2007/0099079 A1 | 5/2007 | Matsumoto et al. |
| 2009/0311598 A1* | 12/2009 | Tadano ................ H01M 4/13 429/215 |
| 2010/0035158 A1* | 2/2010 | Kato ................ C08F 293/005 429/314 |
| 2011/0014518 A1* | 1/2011 | Nakai .................... B22F 7/06 429/207 |
| 2013/0164609 A1 | 6/2013 | Ito et al. |
| 2013/0164610 A1 | 6/2013 | Itakura et al. |
| 2013/0244094 A1 | 9/2013 | Giroud et al. |
| 2013/0288112 A1 | 10/2013 | Ito et al. |
| 2014/0099529 A1 | 4/2014 | Ishikawa et al. |
| 2014/0099558 A1 | 4/2014 | Itakura et al. |
| 2014/0377644 A1 | 12/2014 | Ishikawaj et al. |
| 2015/0279577 A1* | 10/2015 | Uchida ............ H01M 10/0569 429/336 |
| 2016/0104877 A1 | 4/2016 | Tadano |
| 2016/0380320 A1 | 12/2016 | Park et al. |

FOREIGN PATENT DOCUMENTS

| | | |
|---|---|---|
| JP | 2003-331918 A | 11/2003 |
| JP | 2003-331918 A | 11/2003 |
| JP | 2006-253081 A | 9/2006 |
| JP | 2009-301765 A | 12/2009 |
| JP | 2011-003313 A | 1/2011 |
| JP | 2013-152875 A | 8/2013 |
| JP | 2013-197061 A | 9/2013 |
| JP | 2013-541820 | 11/2013 |
| JP | 2014-160656 A | 9/2014 |
| WO | WO-2005/063773 | 7/2005 |
| WO | WO-2012/165483 | 12/2012 |

OTHER PUBLICATIONS

Written Opinion (Application No. PCT/IB2015/057470) dated Jan. 12, 2016.
Chinese Office Action (Application No. 201580053100.3) dated Nov. 21, 2018.

* cited by examiner

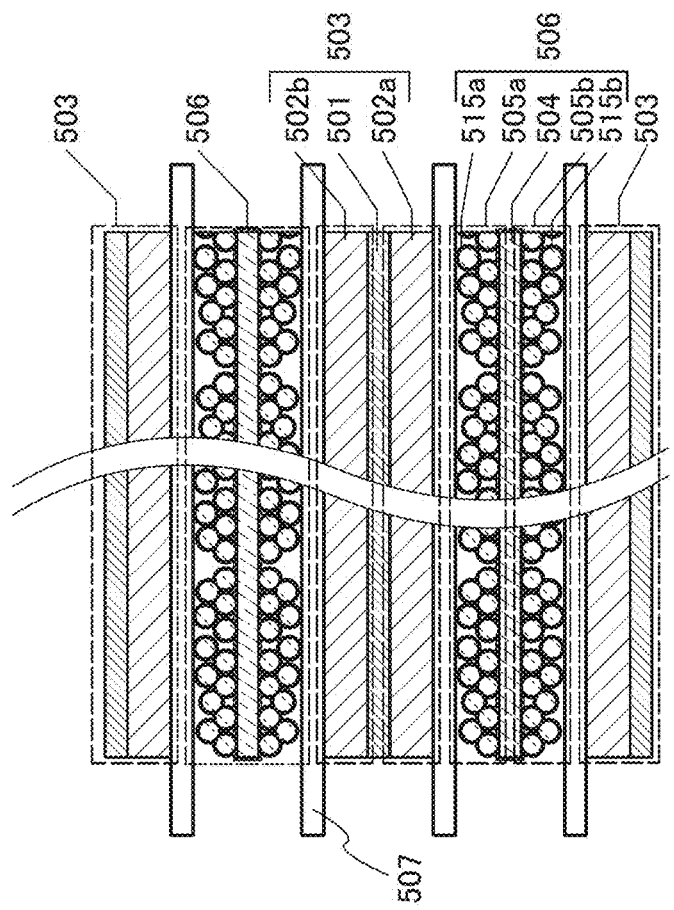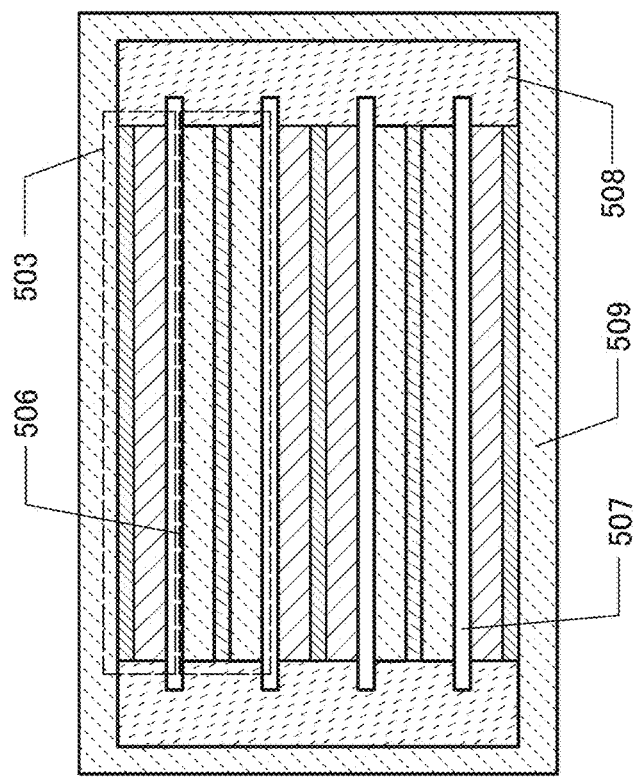

FIG. 3A
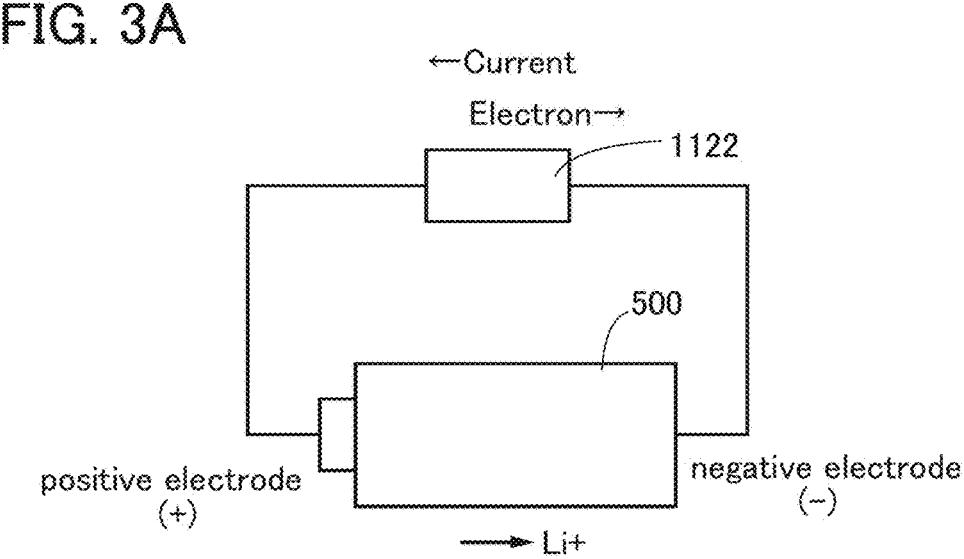
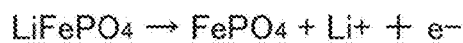
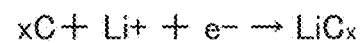
LiFePO$_4$ → FePO$_4$ + Li+ + e−  xC + Li+ + e− → LiC$_x$
x ≧ 6
FIG. 3B
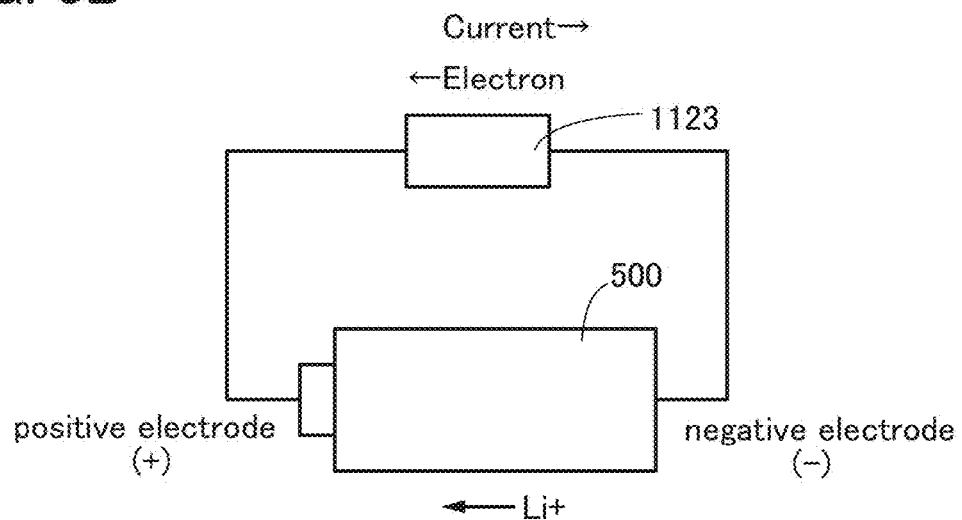
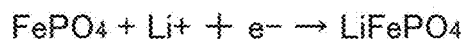
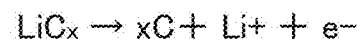
FePO$_4$ + Li+ + e− → LiFePO$_4$  LiC$_x$ → xC + Li+ + e−
x ≧ 6

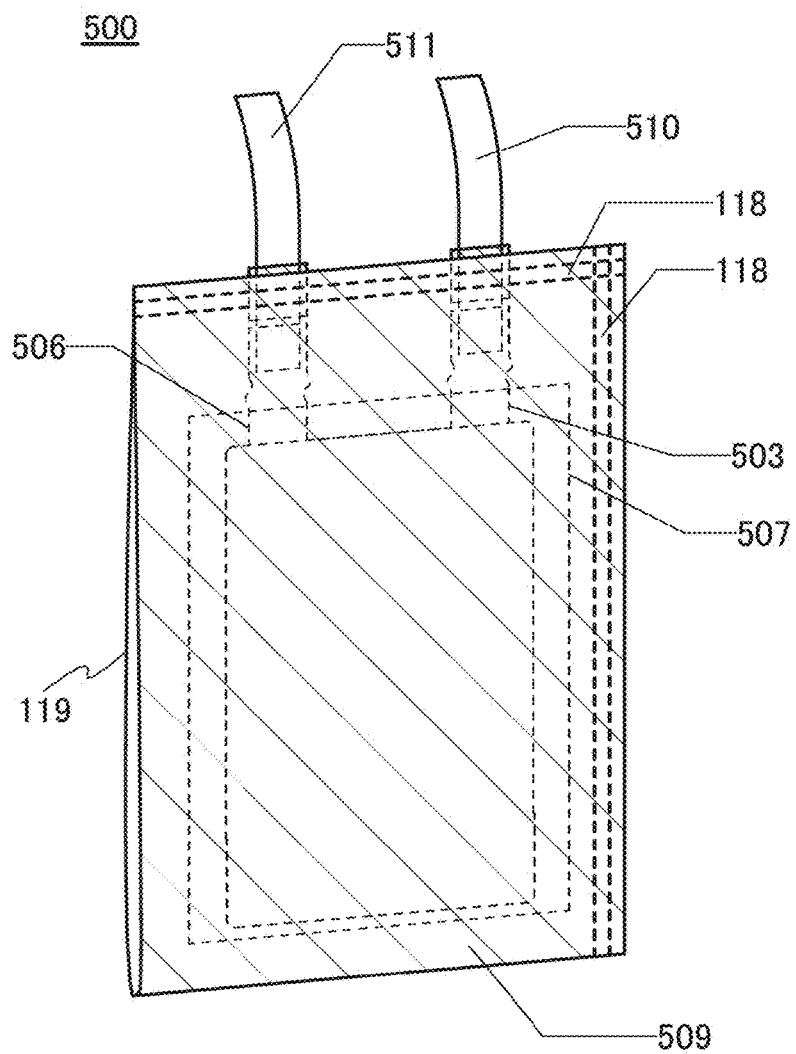

POWER STORAGE DEVICE AND ELECTRONIC DEVICE

TECHNICAL FIELD

One embodiment of the present invention relates to, for example, an object, a method, or a manufacturing method. Alternatively, one embodiment of the present invention relates to a process, a machine, manufacture, or a composition of matter (composition of matter). In particular, one embodiment of the present invention relates to a semiconductor device, a display device, a light-emitting device, a power storage device, a storage device, a driving method thereof, or a manufacturing method thereof. In particular, one embodiment of the present invention relates to a power storage device and a manufacturing method thereof.

Note that a power storage device in this specification refers to every element and/or device having a function of storing electric power. For example, a storage battery such as a lithium-ion secondary battery, a lithium-ion capacitor, an electric double layer capacitor, and the like are included.

BACKGROUND ART

In recent years, a variety of power storage devices, for example, secondary batteries such as lithium-ion secondary batteries, lithium-ion capacitors, and air cells have been actively developed. In particular, demand for lithium-ion secondary batteries with high output and high energy density has rapidly grown with the development of the semiconductor industry, for electronic devices, for example, portable information terminals such as mobile phones, smartphones, and laptop personal computers, portable music players, and digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

Furthermore, for the power storage devices, high capacity, high performance, safety in various operating environments, and the like are required.

To satisfy the above requirements, electrolytic solutions for power storage devices are under active development. Organic solvents used in electrolytic solutions for power storage devices include cyclic carbonates, and among them, ethylene carbonate is often used because of its high dielectric constant and high ionic conductivity.

However, not only ethylene carbonate but also many organic solvents have volatility and a low flash point. For this reason, in the case of using an organic solvent for an electrolytic solution for a power storage device, the temperature inside the power storage device might rise due to a short circuit, overcharge, or the like and the power storage device might burst or catch fire.

In view of the above, the use of an ionic liquid (also referred to as a room temperature molten salt) having non-flammability and non-volatility as a nonaqueous solvent for a nonaqueous electrolyte of a lithium-ion secondary battery has been considered. For example, an ionic liquid containing an ethylmethylimidazolium (EMI) cation, an ionic liquid containing an N-methyl-N-propylpyrrolidinium (P13) cation, an ionic liquid containing an N-methyl-N-propylpiperidinium (PP13) cation, and the like are given (see Patent Document 1).

Furthermore, a lithium-ion secondary battery is disclosed that uses an ionic liquid whose anion component and cation component are improved to achieve low viscosity, a low melting point, and high conductivity (see Patent Document 2).

PRIOR ART DOCUMENT

Patent Document

[Patent Document 1] Japanese Published Patent Application No. 2003-331918
[Patent Document 2] PCT International Publication No. WO2005/63773

SUMMARY OF THE INVENTION

Problems to be Solved by the Invention

A problem of one embodiment of the present invention is to provide a power storage device with high capacity. Another problem of one embodiment of the present invention is to provide a power storage device with high energy density. Another problem of one embodiment of the present invention is to provide a highly reliable power storage device. Another problem of one embodiment of the present invention is to provide a long-life power storage device.

Another problem of one embodiment of the present invention is to provide a power storage device with reduced irreversible capacity. Another problem of one embodiment of the present invention is to provide a power storage device in which the decomposition reaction of an electrolytic solution is inhibited and a decrease in capacity with charge and discharge cycles is prevented. Another problem of one embodiment of the present invention is to reduce or inhibit the decomposition reaction of an electrolytic solution, which speeds up at high temperature, and prevent a decrease in charge and discharge capacity by charge and discharge at high temperature, in order to extend the operating temperature range of a power storage device.

Another problem of one embodiment of the present invention is to increase productivity of a power storage device. Another problem of one embodiment of the present invention is to provide a novel power storage device, a novel electrode, or the like.

Note that the description of these problems does not disturb the existence of other problems. In one embodiment of the present invention, there is no need to solve all the problems. Other problems will be apparent from and can be derived from the description of the specification, the drawings, the claims, and the like.

Means for Solving the Problems

One embodiment of the present invention is a power storage device characterized by comprising a separator, a first electrode, a second electrode, an electrolytic solution, wherein the separator is provided between the first electrode and the second electrode, the first electrode includes an active material layer and a current collector, the first electrode includes a pair of coating films between which the current collector is sandwiched, the active material layer includes a region in contact with the current collector, the active material layer includes a region in contact with at least one of the pair of coating films, and the electrolytic solution includes an alkali metal salt and an ionic liquid.

Another embodiment of the present invention is a power storage device characterized by comprising a separator, a first electrode, a second electrode, an electrolytic solution, wherein the separator is provided between the first electrode and the second electrode, the first electrode includes an active material layer and a current collector, the first electrode includes a pair of coating films between which the current collector is sandwiched, the active material layer includes a region in contact with the current collector, the active material layer includes a region in contact with at least one of the pair of coating films, the electrolytic solution includes an alkali metal salt and an ionic liquid, the second electrode overlaps with the first electrode, and an end portion of the first electrode is aligned with or located inward from an end portion of the second electrode.

Furthermore, in the above structure, the pair of coating films includes at least one of an element included in the active material layer and an element included in the electrolytic solution.

Furthermore, another embodiment of the present invention is a power storage device characterized by comprising a positive electrode, a separator, a negative electrode, and an electrolytic solution, wherein the separator is provided between the positive electrode and the negative electrode, the positive electrode includes a positive electrode active material layer and a positive electrode current collector, the negative electrode includes a negative electrode current collector, a first negative electrode active material layer facing the positive electrode active material layer with the separator sandwiched therebetween, a second negative electrode active material layer facing the first negative electrode active material layer with the negative electrode current collector sandwiched therebetween, a first coating film in contact with the first negative electrode active material layer, and a second coating film in contact with the second negative electrode active material layer, and the electrolytic solution includes an alkali metal salt and an ionic liquid.

Furthermore, another embodiment of the present invention is a power storage device characterized by comprising a positive electrode, a separator, a negative electrode, and an electrolytic solution, wherein the separator is provided between the positive electrode and the negative electrode, the positive electrode includes a positive electrode active material layer and a positive electrode current collector, the negative electrode includes a negative electrode current collector, a first negative electrode active material layer facing the positive electrode active material layer with the separator sandwiched therebetween, a second negative electrode active material layer facing the first negative electrode active material layer with the negative electrode current collector sandwiched therebetween, a first coating film in contact with the first negative electrode active material layer, and a second coating film in contact with the second negative electrode active material layer, the electrolytic solution includes an alkali metal salt and an ionic liquid, the positive electrode overlaps with the negative electrode, and an end portion of the negative electrode is aligned with or located inward from an end portion of the positive electrode.

Furthermore, in the above structure, the first coating film includes at least one of an element included in the first negative electrode active material layer and an element included in the electrolytic solution, and the second coating film includes at least one of an element included in the second negative electrode active material layer and an element included in the electrolytic solution.

Furthermore, in the above structure, the ionic liquid includes a cation containing a heteroaromatic ring.

Furthermore, in the above structure, the ionic liquid includes an imidazolium cation.

Furthermore, in the above structure, the ionic liquid includes a butylmethylimidazolium cation.

Furthermore, in the above structure, the operating temperature range is at least one of −25° C. to 10° C. and 40° C. to 100° C.

Furthermore, another embodiment of the present invention is an electronic device on which any one of the above-described power storage devices is mounted.

Effect of the Invention

Furthermore, one embodiment of the present invention can provide a power storage device with high capacity. Furthermore, one embodiment of the present invention can provide a power storage device with high energy density. Furthermore, one embodiment of the present invention can provide a highly reliable power storage device. Furthermore, one embodiment of the present invention can provide a power storage device with a long lifetime.

Furthermore, one embodiment of the present invention can provide a power storage device with reduced irreversible capacity. Furthermore, one embodiment of the present invention can provide a power storage device in which a decomposition reaction of an electrolytic solution is inhibited and a decrease in capacity with charge and discharge cycles is prevented. Furthermore, one embodiment of the present invention makes it possible to reduce or inhibit the decomposition reaction of an electrolytic solution, which speeds up at high temperature, and to prevent a decrease in charge and discharge capacity in charge and discharge at high temperature, in order to extend the operating temperature range of a power storage device.

Furthermore, one embodiment of the present invention can increase a yield of a power storage device. Furthermore, one embodiment of the present invention can provide a novel power storage device, a novel electrode, or the like.

Note that the description of these effects does not disturb the existence of other effects. Note that one embodiment of the present invention does not necessarily have all the effects. Note that other effects will be apparent from and can be derived from the description of the specification, the drawings, the claims, and the like.

BRIEF DESCRIPTION OF THE DRAWINGS

[FIG. 3] A diagram illustrating operation of a power storage device.

[FIG. 10] A diagram showing a method for fabricating a thin storage battery.

[FIG. 19] A diagram illustrating an example of a power storage system.

MODE FOR CARRYING OUT THE INVENTION

Figure 1:
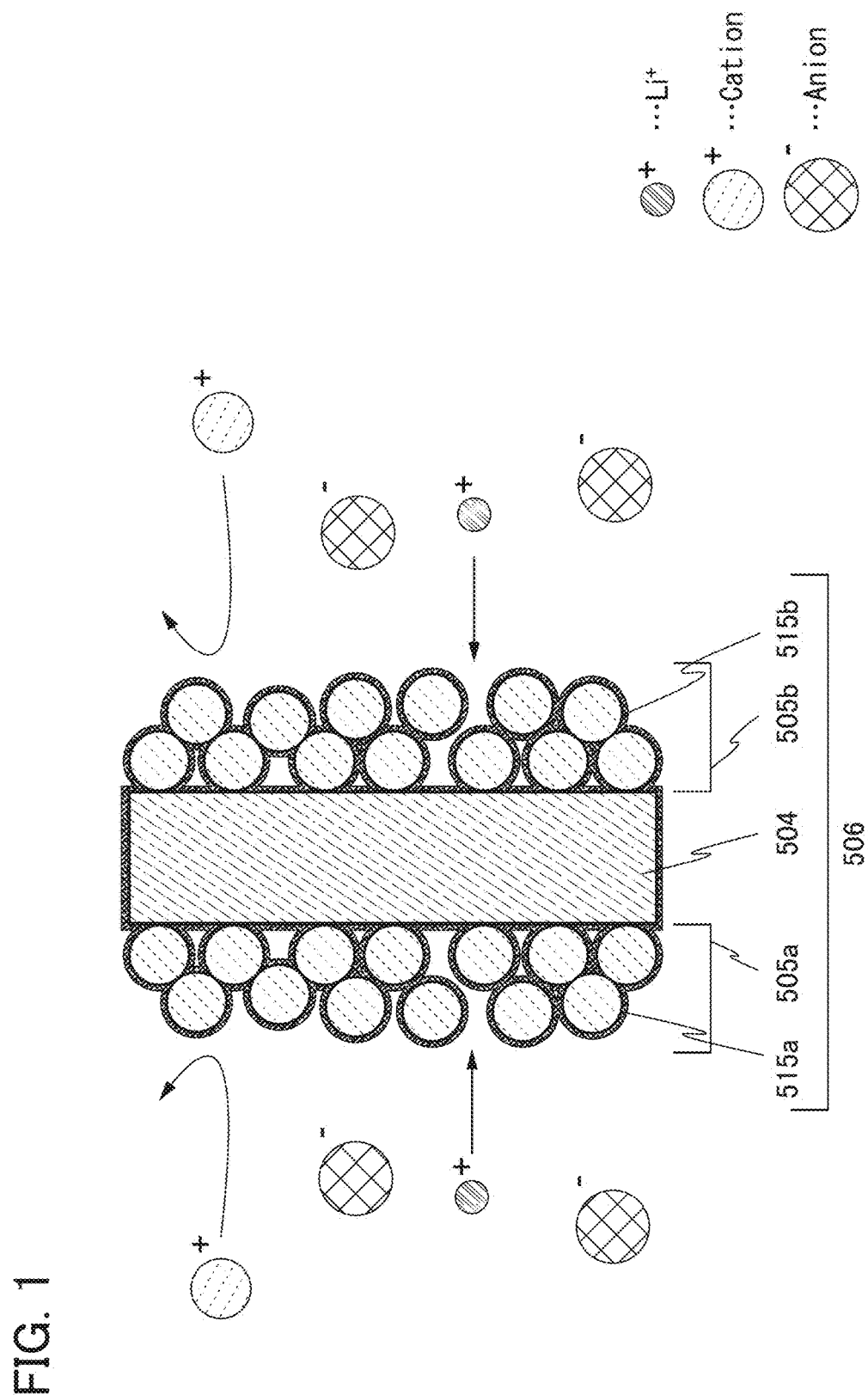
[FIG. 1] A cross-sectional view of a negative electrode of a power storage device and a diagram illustrating a reaction that occurs between the negative electrode and an electrolytic solution.

Embodiments of the present invention are described in detail with reference to the drawings. However, the present invention is not limited to the description of them and it is easily understood by those skilled in the art that the mode and details can be changed variously. Accordingly, the present invention should not be interpreted as being limited to the description of the embodiments below.

Note that in drawings used in this specification, the sizes, thicknesses, and the like of components such as films, layers, substrates, and regions are exaggerated for clarity of the description in some cases. Therefore, the sizes of the components are not necessarily limited to the sizes therein and relative sizes between the components.

Note that the ordinal numbers such as "first" and "second" in this specification and the like are used for convenience and do not denote the order of steps, the stacking order of layers, or the like. Therefore, for example, description can be made even when "first" is replaced with "second" or "third", as appropriate. In addition, the ordinal numbers described in this specification and the like are not necessarily the same as those used to specify one embodiment of the present invention.

Note that in structures of the present invention described in this specification and the like, the same portions or portions having similar functions are denoted by common reference numerals in different drawings, and repeated descriptions thereof are omitted. Further, the same hatching pattern is applied to portions having similar functions, and the portions are not particularly denoted by reference numerals in some cases.

Note that in this specification and the like, a positive electrode and a negative electrode for a power storage device may be collectively referred to as an electrode; in this case, the electrode refers to at least one of the positive electrode and the negative electrode.

Note that in this specification and the like, drying refers to making a dried state by volatilizing or evaporating water or a solvent other than water so that it is removed or being in a dried state.

Here, a charge rate and a discharge rate are described. For example, in the case of charging a secondary battery with a certain capacity X [Ah] at a constant current, a charge rate 1 C means the current value I [A] with which charge is terminated in exactly 1 h, and for example, a charge rate 0.2 C means I/5 [A] (i.e., the current value with which charge is terminated in exactly 5 h). Similarly, a discharge rate 1 C means the current value I [A] with which discharge is ended in exactly 1 h, and a discharge rate 0.2 C means I/5 [A] (i.e., the current value with which discharge is ended in exactly 5 h).

Here, an active material refers only to a material that relates to insertion and extraction of ions that are carriers. In this specification and the like, a conductive additive, a binder, and the like as well as a material that is actually an "active material" are collectively referred to as an active material layer.

Embodiment 1

In this embodiment, an example of the structure of a power storage device of one embodiment of the present invention is described.

[Structure of Power Storage Device]

Here, an example of the power storage device of one embodiment of the present invention is described using a drawing. First, a reaction that occurs between a negative electrode and an electrolytic solution of the power storage device is described using FIG. 1. A negative electrode 506 illustrated in FIG. 1 includes a negative electrode current collector 504 and a negative electrode active material layer 505*a* and a negative electrode active material layer 505*b* that face each other with the negative electrode current collector 504 therebetween. Furthermore, a coating film 515*a* in contact with the negative electrode active material layer 505a and a coating film 515b in contact with the negative electrode active material layer 505b are included.

Note that "coating film" in one embodiment of the present invention is clearly distinguished from a film that is artificially provided before a power storage device is charged or discharged, and is a film formed in the decomposition reaction between an electrolytic solution and an active material layer. The coating film is formed by a battery reaction described later and serves as a passivating film, in some cases. This coating film may allow inhibition of a further decomposition reaction of ions other than lithium ions by charge or discharge, so that a decrease in the capacity of the power storage device may be able to be inhibited. Note that the coating film is formed on a surface of a negative electrode (a surface of a negative electrode active material layer) and thus can be regarded as part of the negative electrode active material layer; however, in the description in this specification and the like, the coating film and the negative electrode active material layer are distinguished from each other. Furthermore, the coating film is also formed on part of a surface of a negative electrode current collector in some cases.

Figures 1, 19A:
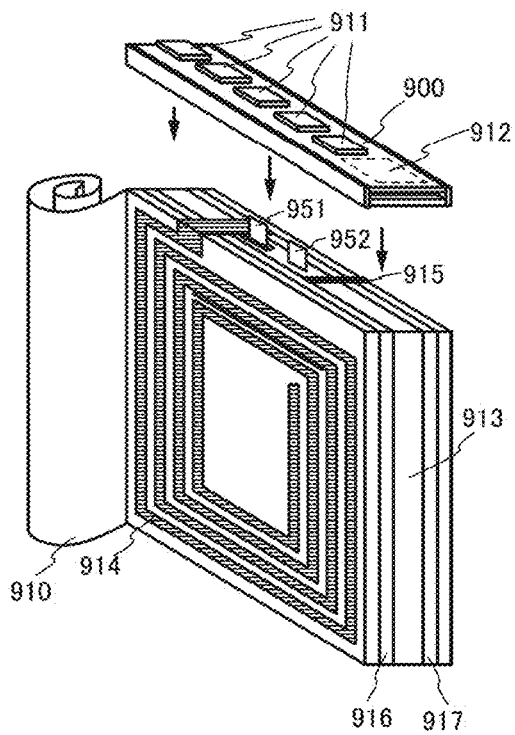
Figures 2, 19A:
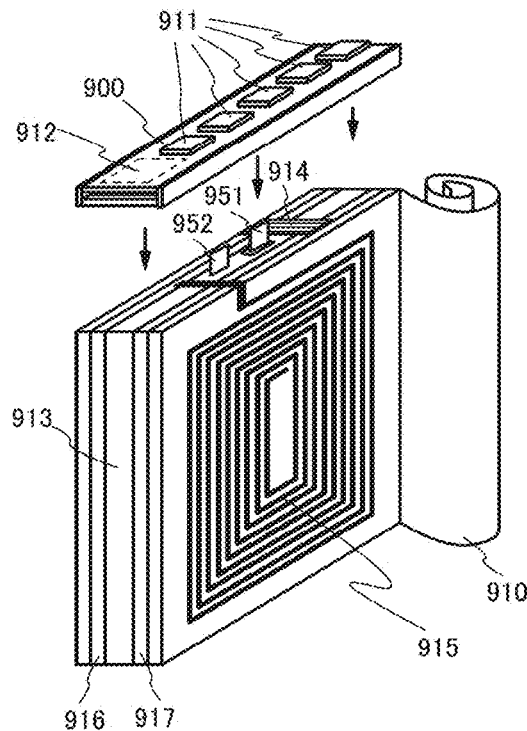
[FIG. 2] A cross-sectional view of a power storage device.
Figures 1, 19B:
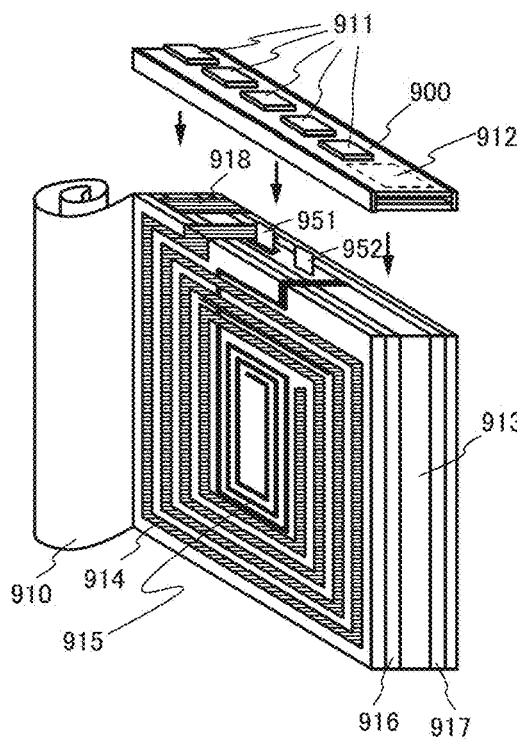
Figures 2, 19B:
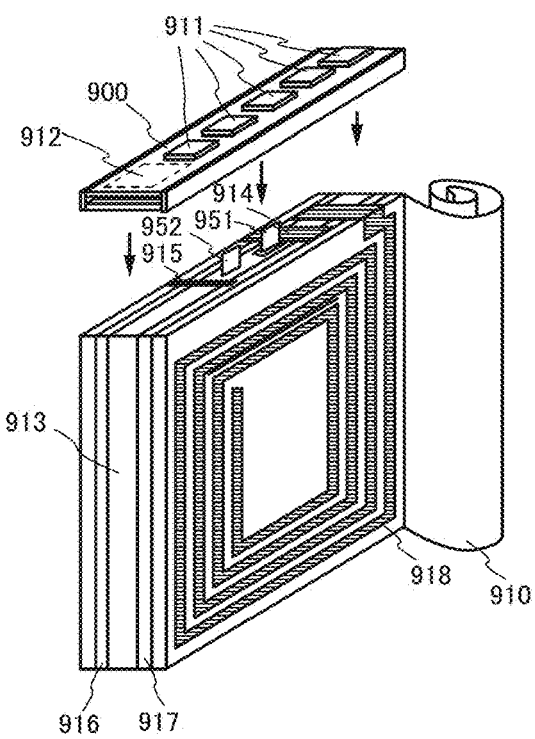

Furthermore, FIG. 2(A) illustrates a power storage device including the negative electrode 506 illustrated in FIG. 1, and FIG. 2(B) is an enlarged view of a positive electrode 503, the negative electrode 506, and a separator 507 that are included in the power storage device 500 illustrated in FIG. 2(A). The power storage device 500 includes the positive electrode 503, the negative electrode 506, the separator 507 sandwiched between the positive electrode 503 and the negative electrode 506, an electrolytic solution 508, and an exterior body 509. The inside of the exterior body 509 is filled with the electrolytic solution 508. Furthermore, the positive electrode 503 includes a positive electrode current collector 501, and a positive electrode active material layer 502a and a positive electrode active material layer 502b that face each other with the positive electrode current collector 501 sandwiched therebetween. Note that in the positive electrode active material layer 502a and the positive electrode active material layer 502b that are illustrated in FIG. 2(B), an active material is provided in contact with the positive electrode current collector 501 as in the negative electrode active material layer 505a and the negative electrode active material layer 505b; however, the positive electrode active material layer 502a and the positive electrode active material layer 502b are shown in the form of a layer for the sake of simplification of the drawing.

Here, the operation of the power storage device 500 is described. Here, the case where the power storage device 500 is a lithium-ion battery is described as an example. In addition, the lithium-ion battery using LiFePO$_4$ and graphite as a positive electrode active material and a negative electrode active material, respectively, is illustrated as an example; however, active materials used for the storage battery of one embodiment of the present invention are not limited thereto.

FIG. 3(A) illustrates a connection structure of the power storage device 500 and a charger 1122 when a lithium-ion secondary battery is charged. In the case where the power storage device 500 is a lithium-ion secondary battery, a reaction of Formula (1) occurs in the positive electrode in charging.

[Mathematical Formula 1]

$$LiFePO_4 \rightarrow FePO_4 + Li^+ + e^-  \qquad (1)$$

In addition, a reaction of Formula (2) below (see Li$^+$ in FIG. 1) occurs in the negative electrode in charging.

[Mathematical Formula 2]

$$xC + Li^+ + e^- \rightarrow LiC_x, x \geq 6 \qquad (2)$$

Here, for example, an electrolytic solution is decomposed at a surface of the electrode at a battery reaction potential in some cases. Such a decomposition reaction is an irreversible reaction in many cases and thus might lead to the loss of the capacity of the power storage device. Particularly in the negative electrode, the battery reaction potential is low, which easily causes the reductive decomposition of an electrolytic solution, easily reducing the capacity.

Here, the reactions in the negative electrode are described in more detail. The reaction expressed by Formula (2) is referred to as the first reaction.

On the other hand, a reaction other than the reaction Formula (2) that occurs in charging occurs in the negative electrode in some cases. For example, an electrolytic solution might be decomposed at the surface of the electrode. Furthermore, in the case of using an ionic liquid as a solvent of an electrolytic solution, cations, etc. of the ionic liquid might be inserted between layers of an active material. These reactions are irreversible in many cases. Such an irreversible reaction among the reactions other than the reaction of Formula (2) is referred to as the second reaction.

Since the second reaction is an irreversible reaction, when the second reaction occurs, the discharge capacity becomes lower than the charge capacity. Furthermore, the reaction between a negative electrode current collector and an electrolytic solution (the second reaction) dissolves the negative electrode current collector, and a component of the negative electrode current collector is deposited on a surface of a negative electrode active material layer, in some cases. Thus, a reduction in the capacity of a power storage device is caused. This is why the second reaction is preferably prevented as much as possible.

To inhibit the second reaction, in this embodiment of the present invention, a structure is employed in which a pair of negative electrode active material layers facing each other with a negative electrode current collector sandwiched therebetween as in FIG. 1 is provided. This reduces a region where the negative electrode current collector is in contact with an electrolytic solution, which allows the first reaction to occur appropriately while inhibiting the second reaction.

Furthermore, the second reaction might cause formation of a coating film on the surface of the negative electrode. The formed coating film serves as a passivating film in some cases. This passivating film may allow inhibition of a further decomposition reaction of ions other than lithium ions by charge or discharge. Accordingly, the coating film may be able to inhibit a decrease in the capacity of the power storage device.

In this embodiment, the structure is employed in which a pair of negative electrode active material layers facing each other with a negative electrode current collector sandwiched therebetween is provided and a coating film in contact with each of the negative electrode active material layers is included; however, without limitation to this, a structure may be employed in which a pair of coating films between which a negative electrode current collector is sandwiched is included and a negative electrode active material layer is provided between one of the pair of coating films and the negative electrode current collector.

Next, discharge is described. FIG. 3(B) illustrates a connection structure of the power storage device 500 and a charger 1123 when the lithium-ion secondary battery is discharged. A reaction of Formula (3) below occurs in the positive electrode in discharging.

[Mathematical Formula 3]

$$FePO_4 + Li^+ + e^- \rightarrow LiFePO_4 \qquad (3)$$

In addition, a reaction of Formula (4) occurs in the negative electrode in discharging.

[Mathematical Formula 4]

$$LiC_x \rightarrow xC + Li^+ + e^-\ x \geq 6 \qquad (4)$$

The case where an irreversible reaction such as the decomposition of an electrolytic solution occurs besides the reaction of (4) in the negative electrode is considered. In that case, the charge capacity in the next charge and discharge cycle might become lower than the discharge capacity. That is to say, when irreversible reactions repeatedly occur, the capacity might gradually decrease with the charge and discharge cycles.

Here, the second reaction that occurs in the case of using an ionic liquid as a solvent of an electrolytic solution is described in detail.

A cation (here, a cation of an ionic liquid) and an anion (here, an anion of an ionic liquid) in an electrolytic solution have charge as illustrated in FIG. 1 and thus can form an electric double layer at a surface of an electrode, for example, and use for a power storage device such as an electric double layer capacitor is possible.

However, a cation and an anion in an ionic liquid might be decomposed at a surface of an electrode. For example, in the case where one of the negative electrode active material layer 505a and the negative electrode active material layer 505b illustrated in FIG. 1 is not provided, one surface of the negative electrode current collector 504 is exposed to an electrolytic solution; thus, the electrolytic solution is decomposed, and a coating film including an element included in the negative electrode current collector 504 or an element included in the electrolytic solution is formed in some cases. Furthermore, the element included in the negative electrode current collector 504 dissolves in the electrolytic solution and is deposited on the negative electrode, in some cases. Most decomposition reactions are irreversible and accordingly might reduce the capacity of a power storage device.

Furthermore, a cation and an anion in an ionic liquid are inserted between layers of an intercalation compound typified by graphite and extracted after the insertion, in some cases.

These irreversible reactions are examples of the second reaction. The second reaction presumably occurs concurrently with the reactions of Formulas (1) to (4). It is preferable to create an environment where normal reactions in a battery operation, that is, the reactions of Formulas (1) to (4) occur more easily than the second reaction, in order to increase the capacity of a power storage device.

As in one embodiment of the present invention, a structure is employed in which a pair of negative electrode active material layers facing each other with a negative electrode current collector sandwiched therebetween is provided as in FIG. 1, whereby the area of an exposed region of a surface of the negative electrode current collector is reduced, and decomposition of the electrolytic solution can be inhibited. Moreover, dissolution of the negative electrode current collector can be inhibited.

Here, the relation between the positive electrode 503 and the negative electrode 506 of the power storage device 500 in terms of the sizes and positions is described. The areas of the positive electrode and the negative electrode in the power storage device 500 are preferably substantially equal. For example, the areas of the positive electrode and the negative electrode that face each other with the separator therebetween are preferably substantially equal. For example, the areas of the positive electrode active material layer and the negative electrode active material layer that face each other with the separator therebetween are preferably substantially equal.

For example, in FIG. 2(B), the area of a surface of the positive electrode 503 on the separator 507 side is preferably substantially equal to the area of a surface of the negative electrode 506 on the separator 507 side. The area of a surface of the positive electrode 503 on the negative electrode 506 side is preferably substantially equal to the area of a surface of the negative electrode 506 on the positive electrode 503 side because the region where the negative electrode does not overlap with the positive electrode can be small (eliminated, ideally) and the power storage device can have reduced irreversible capacity. Alternatively, in FIG. 2(B), the area of the surface of the positive electrode active material layer 502a on the separator 507 side is preferably substantially equal to the area of the surface of the negative electrode active material layer 505a on the separator 507 side.

Here, the case where, for example, the positive electrode and the negative electrode include terminal portions is considered. In such a case, the area of a region of the positive electrode except the terminal portion may be substantially equal to the area of a region of the negative electrode except the terminal portion.

Figure 32A:
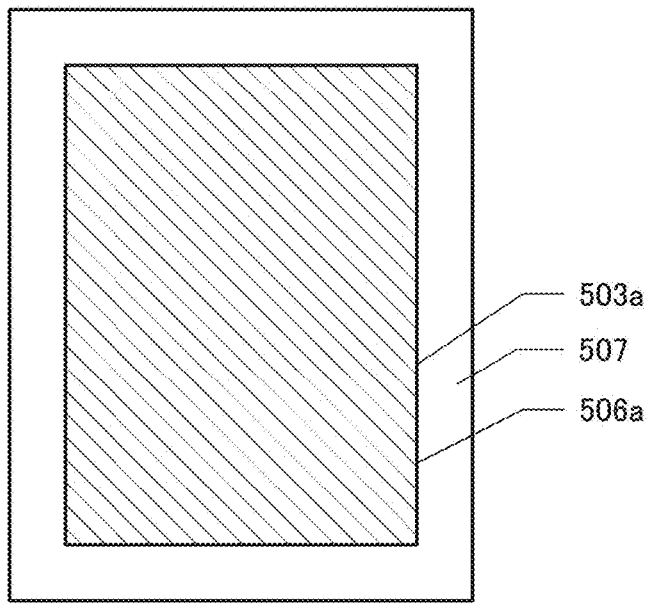
[FIG. 32] A top view of an electrode and a separator.

Furthermore, end portions of the positive electrode 503 and the negative electrode 506 are preferably substantially aligned with each other as illustrated in the example in FIG. 2(B). Alternatively, end portions of the positive electrode active material layer 502a and the negative electrode active material layer 505a are preferably substantially aligned with each other. FIG. 32(A) shows a view of the negative electrode 506a, the separator 507 between the negative electrode 506a and the positive electrode 503a, and the positive electrode 503a that are seen from above. FIG. 32(A) illustrates the case where the areas of the positive electrode 503a and the negative electrode 506a are substantially equal and end portions of the positive electrode 503a and the negative electrode 506a are substantially aligned with each other. Here, an end portion refers to that seen in a plan view or a top view as in FIG. 32, for example.

Figure 32B:
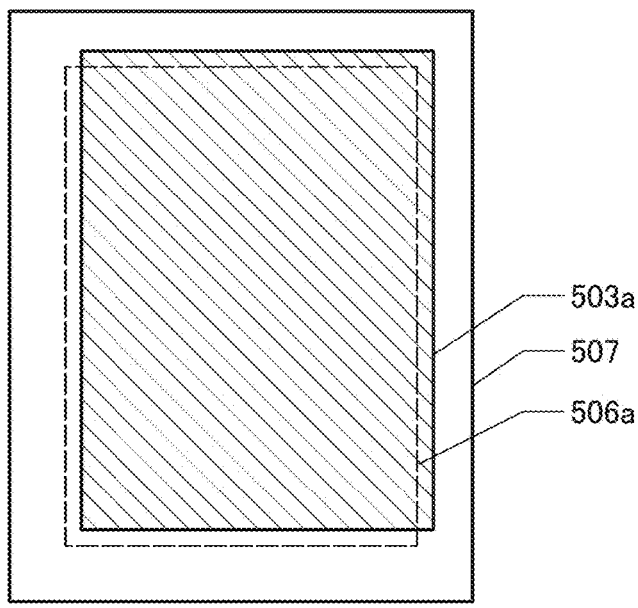
Figure 32C:
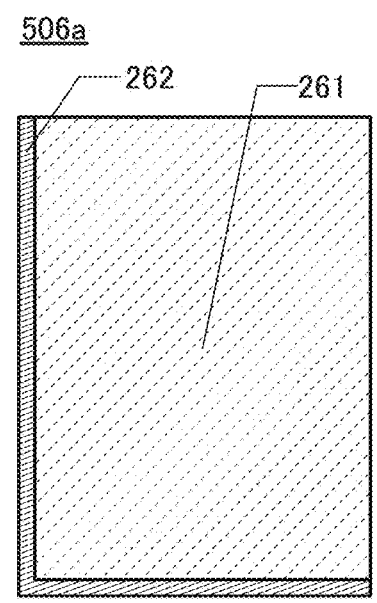

Alternatively, there may be the case where the area of the surface of the positive electrode 503 on the separator 507 side is substantially equal to the area of the surface of the negative electrode 506 on the separator 507 side and the end portions thereof are partly or entirely misaligned, as illustrated in FIG. 32(B). In this case, as illustrated in FIG. 32(C), the negative electrode active material layer 505a in the negative electrode 506a includes a region 261 overlapping with the positive electrode active material layer 502a and/or the positive electrode current collector 501 with the separator 507 sandwiched therebetween, and a region 262 overlapping with neither the positive electrode active material layer 502a nor the positive electrode current collector 501. The area of the region where the negative electrode active material layer 505a in the negative electrode 506a overlap with neither the positive electrode active material layer 502a nor the positive electrode current collector 501 is preferably as small as possible. Furthermore, the distance between the end portion of the positive electrode 503a and the end portion of the negative electrode 506a is preferably as small as possible. Here, the distance between the end portion of the positive electrode 503a and the end portion of the negative electrode 506a is preferably, for example, 0.5 mm or less, more preferably 0.2 mm or less, still more preferably 0.1 mm or less. Alternatively, the difference between the widths or lengths of the positive electrode 503a and the negative electrode 506a is preferably 1 mm or less, more preferably 0.4 mm or less, still more preferably 0.2 mm or less.

Figure 4:
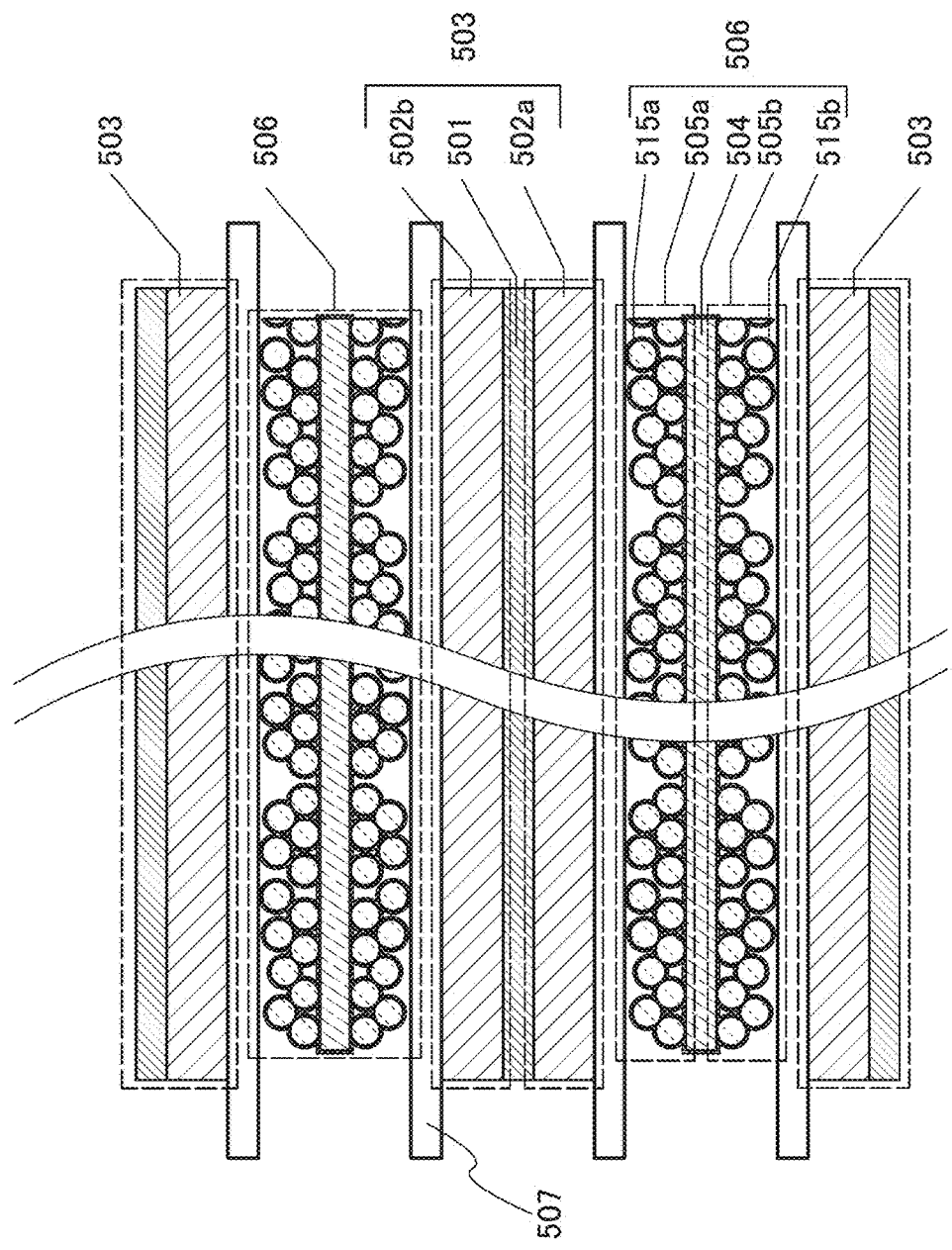
[FIG. 4] A cross-sectional view of part of a power storage device.

Alternatively, the end portion of the negative electrode is preferably located inward from the end portion of the positive electrode. Furthermore, the positive electrode active material layer and the negative electrode active material layer face each other with the separator therebetween, and the end portion of the negative electrode active material layer is preferably located inward from the end portion of the positive electrode active material layer. For example, as illustrated in FIG. 4, the end portion of the negative electrode 506 is preferably located inward from the end portion of the positive electrode 503.

Here, a reaction that occurs in the case where the power storage device 500 includes a region in which the positive electrode 503 and the negative electrode 506 do not overlap with each other is described. When the number of electrons received and given in the first reaction described above is R1 and the number of electrons received and given in the second reaction is R2, the value of R2/R1 in the region 262 described above is considered to be larger than that in the region 261. Thus, when the area of the region 262 is large, the irreversible capacity might increase, decreasing the capacity of a power storage device. Here, the area of the region 262 is preferably, for example, 2% or less, more preferably 1% or less of that of the region 261. Alternatively, the area of the positive electrode active material layer 502a is preferably, for example, 98% or more, more preferably 99% or more of that of the negative electrode active material layer 505a.

In the region 261, the distribution of an electric field applied between the positive electrode and the negative electrode is presumably substantially uniform. In contrast, in the region 262, the negative electrode active material layer 505a does not overlap with the positive electrode active material layer 502a and/or the positive electrode current collector 501; thus, the distribution of an electric field applied between the positive electrode and the negative electrode is presumably not as uniform as that in the region 261.

Furthermore, for example, lithium ions are released from the positive electrode active material layer 502a to an electrolytic solution in charging, so that the concentration of lithium ions in the vicinity of a surface of the positive electrode active material layer 502a increases. Furthermore, the concentration of lithium ions has a gradient between the positive electrode active material layer 502a and the negative electrode active material layer 505a. Such a concentration gradient might facilitate a battery reaction at the negative electrode active material layer 505a, for example.

Here, it can be safely considered that the distance between the positive electrode active material layer 502a and the region 261 is determined almost depending on the thickness of the separator sandwiched therebetween. Specifically, in the case where the width of the region 262, that is, the distance from the boundary between the region 261 and the region 262 to the other end portion of the region 262 is larger than the thickness of the separator, it can be said that the distance between the region 262 and the positive electrode active material layer 502a is longer than the distance between the region 261 and the positive electrode active material layer 502a. Thus, a battery reaction might be less likely to occur at the region 262 than at the region 261.

Here, the case of using an ionic liquid as a solvent of an electrolytic solution is considered. A cation and an anion in the ionic liquid have charge and thus are believed to more easily exist at a surface of an electrode, for example, in the vicinity of a surface of an active material layer or a current collector than molecules in an organic solvent or the like. Accordingly, a decomposition reaction at the surface of the active material layer or the current collector probably occurs more easily. Moreover, a battery reaction of carrier ions such as lithium ions might be hindered. Thus, in the case of using an ionic liquid as a solvent of an electrolytic solution, an influence of the distribution of an electric field or the lithium concentration might be more significantly received.

Next, an example of an ionic liquid that can be used as a solvent of an electrolytic solution is described.

In the case of using, as a solvent of an electrolytic solution, an ionic liquid containing an aliphatic onium cation such as a quaternary ammonium cation, a tertiary sulfonium cation, or a quaternary phosphonium cation, which has a lower reduction potential than an ionic liquid containing an aromatic cation such as an imidazolium cation, the irreversible capacity of a storage battery can be reduced in some cases. The ionic liquid, however, has a high viscosity and thus has low conductivity of an ion (e.g., lithium ion). Furthermore, in the case of using the ionic liquid for a lithium-ion battery, the resistance of the ionic liquid (specifically, an electrolyte containing the ionic liquid) is increased in a low temperature environment (particularly at 0° C. or lower) and thus it is difficult to increase the charge and discharge rate.

An ionic liquid containing an aromatic cation such as an imidazolium cation is preferably used as a solvent of an electrolytic solution because it has a lower viscosity than an ionic liquid containing a cation of an aliphatic compound and can increase the charge and discharge rate. An aromatic cation such as an imidazolium cation, however, might be reductively decomposed easily at surfaces of an active material and a current collector, which are constituent materials of a power storage device. As a result, irreversible capacity might increase. Furthermore, the capacity might be reduced with charge and discharge cycles. These phenomena are possibly due to the high reduction potential of an aromatic cation such as an imidazolium cation. Moreover, these phenomena are possibly due to the structure of an imidazolium cation, for example. Thus, it is particularly preferred that the reductive decomposition of an aromatic cation such as an imidazolium cation at surfaces of an active material and a current collector, which are constituent materials of a power storage device, be inhibited.

Furthermore, an ionic liquid containing an aliphatic onium cation such as a quaternary ammonium cation, a tertiary sulfonium cation, and a quaternary phosphonium cation has a relatively low reduction potential but might be reductively decomposed at surfaces of an active material and a current collector, which are constituent materials of a power storage device, in charge and discharge cycles at a high temperature, for example.

According to one embodiment of the present invention, for example, the decomposition reaction of an electrolytic solution at the surfaces of the active material layer, the current collector, and the like of the power storage device 500 can be inhibited, increasing the capacity of the power storage device.

Furthermore, an irreversible reaction with the electrolytic solution 508 might also occur at the surfaces of the negative electrode current collector 504 and the positive electrode current collector 501. Thus, the positive electrode current collector 501 and the negative electrode current collector 504 are preferably less likely to react with the electrolytic solution.

As the positive electrode current collector 501 and the negative electrode current collector 504, a metal such as stainless steel, gold, platinum, zinc, iron, nickel, copper, aluminum, titanium, tantalum, or manganese, an alloy thereof, sintered carbon, or the like can be used, for example. Alternatively, copper or stainless steel may be coated with carbon, nickel, titanium, or the like. Alternatively, an aluminum alloy to which an element that improves heat resistance, such as silicon, neodymium, scandium, or molybdenum, is added can be used. Still alternatively, they may be formed with a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, nickel, and the like.

Furthermore, stainless steel or the like is preferably used, in which case a reaction with an electrolytic solution may be able to inhibited.

Furthermore, for the positive electrode current collector 501 and the negative electrode current collector 504, various shapes including a foil-like shape, a plate-like shape (sheet-like shape), a net-like shape, a cylindrical shape, a coil shape, a punching-metal shape, an expanded-metal shape, a porous shape, and a shape of non-woven fabric can be used as appropriate. Furthermore, the positive electrode current collector 501 and the negative electrode current collector 504 may have micro irregularities on the surface thereof in order to enhance adhesion to the active material layer. Furthermore, the positive electrode current collector 501 and the negative electrode current collector 504 having a thickness of 5 μm to 30 μm inclusive are preferably used.

Furthermore, each of the positive electrode 503 and the negative electrode 506 may include a tab region. The tab region may be connected to a lead electrode serving as a terminal of a power storage device. For example, part of the tab region may be welded to a lead electrode. In the tab region provided for the positive electrode 503, at least part of the positive electrode current collector is preferably exposed. In the tab region provided for the negative electrode 506, at least part of the negative electrode current collector is preferably exposed. Exposure of part of the current collector can reduce contact resistance between the lead electrode and the current collector.

Exposure of the surface of the current collector, however, might easily cause a reaction between the electrolytic solution 508 and the current collector. Therefore, the area of a region of the surface of the current collector that is exposed is preferably small.

The positive electrode active material layer includes a positive electrode active material. As the positive electrode active material, a material into and from which lithium ions can be inserted and extracted can be used; for example, a material having an olivine type structure, a layered rock-salt type structure, a spinel type structure, or a NASICON type crystal structure, or the like can be used. A material that can be used for the positive electrode active material is described in detail in the following embodiment.

In addition, the negative electrode active material layer includes a negative electrode active material. As the negative electrode active material, for example, a carbon-based material, an alloy-based material, or the like can be used. A material that can be used as the negative electrode active material is described in detail in the following embodiment.

Furthermore, the positive electrode active material layer and the negative electrode active material layer may include a conductive additive. As the conductive additive, a carbon material, a metal material, a conductive ceramic material, and the like can be used, for example. Alternatively, a fiber material may be used as the conductive additive. A material that can be used as the conductive additive is described in detail in the following embodiment.

Furthermore, the positive electrode active material layer and the negative electrode active material layer may include a binder. A material that can be used as the binder is described in detail in the following embodiment.

As the separator 507, that formed of, for example, paper, nonwoven fabric, glass fiber, ceramics, synthetic fiber using nylon (polyamide), vinylon (polyvinyl alcohol-based fiber), polyester, acrylic, polyolefin, or polyurethane, or the like can be used.

A solvent of the electrolytic solution 508 preferably contains an ionic liquid (room temperature molten salt) that has non-flammability and non-volatility. Either one kind of ionic liquid or a combination of some kinds of ionic liquids is used as an ionic liquid. The use of the electrolytic solution 508 containing an ionic liquid can prevent a power storage device from exploding or catching fire even when the power storage device internally shorts out or the internal temperature increases owing to overcharge or the like. An ionic liquid is composed of cations and anions and contains organic cations and anions. Examples of the organic cation include aromatic cations such as an imidazolium cation and a pyridinium cation and aliphatic onium cations such as a quaternary ammonium cation, a tertiary sulfonium cation, and a quaternary phosphonium cation. Furthermore, examples of the anion include a monovalent amide anion, a monovalent methide anion, a fluorosulfonate anion, a perfluoroalkylsulfonate anion, a tetrafluoroborate anion, a perfluoroalkylborate anion, a hexafluorophosphate anion, and a perfluoroalkylphosphate anion. An ionic liquid that can be used as a solvent of the electrolytic solution 508 is described in detail in Embodiment 2.

Furthermore, as a solvent of the electrolytic solution 508, an aprotic organic solvent may be mixed into the above ionic liquid and used. As the aprotic organic solvent, for example, one kind of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more kinds of these can be used in an appropriate combination in an appropriate ratio.

Furthermore, an additive agent such as vinylene carbonate, propane sultone (PS), tert-butylbenzene (TBB), fluoroethylene carbonate (FEC), or lithium bis(oxalato)borate (LiBOB) may be added to the electrolytic solution. The concentration of such an additive agent in the whole solvent is, for example, higher than or equal to 0.1 wt % and lower than or equal to 5 wt %.

Furthermore, in the case of using lithium ions as carriers, as an electrolyte dissolved in the above-described solvent, one kind of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, LiC ($C_2F_5SO_2)_3$, $LiN(FSO_2)_2$, $LiN(CF_3SO_2)_2$, $LiN(C_4F_9SO_2)(CF_3SO_2)$, and $LiN(C_2F_5SO_2)_2$ can be used, or two or more kinds of these lithium salts can be used in an appropriate combination and ratio. Furthermore, the concentration of the electrolyte is preferably high, for example, preferably higher than or equal to 0.8 mol/kg, more preferably higher than or equal to 1.5 mol/kg.

Furthermore, as the electrolytic solution for a power storage device, an electrolytic solution that is highly purified and contains a small amount of dust in the form of particles and elements other than the constituent elements of the electrolytic solution (hereinafter, also simply referred to as "impurities") is preferably used. Specifically, the weight ratio of impurities to the electrolytic solution is less than or equal to 1%, preferably less than or equal to 0.1%, and more preferably less than or equal to 0.01%.

Furthermore, a gelled electrolyte obtained in such a manner that a polymer is swelled with an electrolytic solution may be used. Examples of the gelled electrolyte (polymer-gel electrolyte) include a host polymer that is used as a support and contains the electrolytic solution described above.

Examples of host polymers are described below. As a host polymer, for example, a polymer having a polyalkylene oxide structure, such as polyethylene oxide (PEO), PVdF, polyacrylonitrile, and a copolymer containing them can be used. For example, PVdF-HFP, which is a copolymer of PVdF and hexafluoropropylene (HFP) can be used. Furthermore, the formed polymer may be porous.

Furthermore, in combination with the electrolytic solution, a solid electrolyte including an inorganic material such as a sulfide-based inorganic material or an oxide-based inorganic material, or a solid electrolyte including a macromolecular material such as a PEO (polyethylene oxide)-based macromolecular material may be used. For example, the solid electrolyte may be formed on a surface of the active material layer. In the case of using the solid electrolyte and the electrolytic solution in combination, a separator and a spacer do not need to be provided in some cases.

It is preferred that the surface of the exterior body 509 that is in contact with the electrolytic solution, i.e., the inner surface of the exterior body 509, not react with the electrolytic solution significantly. When moisture enters the power storage device 500 from the outside, a reaction between a component of the electrolytic solution or the like and water might occur. Thus, the exterior body 509 preferably has low moisture permeability.

[Thin Storage Battery]

Figure 5A:
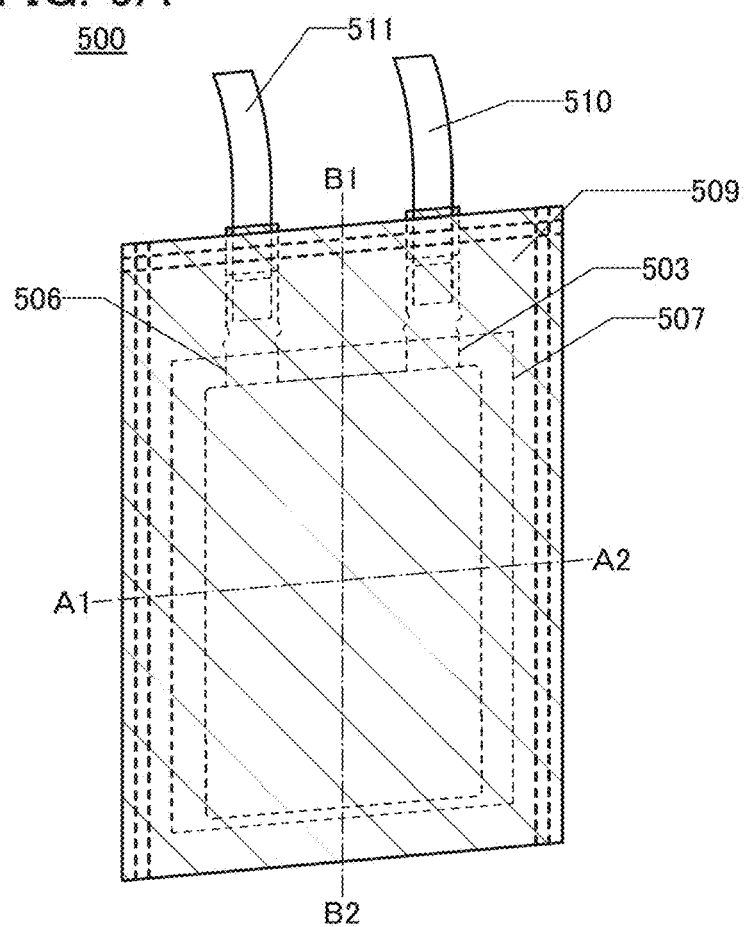
[FIG. 5] An external view of a thin storage battery and an electrode.

Here, an example of the power storage device 500 using one embodiment of the present invention is described with reference to FIG. 5. FIG. 5(A) illustrates a mode of a thin storage battery as an example of the power storage device 500. FIG. 6(A) shows a cross section along dashed-dotted line A1-A2 in FIG. 5, and FIG. 6(B) shows a cross section along dashed-dotted line B1-B2 in FIG. 5. Here, the power storage device 500 includes the positive electrode 503, the negative electrode 506, the separator 507, the exterior body 509, a positive electrode lead electrode 510, and a negative electrode lead electrode 511.

Figure 5B:
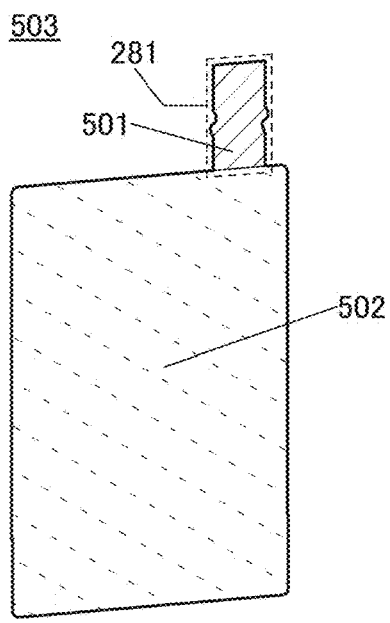
Figure 6A:
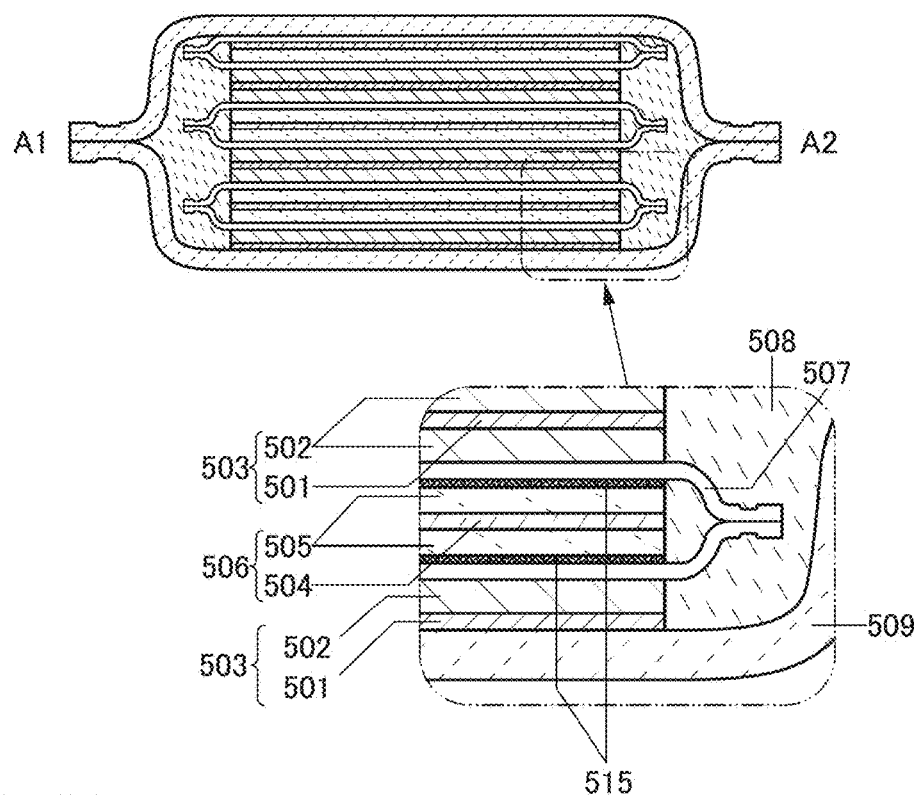
[FIG. 6] A cross-sectional view of a thin storage battery.
Figure 6B:
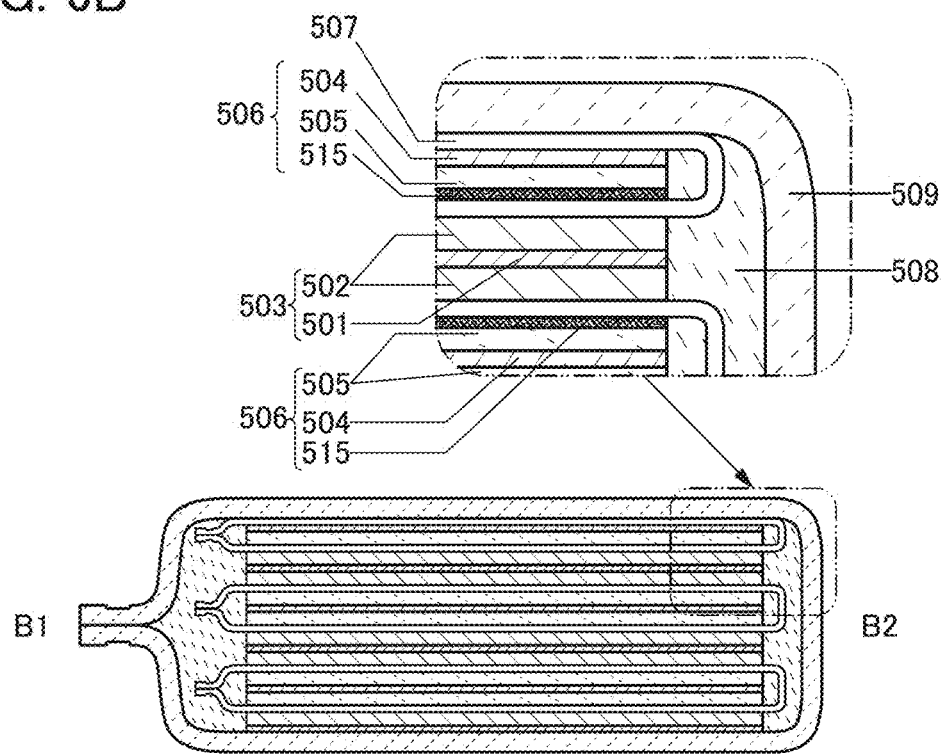

In addition, FIG. 5(B) shows the external view of the positive electrode 503. Here, the positive electrode 503 includes the positive electrode current collector 501 and the positive electrode active material layer 502. The positive electrode 503 preferably includes the tab region 281. Part of the tab region 281 is preferably welded to the positive electrode lead electrode 510. The tab region 281 preferably includes a region where the positive electrode current collector 501 is exposed. When the positive electrode lead electrode 510 is welded to the region where the positive electrode current collector 501 is exposed, contact resistance can be further reduced. Although FIG. 5(B) illustrates the example where the positive electrode current collector 501 is exposed in the entire tab region 281, the tab region 281 may partly include the positive electrode active material layer 502.

Figure 5C:
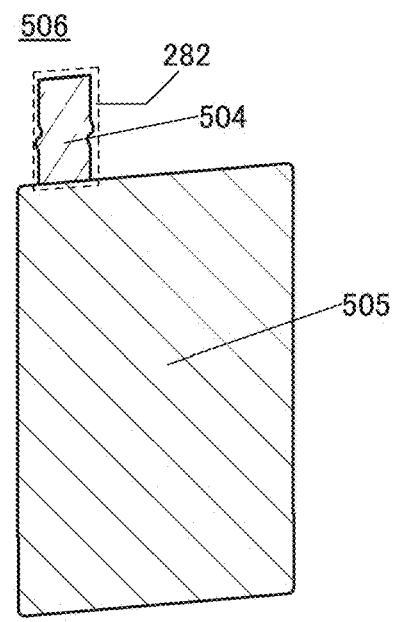

In addition, FIG. 5(C) shows the external view of the negative electrode 506. Here, the negative electrode 506 includes the negative electrode current collector 504, the negative electrode active material layer 505, and a coating film 515 illustrated in FIG. 6. The coating film 515 is formed by the second reaction described above and thus includes at least one of an element included in the negative electrode active material layer 505 and an element included in the electrolytic solution. Note that the negative electrode active material layer and the coating film 515 are illustrated in the form of layers for simplification of the drawing but actually have the structure shown in FIG. 1. Furthermore, the negative electrode 506 preferably includes the tab region 282. Part of the tab region 282 is preferably welded to the negative electrode lead electrode 511. The tab region 282 preferably includes a region where the negative electrode current collector 504 is exposed, and when the negative electrode lead electrode 511 is welded to the region where the negative electrode current collector 504 is exposed, contact resistance can be further reduced. Although FIG. 5(C) illustrates the example where the negative electrode current collector 504 is exposed in the entire tab region 282, the tab region 282 may partly include the negative electrode active material layer 505.

The use of a flexible exterior body allows the thin storage battery illustrated in FIG. 5(A) to have flexibility. With the flexible structure, it can be mounted on an electronic device at least part of which is flexible, and the storage battery can be bent as the electronic device is changed in form.

Note that FIG. 5(A) illustrates the example where the end portions of the positive electrode and the negative electrode are substantially aligned with each other; however, at least part of the end portion of the positive electrode may be located outward from the end portion of the negative electrode.

The examples of storage batteries illustrated in FIG. 6 include three positive electrode-negative electrode pairs. It is needless to say that the number of positive electrode-negative electrode pairs is not limited to three. The number of pairs of electrodes may be either large or small. In the case of a large number of pairs of electrodes, the storage battery can have higher capacity. In contrast, in the case of a small number of pairs of electrodes, the storage battery can have a smaller thickness and higher flexibility. Although in FIG. 6, the number of facing positive electrode active material layer-negative electrode active material layer pairs is five, it is needless to say that the number of facing electrode positive electrode active material layer-negative electrode active material layer pairs is not limited to five.

The power storage device 500 may include the positive electrode lead electrode 510 and the negative electrode lead electrode 511. The positive electrode lead electrode 510 is preferably electrically connected to the positive electrode 503. For example, the positive electrode lead electrode 510 is welded to the tab region 281 of the positive electrode 503. Similarly, the negative electrode lead electrode 511 is preferably electrically connected to the negative electrode 506. For example, the negative electrode lead electrode 511 is welded to the tab region 282 of the negative electrode 506.

The positive electrode lead electrode 510 and the negative electrode lead electrode 511 are preferably exposed to the outside of the exterior body so as to serve as terminals for electrical contact with an external portion.

Furthermore, the positive electrode current collector 501 and the negative electrode current collector 504 can double as terminals for electrical contact with an external portion. In that case, the positive electrode current collector 501 and the negative electrode current collector 504 may be arranged so that part of the positive electrode current collector 501 and the negative electrode current collector 504 is exposed to the outside of the exterior body 509 without using lead electrodes.

Figure 7:
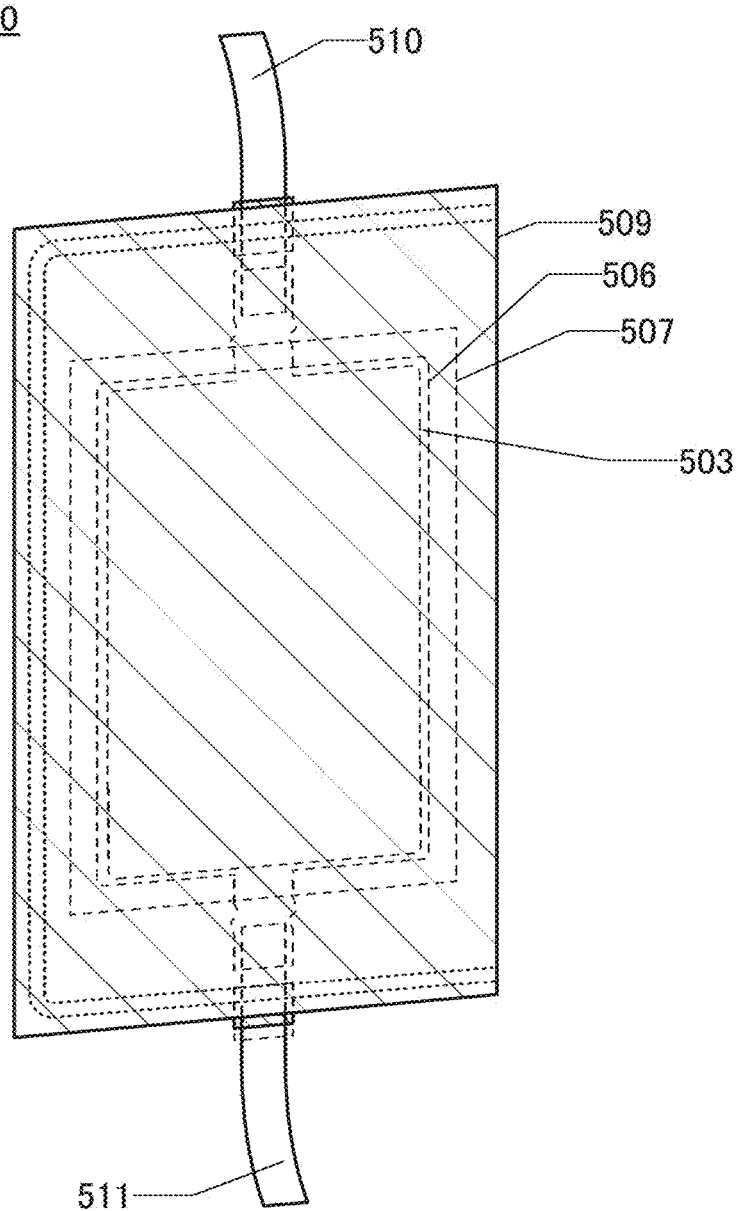
[FIG. 7] An external view of a thin storage battery.

Furthermore, although the positive electrode lead electrode 510 and the negative electrode lead electrode 511 are provided on the same side of the storage battery in FIG. 5, the positive electrode lead electrode 510 and the negative electrode lead electrode 511 may be provided on different sides of a storage battery as illustrated in FIG. 7. The lead electrodes of the storage battery of one embodiment of the present invention can be freely positioned as described above; therefore, the degree of freedom in design is high. Accordingly, a product including a power storage device of one embodiment of the present invention can have a high degree of freedom in design. Furthermore, a yield of products each including a power storage device of one embodiment of the present invention can be increased.

As the exterior body 509 in the thin storage battery, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

In the above structure, the exterior body 509 of the secondary battery can change its form with a curvature radius of greater than or equal to 30 mm, preferably greater than or equal to 10 mm. The number of films as the exterior body of the secondary battery is one or two, and in the case of the secondary battery having a layered structure, a cross-sectional structure of the curved battery is sandwiched by two curved surfaces of the films as the exterior body.

[Fabricating Method of Thin Storage Battery]

Next, an example of a fabricating method of the power storage device 500 that is a thin storage battery is described using drawings.

Next, the positive electrode 503, the negative electrode 506, and the separator 507 are stacked.

First, the separator 507 is positioned over the positive electrode 503. Then, the negative electrode 506 is positioned over the separator 507. In the case of using two or more positive electrode-negative electrode pairs, a separator is further positioned over the negative electrode 506, and then, the positive electrode 503 is positioned. In this manner, the positive electrodes and the negative electrodes are alternately stacked with the separator sandwiched therebetween.

Alternatively, the separator 507 may have a bag-like shape. First, the positive electrode 503 is positioned over the separator 507. Then, the separator 507 is folded along a portion shown by broken line in FIG. 8(A), and the positive electrode 503 is sandwiched by the separator 507. Note that the example where the positive electrode 503 is sandwiched by the separator 507 is described here; however, the negative electrode 506 may be sandwiched by the separator 507.

Here, the outer edges of the separator 507 outside the positive electrode 503 are preferably bonded so that the separator 507 has a bag-like shape (or an envelope-like shape). The bonding of the outer edges of the separator 507 can be performed with the use of an adhesive or the like, by ultrasonic welding, or by thermal fusion bonding.

Figure 8A:
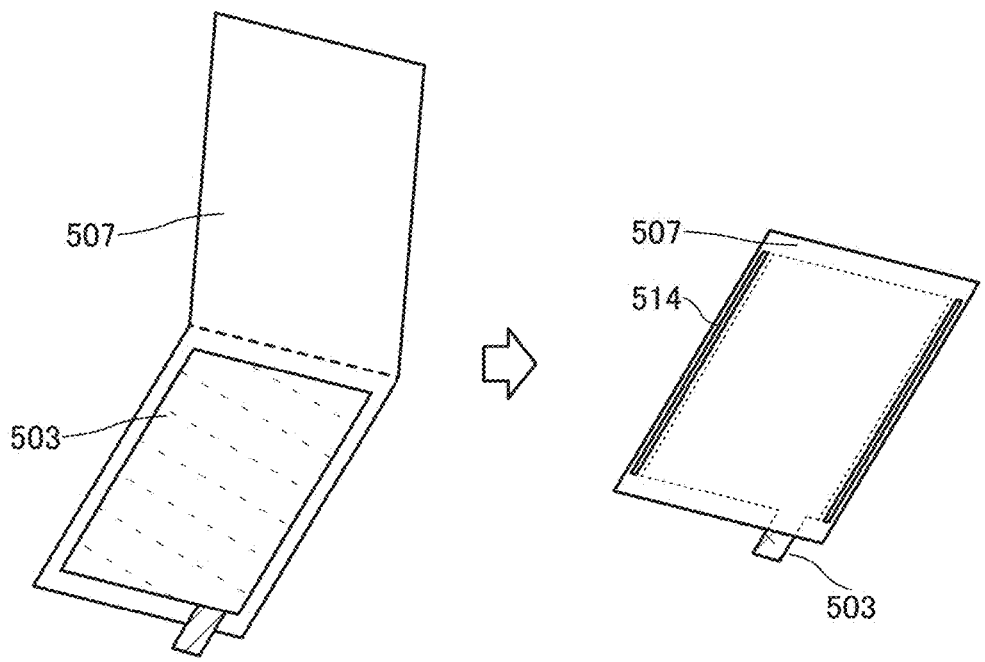
[FIG. 8] A diagram showing a method for fabricating a thin storage battery.

In this embodiment, polypropylene is used as the separator 507 and the outer edges of the separator 507 are bonded by heating. Bonding portions 514 are illustrated in FIG. 8(A). In such a manner, the positive electrode 503 can be covered with the separator 507.

Figure 8B:
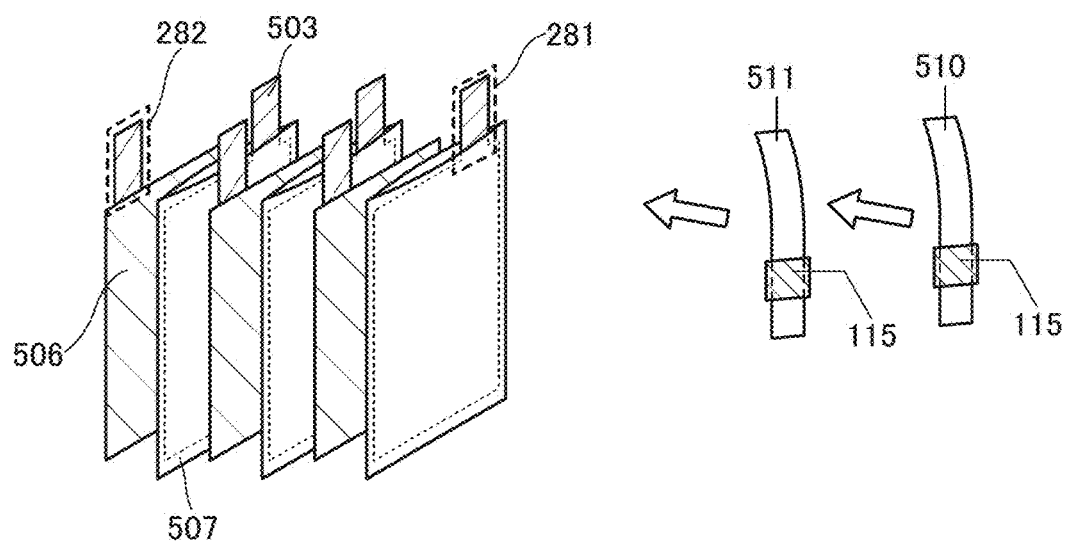

Then, the negative electrodes 506 and the positive electrodes 503 covered with the separator 507 are alternately stacked as illustrated in FIG. 8(B). Furthermore, the positive electrode lead electrode 510 and the negative electrode lead electrode 511 having a sealing layer 115 are prepared.

Figure 9A:
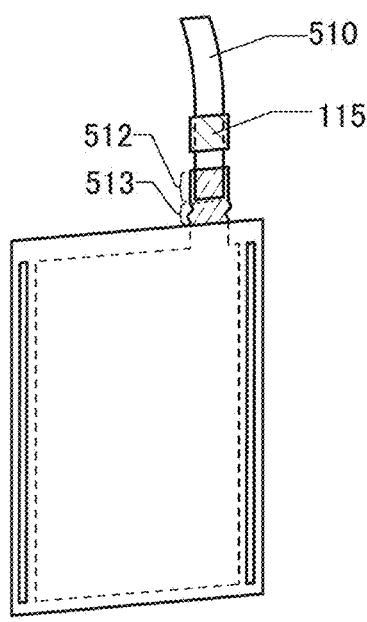
[FIG. 9] A diagram showing a method for fabricating a thin storage battery.
Figure 9B:
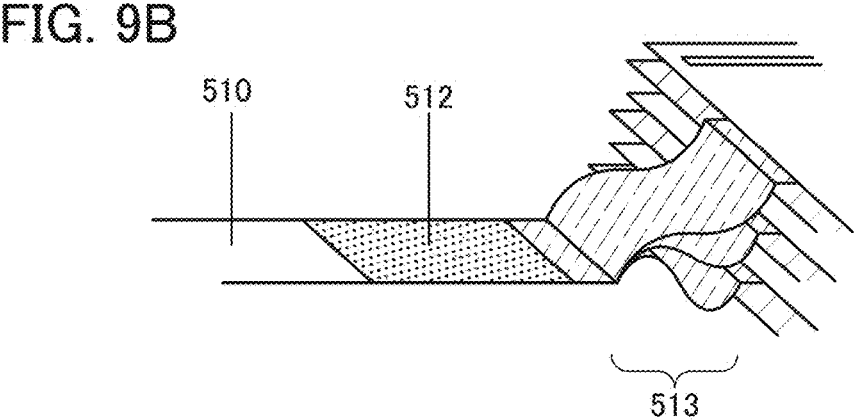

Next, the positive electrode lead electrode 510 having the sealing layer 115 is connected to the tab region 281 of the positive electrode 503 as illustrated in FIG. 9(A). FIG. 9(B) shows an enlarged connection portion. The tab region 281 of the positive electrode 503 and the positive electrode lead electrode 510 are electrically connected to each other by irradiating the bonding portion 512 with ultrasonic waves while applying pressure thereto (ultrasonic welding). In that case, a curved portion 513 is preferably provided in the tab region 281.

Providing the curved portion 513 can relieve stress caused due to external force applied after fabrication of the power storage device 500. Thus, the power storage device 500 can have high reliability.

Then, the negative electrode lead electrode 511 is electrically connected to the tab region 282 of the negative electrode 506 by a similar method.

Subsequently, the positive electrode 503, the negative electrode 506, and the separator 507 are positioned over an exterior body 509.

Figure 9C:
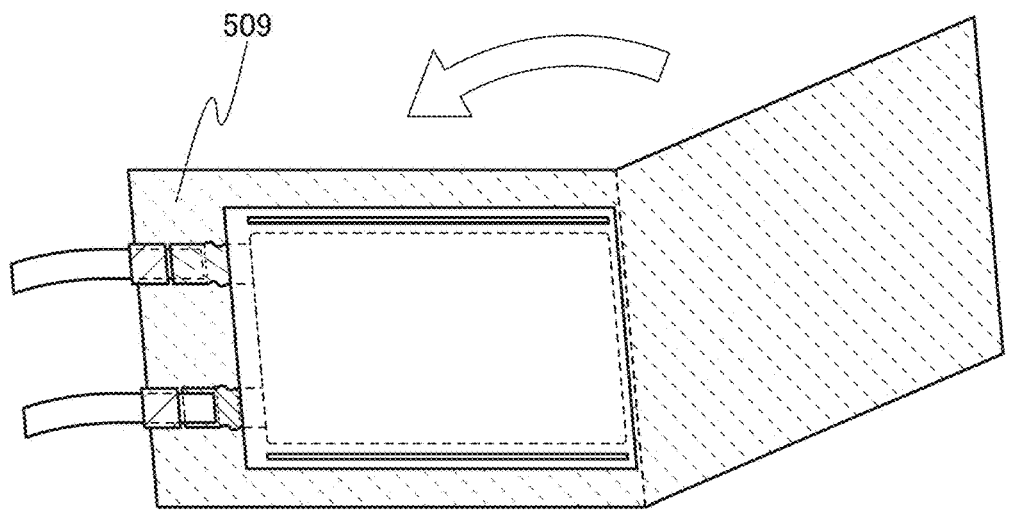

Then, the exterior body 509 is folded along a portion shown by a dotted line in the vicinity of a center portion of the exterior body 509 in FIG. 9(C).

Next, in FIG. 10, a portion in which the outer edges of the exterior body 509 are bonded by thermocompression bonding is illustrated as a bonding portion 118. The outer edge portions of the exterior body 509 except an inlet 119 for introducing the electrolytic solution 508 are bonded by thermocompression bonding. In thermocompression bonding, the sealing layers 115 provided on the lead electrodes are also melted, thereby fixing the lead electrodes and the exterior body 509 to each other. Moreover, adhesion between the exterior body 509 and the lead electrodes can be increased.

Then, in a reduced-pressure atmosphere or an inert gas atmosphere, a desired amount of electrolytic solution 508 is introduced to the inside of the exterior body 509 from the inlet 119. Lastly, the inlet 119 is sealed by thermocompression bonding. In such a manner, the power storage device 500, which is a thin storage battery, can be fabricated.

Next, aging after fabrication of the power storage device 500 is described. Aging is preferably performed after fabrication of the power storage device 500. An aging condition example is described below. First, charge is performed at a rate of 0.001 C or more and 0.2 C or less. The temperature is, for example, higher than or equal to room temperature and lower than or equal to 50° C. In the case where an electrolytic solution is decomposed and a gas is generated, accumulation of the gas in the cell causes a region in which the electrolytic solution cannot be in contact with a surface of the electrode. That is to say, an effectual reaction area of the electrode is reduced and effectual current density is increased.

When the current density becomes extremely high, a voltage drop occurs depending on the resistance of the electrode, lithium is inserted into graphite and lithium is deposited on the surface of graphite. The lithium deposition might reduce capacity. For example, if a coating film or the like is grown on the surface after lithium deposition, lithium deposited on the surface cannot dissolve again, and the lithium not contributing to capacity is generated. In addition, when deposited lithium is physically collapsed and conduction with the electrode is lost, the lithium not contributing to capacity is also generated. Therefore, the gas is preferably released before the potential of the electrode reaches the potential of lithium because of a voltage drop.

In the case of performing degasification, for example, part of the exterior body of the thin storage battery is cut to open the storage battery. When the exterior body is expanded because of a gas, the form of the exterior body is preferably adjusted again. Furthermore, the electrolytic solution may be added as needed before resealing.

Furthermore, after the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a coating film. The formed coating film may thus be densified when being held at a temperature higher than room temperature after the release of the gas, for example.

Furthermore, for example, in storage batteries provided in electronic devices that are repeatedly folded, exterior bodies gradually deteriorate and cracks are likely to be caused in some cases by the folding. Furthermore, the contact between a surface of an active material and the like and an electrolytic solution by charge and discharge causes a decomposition reaction of the electrolytic solution, which might generate a gas or the like. When expanded because of generation of a gas, the exterior bodies are more likely to be damaged by the folding. The decomposition of an electrolytic solution can be inhibited by using one embodiment of the present invention; thus, for example, generation of a gas by charge and discharge can be inhibited in some cases. Consequently, expansion, deformation, damage, and the like of the exterior bodies can be suppressed, so that a load on the exterior body is reduced, which is preferable.

The use of the electrode of one embodiment of the present invention leads to inhibition of the decomposition of an electrolytic solution and thus also leads to inhibition of excessive growth of a coating film in some cases. In the case where the growth of a coating film is large, the resistance of an electrode increases with charge and discharge cycles. By such an increase in resistance, the potential of the electrode easily reaches the potential at which lithium is deposited. Furthermore, in a negative electrode, for example, lithium deposition might occur because of stress caused in folding. The use of one embodiment of the present invention provides durability to stress caused in folding; thus, for example, the possibility of causing lithium deposition can be reduced in some cases.

Note that in this embodiment, one embodiment of the present invention is described. Alternatively, one embodiment of the present invention is described in another embodiment. However, one embodiment of the present invention is not limited to them. In other words, various embodiments of the invention are described in this embodiment and the other embodiments, and one embodiment of the present invention is not limited to a particular embodiment. The example in which one embodiment of the present invention is applied to a lithium-ion secondary battery is described; however, one embodiment of the present invention is not limited thereto. Depending on circumstances or conditions, one embodiment of the present invention may be applied to a variety of power storage devices. For example, depending on circumstances or conditions, one embodiment of the present invention may be applied to a battery, a primary battery, a secondary battery, a lithium-ion secondary battery, a lithium air battery, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a primary battery, a capacitor, and a lithium-ion capacitor, and the like.

This embodiment can be implemented in combination with the other embodiments as appropriate.

Embodiment 2

In this embodiment, a nonaqueous solvent used in a power storage device of one embodiment of the present invention is described.

A nonaqueous solvent used in a power storage device relating to one embodiment of the present invention preferably contains an ionic liquid. Either one kind of ionic liquid or a combination of some kinds of ionic liquids is used. The ionic liquid is composed of cations and anions. The ionic liquid contains organic cations and anions.

As the organic cation, an aromatic cation or an aliphatic onium cation such as a quaternary ammonium cation, a tertiary sulfonium cation, or a quaternary phosphonium cation is preferably used.

An aromatic cation is preferably a cation containing a five-membered heteroaromatic ring. Examples of the cation containing a five-membered heteroaromatic ring are a benzimidazolium cation, a benzoxazolium cation, and a benzothiazolium cation. Examples of the cation containing a five-membered heteroaromatic ring, which is a monocyclic compound, include an oxazolium cation, a thiazolium cation, an isoxazolium cation, an isothiazolium cation, an imidazolium cation, and a pyrazolium cation. In view of the stability, viscosity, and ionic conductivity of the compound and ease of synthesis, the cation containing a five-membered heteroaromatic ring, which is a monocyclic compound, is preferred. An imidazolium cation is particularly preferred because it can make the viscosity low.

Examples of the anion in the above ionic liquid include a monovalent amide anion, a monovalent methide anion, a fluorosulfonic acid anion ($SO_3F^-$), a fluoroalkyl sulfonic acid anion, a tetrafluoroborate anion ($BF_4^-$), a perfluoroalkylborate anion, a hexafluorophosphate anion ($PF_6^-$), and a perfluoroalkylphosphate anion. Examples of the monovalent amide anion include $(C_nF_{2n+1}SO_2)_2N^-$ (n=0 or more and 3 or less). Examples of the monovalent cyclic amide anion include $(CF_2SO_2)_2N^-$. Examples of the monovalent methide anion include $(C_nF_{2n+1}SO_2)_3C^-$ (n 0 or more and 3 or less). Examples of the monovalent cyclic methide anion include $(CF_2SO_2)_2C^-$ ($CF_3SO_2$). Examples of the fluoroalkyl sulfonic acid anion include $(C_mF_{2m+1}SO_3)^-$ (m=0 to 4). Examples of a perfluoroalkylborate anion include $\{BF_n(C_mH_kF_{2m+1-k})_{4-n}\}^-$ (n=0 or more and 3 or less, m=1 or more and 4 or less, and k=0 or more and 2m or less).

Examples of a perfluoroalkylphosphate anion include $\{PF_n(C_mH_kF_{2m+1-k})_{6-n}\}^-$ (n=0 or more and 5 or less, m=1 or more and 4 or less, and k=0 or more and 2m or less). Note that the anion is not limited thereto.

An ionic liquid containing a cation containing a five-membered heteroaromatic ring can be expressed by General Formula (G1), for example.

[Chemical Formula 1]

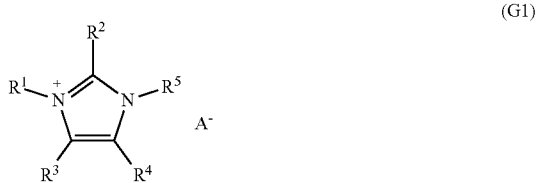

(G1)

In General Formula (G1), $R^1$ represents an alkyl group whose carbon number is 1 or more and 4 or less; $R^2$ to $R^4$ independently represent a hydrogen atom or an alkyl group whose carbon number is 1 or more and 4 or less; $R^5$ represents a main chain formed of two or more selected from atoms of C, O, Si, N, S, and P; $A^-$ represents any one of a monovalent imide anion, a monovalent amide anion, a monovalent methide anion, a fluorosulfonate anion, a perfluoroalkylsulfonate anion, a tetrafluoroborate anion, a perfluoroalkylborate anion, a hexafluorophosphate anion, or a perfluoroalkylphosphate anion.

Furthermore, a substituent may be introduced into $R^5$. Examples of the substituent to be introduced include an alkyl group and an alkoxy group.

The alkyl group of the cation in the ionic liquid represented by General Formula (G1) may have either a straight-chain form or a branched-chain alkyl form. For example, the alkyl group may be an ethyl group or a tert-butyl group. Furthermore, in the cation of the ionic liquid represented by General Formula (G1), it is preferred that $R^5$ not have an oxygen-oxygen bond (peroxide). An oxygen-oxygen single bond extremely easily breaks and is reactive and thus might be explosive. Therefore, an ionic liquid including a cation containing an oxygen-oxygen bond and including the cation is not suitable for a power storage device.

Furthermore, the ionic liquid may contain a six-membered heteroaromatic ring. For example, an ionic liquid represented by General Formula (G2) below can be used.

[Chemical Formula 2]

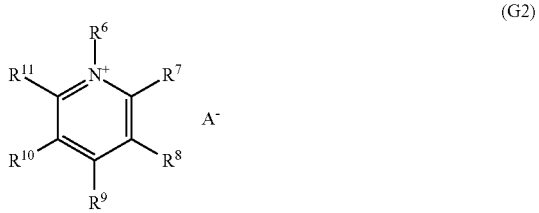

(G2)

In General Formula (G2), $R_6$ represents a straight chain composed of two or more selected from atoms of C, O, Si, N, S, and P; $R_7$ to $R_{11}$ individually represent a hydrogen atom or an alkyl group whose carbon number is 1 or more and 4 or less; and $A^-$ represents any one of a monovalent imide anion, a monovalent amide anion, a monovalent methide anion, a fluorosulfonic acid anion, a perfluoroalkyl sulfonic acid anion, a tetrafluoroborate anion, a perfluoroalkylborate anion, a hexafluorophosphate anion, and a perfluoroalkylphosphate anion.

Furthermore, a substituent may be introduced into $R^6$. Examples of the substituent to be introduced include an alkyl group and an alkoxy group.

As an ionic liquid containing a quaternary ammonium cation, an ionic liquid represented by General Formula (G3) below can be used, for example.

[Chemical Formula 3]

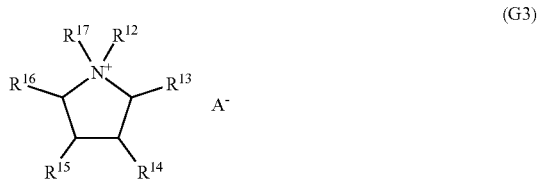

(G3)

In General Formula (G3), $R^{12}$ to $R^{17}$ individually represent an alkyl group, a methoxy group, a methoxymethyl group, or a methoxyethyl group whose carbon number is 1 or more and 20 or less, or a hydrogen atom, and $A^-$ represents any one of a monovalent imide anion, a monovalent amide anion, a monovalent methide anion, a fluorosulfonate anion, a perfluoroalkylsulfonate anion, a tetrafluoroborate anion, a perfluoroalkylborate anion, a hexafluorophosphate anion, or a perfluoroalkylphosphate anion.

Furthermore, as the ionic liquid, an ionic liquid containing a quaternary ammonium cation and a monovalent anion and represented by General Formula (G4) below can be used, for example.

[Chemical Formula 4]

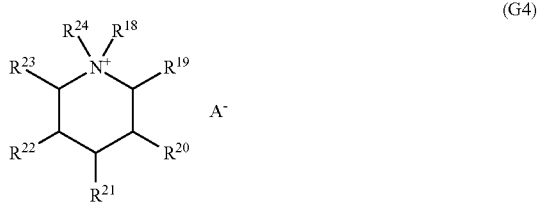

(G4)

In General Formula (G4), $R^{18}$ to $R^{24}$ individually represent an alkyl group, a methoxy group, a methoxymethyl group, or a methoxyethyl group whose carbon number is 1 or more and 20 or less, or a hydrogen atom, and $A^-$ represents any one of a monovalent imide anion, a monovalent amide anion, a monovalent methide anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As the ionic liquid, an ionic liquid containing a quaternary ammonium cation and a monovalent anion and represented by General Formula (G5) below can be used, for example.

[Chemical Formula 5]

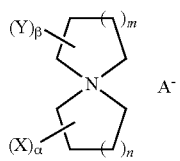

(G5)

In General Formula (G5), n and m are greater than or equal to 1 and less than or equal to 3. Assume that α is greater than or equal to 0 and less than or equal to 6. When n is 1, α is greater than or equal to 0 and less than or equal to 4. When n is 2, α is greater than or equal to 0 and less than or equal to 5. When n is 3, α is greater than or equal to 0 and less than or equal to 6. Assume that β is greater than or equal to 0 and less than or equal to 6. When m is 1, β is greater than or equal to 0 and less than or equal to 4. When m is 2, β is greater than or equal to 0 and less than or equal to 5. When m is 3, β is greater than or equal to 0 and less than or equal to 6. Note that α or β is 0 indicates being unsubstituted. Furthermore, the case where both α and β are 0 is excluded. X or Y represents a substituent such as a straight-chain or side-chain alkyl group whose carbon number is 1 or more and 4 or less, a straight-chain or side-chain alkoxy group whose carbon number is 1 or more and 4 or less, or a straight-chain or side-chain alkoxyalkyl group whose carbon number is 1 or more and 4 or less. Furthermore, A⁻ represents any one of a monovalent imide anion, a monovalent amide anion, a monovalent methide anion, a fluorosulfonate anion, a perfluoroalkylsulfonate anion, a tetrafluoroborate anion, a perfluoroalkylborate anion, a hexafluorophosphate anion, or a perfluoroalkylphosphate anion.

In a quaternary spiro ammonium cation, two aliphatic rings that compose a spiro ring are any of a five-membered ring, a six-membered ring, or a seven-membered ring.

For example, specific examples of the cation of the above General Formula (G1) include Structural Formulae (111) to (174).

[Chemical Formulae 6]

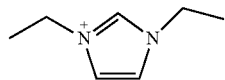

(111)

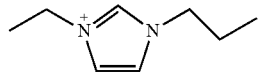

(112)

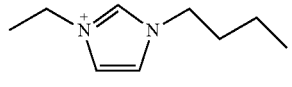

(113)

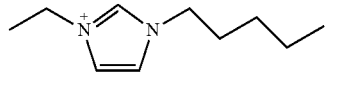

(114)

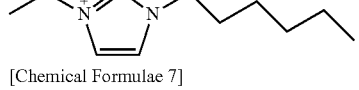

(115)

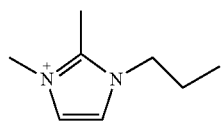

(116)

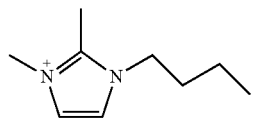

(117)

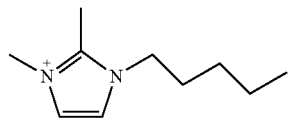

(118)

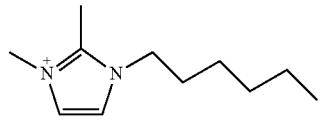

(119)

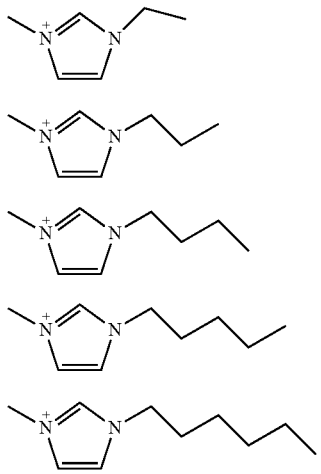

(120)

[Chemical Formulae 7]

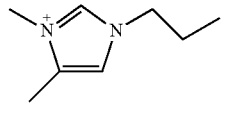

(121)

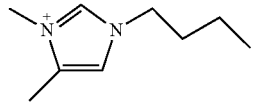

(122)

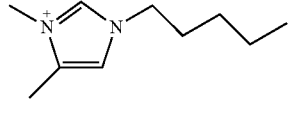

(123)

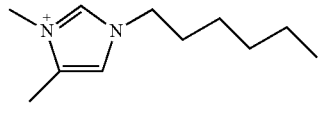

(124)

(125)

(126)

(127)

(128)

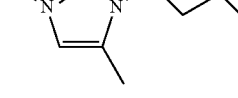

(129)

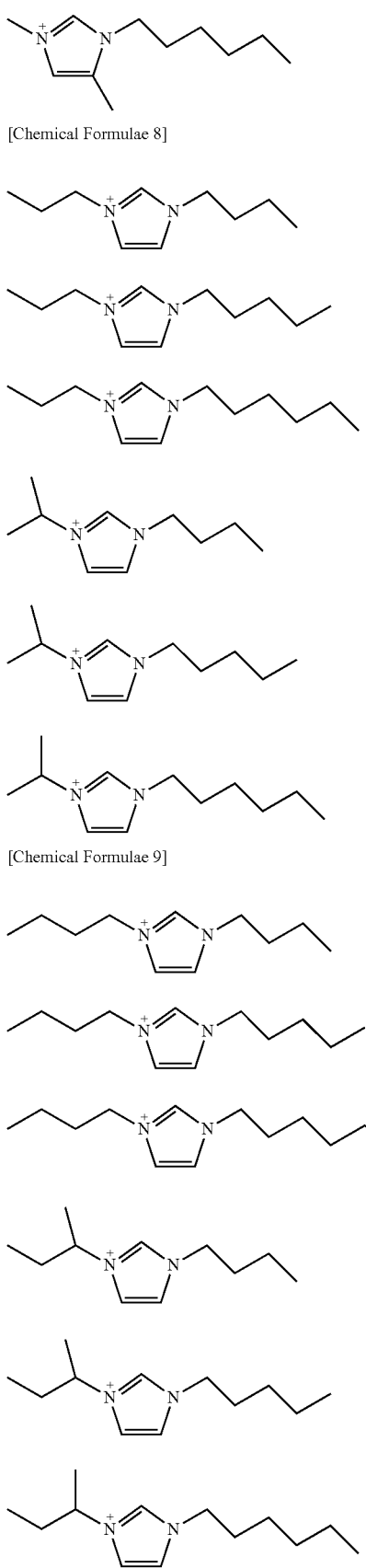
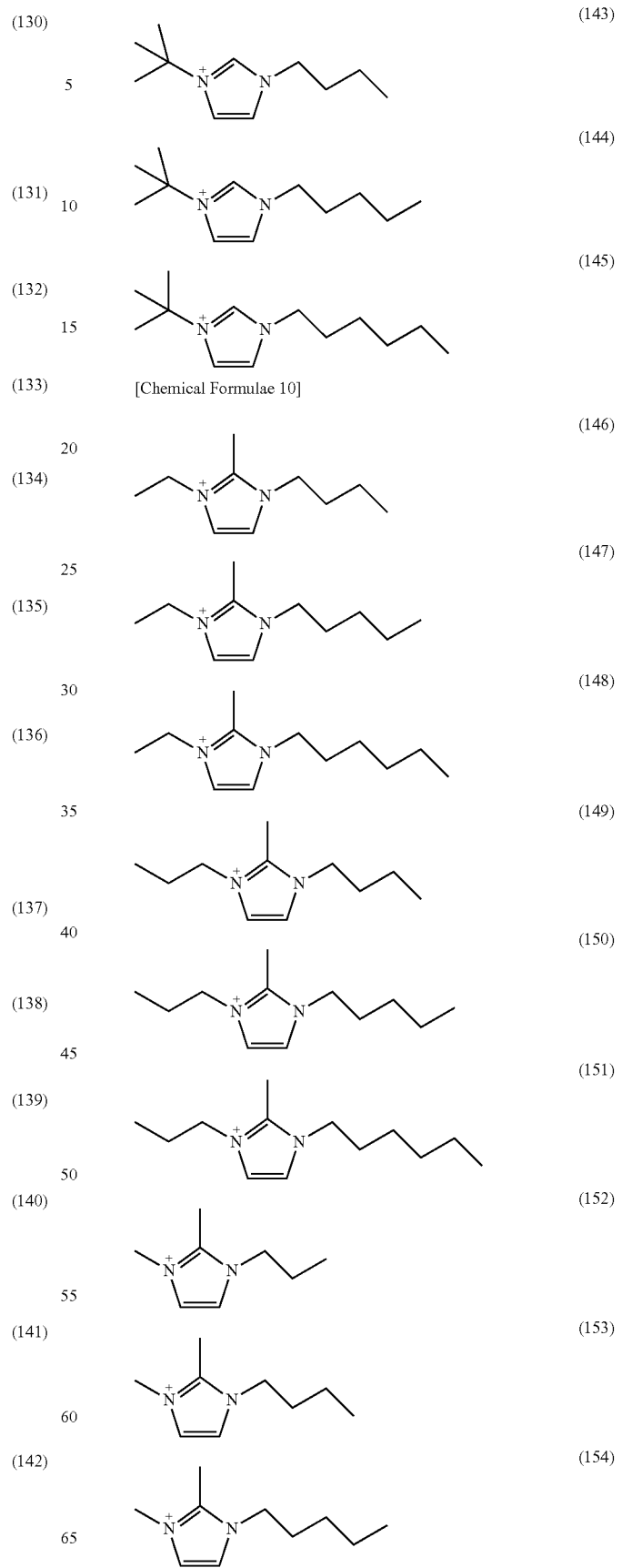

[Chemical Formulae 11]

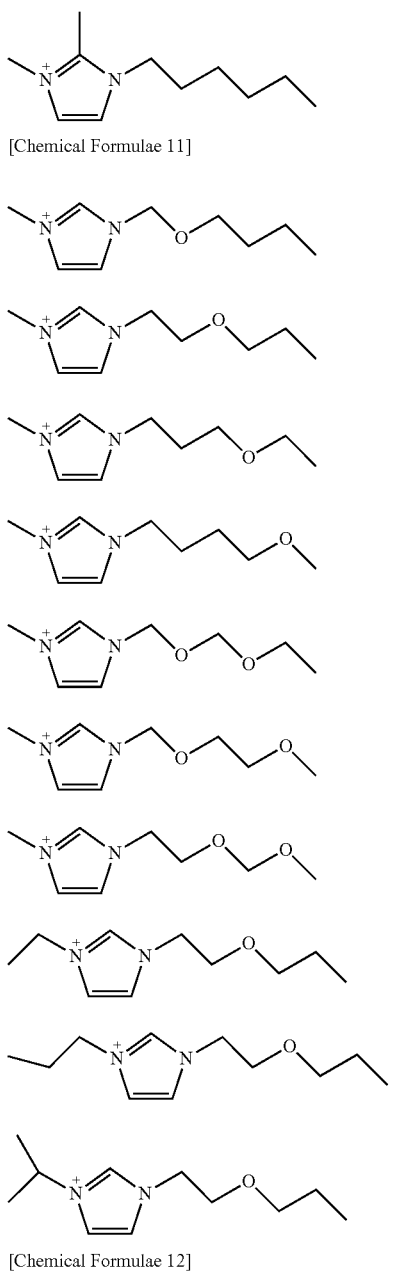

[Chemical Formulae 12]

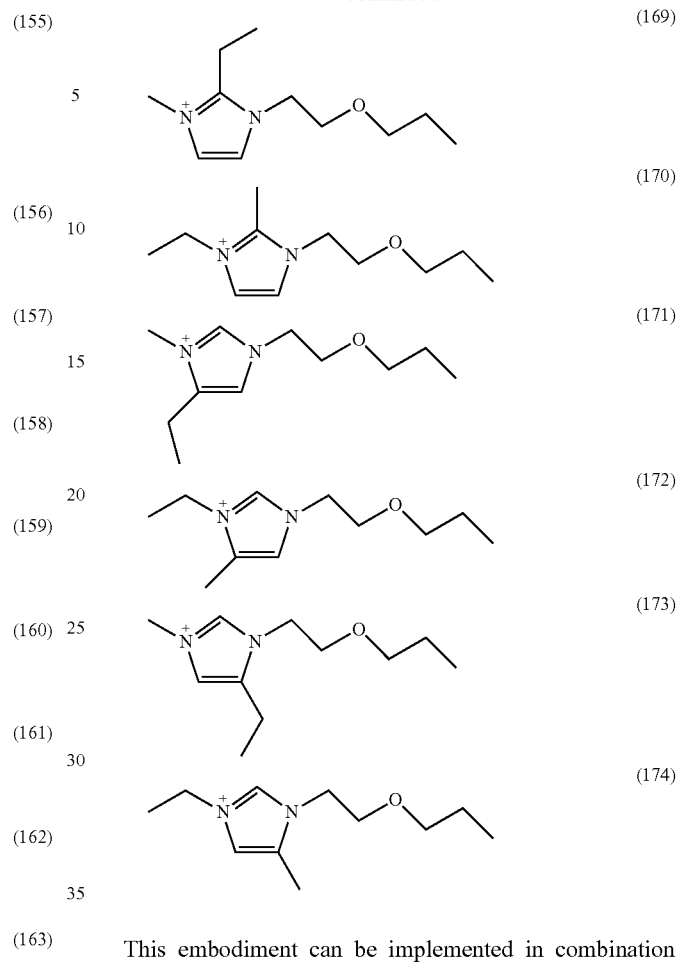

This embodiment can be implemented in combination with the other embodiments as appropriate.

Embodiment 3

In this embodiment, specific structures and fabricating methods of a positive electrode and a negative electrode that can be used for one embodiment of the present invention are described.

For the negative electrode current collector 504 and the positive electrode current collector 501, the materials for the negative electrode current collector 504 and the positive electrode current collector 501 that are described in Embodiment 1 can be used.

As a negative electrode active material, for example, a carbon-based material, an alloy-based material, or the like can be used. As the carbon-based material, graphite, graphitizing carbon (soft carbon), non-graphitizing carbon (hard carbon), a carbon nanotube, graphene, carbon black, and the like are given. As graphite, artificial graphite such as mesocarbon microbeads (MCMB), coke-based artificial graphite, and pitch-based artificial graphite and natural graphite such as spherical natural graphite are given.

Graphite has a low potential substantially equal to that of a lithium metal (higher than or equal to 0.1 V and lower than or equal to 0.3 V vs. Li/Li$^+$) when lithium ions are inserted into the graphite (while a lithium-graphite intercalation compound is formed). For this reason, a lithium-ion secondary battery can have a high operating voltage. In addition, graphite is preferred because of its advantages such as relatively high capacity per unit volume, small volume expansion, low cost, and higher level of safety than that of a lithium metal.

For the negative electrode active material, an alloy-based material or an oxide which enables charge-discharge reactions by an alloying reaction and a dealloying reaction with lithium can be used. In the case where lithium ions are carrier ions, the alloy-based material is, for example, a material containing at least one of Mg, Ca, Al, Si, Ge, Sn, Pb, As, Sb, Bi, Ag, Au, Zn, Cd, Hg, In, and the like. Such elements have higher capacity than carbon. In particular, silicon has a significantly high theoretical capacity of 4200 mAh/g. For this reason, silicon is preferably used as the negative electrode active material. Examples of an alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Furthermore, for the negative electrode active materials, an oxide such as SiO, SnO, $SnO_2$, titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Furthermore, for the negative electrode active materials, $Li_{(3-x)}M_xN$ (M=Co, Ni, or Cu) with a $Li_3N$ structure, which is a double nitride of lithium and a transition metal, can be used. For example, $Li_{2.6}Co_{0.4}N_3$ is preferable because of high charge and discharge capacity (900 mAh/g and 1890 mAh/cm$^3$). A double nitride of lithium and a transition metal is preferably used as the negative electrode active material, in which case lithium ions are contained in the negative electrode active materials and thus they can be used in combination with a material which does not contain lithium ions, such as $V_2O_5$ or $Cr_3O_8$, as a positive electrode active material. Note that even in the case of using a material containing lithium ions as a positive electrode active material, the double nitride of lithium and a transition metal can be used for the negative electrode active material by extracting the lithium ions contained in the positive electrode active material in advance.

Furthermore, a material which causes a conversion reaction can be used for the negative electrode active material; for example, a transition metal oxide which does not perform an alloying reaction with lithium, such as cobalt oxide (CoO), nickel oxide (NiO), and iron oxide (FeO), may be used for the negative electrode active material. Furthermore, as the material which causes a conversion reaction, oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$ can be used.

The reaction potential of the negative electrode active material is preferably as low as possible, in which case the voltage of the power storage device can be high. On the other hand, when the potential is low, power of reducing an electrolytic solution is increased, so that, for example, an organic solvent or the like used in an electrolytic solution might be subjected to reductive decomposition. The range of potentials in which the electrolysis of an electrolytic solution does not occur is referred to as a potential window (potential window). Basically, the electrode potential of the negative electrode needs to be within a potential window of an electrolytic solution; however, the potentials of many active materials used for negative electrodes of lithium-ion secondary batteries and lithium-ion capacitors are out of the potential windows of almost all electrolytic solutions. Specifically, materials with low reaction potentials, such as graphite and silicon, have an advantage of capability of increasing the voltage of storage batteries but have a problem of being likely to cause the reductive decomposition of electrolytic solutions.

As the positive electrode active material, a material into and from which lithium ions can be inserted and extracted can be used; for example, a material having an olivine type structure, a layered rock-salt type structure, a spinel type structure, or a NASICON type crystal structure, or the like can be used.

For example, a compound such as $LiFeO_2$, $LiCoO_2$, $LiNiO_2$, $LiMn_2O_4$, $V_2O_5$, $Cr_2O_5$, or $MnO_2$ can be used as a material for the positive electrode active material.

Alternatively, lithium-containing complex phosphate (the general formula $LiMPO_4$ (M is one or more of Fe(II), Mn(II), Co(II), and Ni(II))) can be used. Typical examples of the general formula $LiMPO_4$ are lithium metal phosphate compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b is 1 or less, 0<a<1, 0<b<1), $LiFe_cNi_dCo_ePO_4$, $LiFe_cNi_dMn_ePO_4$, $LiNi_cCo_dMn_ePO_4$ (c+d+e is 1 or less, 0<c<1, 0<d<1, 0<e<1), and $LiFe_fNi_gCo_hMn_iPO_4$ (f+g+h+i is 1 or less, 0<f<1, 0<g<1, 0<h<1, 0<i<1).

Alternatively, lithium-containing complex silicate such as the general formula $Li_{(2-j)}MSiO_4$ (M is one or more of Fe(II), Mn(II), Co(II), and Ni(II), 0≤j≤2) can be used. Typical examples of the general formula $Li_{(2-j)}MSiO_4$ are lithium silicate compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l is 1 or less, 0<k<1, 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q is 1 or less, 0<m<1, 0<n<1, 0<q<1), and $Li_{(2-j)}Fe_rNi_sCo_tMn_uSiO_4$ (r+s+t+u is 1 or less, 0<r<1, 0<s<1, 0<t<1, 0<u<1).

Furthermore, a NASICON type compound expressed by the general formula $A_xM_2(XO_4)_3$ (A=Li, Na, Mg, M=Fe, Mn, Ti, V, Nb, Al, X=S, P, Mo, W, As, Si) can be used for the positive electrode active material. As the NASICON type compound, $Fe_2(MnO_4)_3$, $Fe_2(SO_4)_3$, $Li_3Fe_2(PO_4)_3$, and the like are given. Furthermore, a material, for example, a compound expressed by the general formula $Li_2MPO_4F$, $Li_2MP_2O_7$, or $Li_5MO_4$ (M=Fe, Mn), a perovskite fluoride such as $FeF_3$, a metal chalcogenide (a sulfide, a selenide, a telluride) such as $TiS_2$ and $MoS_2$, a material with an inverse spinel type structure such as $LiMVO_4$, vanadium oxides ($V_2O_5$, $V_6O_{13}$, $LiV_3O_8$, and the like), a manganese oxide, an organic sulfur compound, or the like can be used as the positive electrode active material.

In the case where carrier ions are alkali metal ions other than lithium ions, or alkaline-earth metal ions, a compound in which carriers such as an alkali metal (e.g., sodium and potassium) or an alkaline-earth metal (e.g., calcium, strontium, barium, beryllium, and magnesium) are substituted for lithium of the lithium compound, the lithium-containing complex phosphate, and the lithium-containing complex silicate may be used as the positive electrode active material.

The average particle size of the positive electrode active material is preferably, for example, greater than or equal to 5 nm and less than or equal to 50 μm.

Furthermore, for example, in the case where lithium-containing complex phosphate having an olivine type structure is used for the positive electrode active material, a lithium diffusion path is one-dimensional, so that lithium diffusion is slow. Thus, in the case of using lithium-containing complex phosphate having an olivine type structure, the average particle size of the positive electrode active material is, for example, preferably greater than or equal to 5 nm and less than or equal to 1 µm so that the charge and discharge rate is increased. Alternatively, the specific surface area of the positive electrode active material is, for example, preferably greater than or equal to 10 m$^2$/g and less than or equal to 50 m$^2$/g.

A positive electrode active material having an olivine structure is much less likely to be changed in the structure by charge and discharge and has a more stable crystal structure than, for example. an active material having a layered rock-salt crystal structure; thus, it is stable toward operation such as overcharge, and the use of it allows fabrication of a highly safe power storage device.

The negative electrode active material layer 505 and the positive electrode active material layer 502 may include a conductive additive. As the conductive additive, for example, natural graphite, artificial graphite such as mesocarbon microbeads, carbon fiber, and the like can be used. As carbon fiber, carbon fiber such as mesophase pitch-based carbon fiber and isotropic pitch-based carbon fiber can be used. Furthermore, as carbon fiber, carbon nanofiber, carbon nanotube, and the like can be used. Carbon nanotube can be formed by, for example, a vapor deposition method. Furthermore, as the conductive additive, a carbon material such as carbon black (acetylene black (AB) or the like) or graphene can be used. Furthermore, for example, metal powder or metal fiber of copper, nickel, aluminum, silver, gold, or the like, a conductive ceramic material, or the like can be used.

Flaky graphene has excellent electrical characteristics of high conductivity and excellent physical properties of flexibility and mechanical strength. For this reason, the use of graphene as the conductive additive can increase the points and the area where the active materials are in contact with each other.

Note that graphene in this specification includes single-layer graphene and multilayer graphene including two to hundred layers. Single-layer graphene refers to a sheet of one-atom-layer carbon molecules having π bonds. In addition, graphene oxide refers to a compound formed by oxidation of the above graphene. Note that when graphene oxide is reduced to form graphene, oxygen contained in the graphene oxide is not entirely released and part of the oxygen remains in graphene. When graphene contains oxygen, the proportion of oxygen, which is measured by XPS, is higher than or equal to 2 atomic % and lower than or equal to 20 atomic %, preferably higher than or equal to 3 atomic % and lower than or equal to 15 atomic %.

Furthermore, the negative electrode active material layer 505 and the positive electrode active material layer 502 preferably include a binder.

The binder preferably contains water-soluble polymers, for example. As the water-soluble polymers, for example, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, or ethylene-propylene-diene copolymer is preferably used. These rubber materials are more preferably used in combination with the aforementioned water-soluble polymers.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVdF), or polyacrylonitrile (PAN) is preferably used.

Two or more kinds of the above may be used in combination for the binder.

Next, methods for fabricating the negative electrode 506 and the positive electrode 503 are described.

[Fabricating Method of Negative Electrode]

First, a fabricating method of the negative electrode 506 is described.

First, a slurry for forming the negative electrode active material layer 505 is formed. The slurry can be formed in such a manner that the above-described negative electrode active material is used and a conductive additive, a binder, and the like are added thereto and mixed with a solvent, for example. Furthermore, as the solvent, for example, water or NMP (N-methyl-2-pyrrolidone) or the like can be used. Water is preferably used in terms of the safety and cost.

The mixing is performed with a mixer. Here, a variety of mixers can be used as the mixer. For example, a planetary mixer, a homogenizer, or the like can be used.

The negative electrode current collector 504 may be subjected to surface treatment. Examples of such surface treatment include corona discharge treatment, plasma treatment, undercoat treatment, and the like. The surface treatment can increase the wettability of the negative electrode current collector 504 with respect to the slurry. In addition, the adhesion between the negative electrode current collector 504 and the negative electrode active material layer 505 can be increased.

Here, the "undercoat" refers to a film formed over a current collector before application of a slurry onto the current collector for the purpose of reducing the interface resistance between an active material layer and the current collector or increasing the adhesion between the active material layer and the current collector. Note that the undercoat does not necessarily have a film shape, and may be formed in an island shape. In addition, the undercoat may serve as an active material to have capacity. For the undercoat, a carbon material can be used, for example. As the carbon material, for example, graphite, carbon black such as acetylene black and ketjen black (registered trademark), a carbon nanotube, and the like can be used.

Then, the formed slurry is applied onto the negative electrode current collector 504.

For the application, a blade method or the like can be used. Furthermore, a continuous coater or the like may be used for the application.

Here, the positive electrode 503 and the negative electrode 506 preferably include tab regions so that a plurality of stacked positive electrodes or a plurality of stacked negative electrodes are electrically connected to each other. Furthermore, a lead electrode is preferably electrically connected to the tab region. In at least part of the tab region, the current collector is preferably exposed.

Figure 11A:
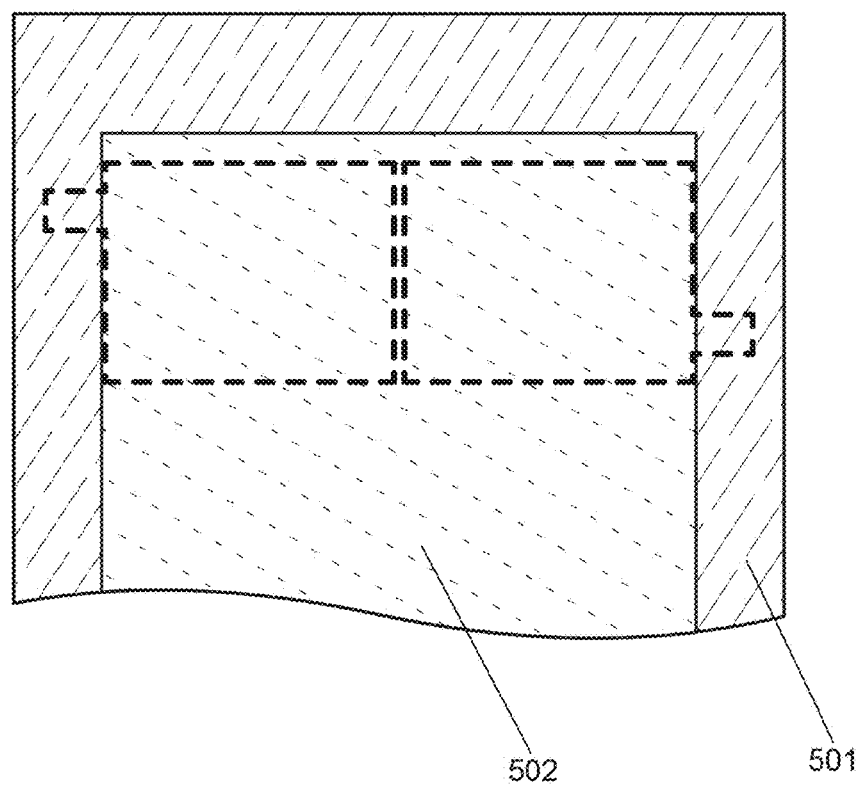
[FIG. 11] A diagram illustrating a method for fabricating an electrode.
Figure 11B:
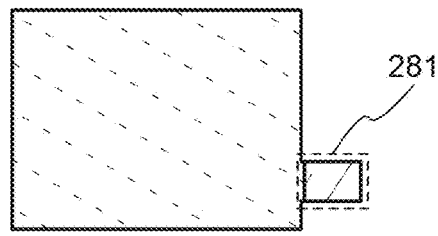

FIG. 11 illustrates an example of a method for providing the tab region. FIG. 11(A) illustrates the example where the positive electrode active material layer 502 is formed over the positive electrode current collector 501 that has a band-like shape. By performing cutting the positive electrode 503 as shown by dotted lines, the positive electrode 503 illustrated in FIG. 11(B) can be fabricated. The positive electrode 503 is fabricated in this manner, whereby the surface of the positive electrode current collector 501 can be exposed in at least part of the tab region 281. An example of the positive electrode 503 is described here, and the tab region 282 of the negative electrode 506 can be provided similarly.

Alternatively, to provide the tab region 281 and the tab region 282, the positive electrode active material layer 502 and the negative electrode active material layer 505 that are applied may be partly removed so that the current collectors are exposed.

Then, the slurry applied to the negative electrode current collector 504 is dried by a method such as ventilation drying or reduced pressure (vacuum) drying, whereby the negative electrode active material layer 505 is formed. The drying is preferably performed using, for example, a hot wind at a temperature higher than or equal to 30° C. and lower than or equal to 160° C. Note that there is no particular limitation on the atmosphere.

The thickness of the negative electrode active material layer 505 formed in such a manner is preferably greater than or equal to 5 µm and less than or equal to 300 µm, more preferably greater than or equal to 10 µm and less than or equal to 150 µm, for example. The active material load in the negative electrode active material layer 505 is preferably greater than or equal to 2 mg/cm$^2$ and less than or equal to 50 mg/cm$^2$, for example.

Furthermore, the negative electrode active material layer 505 is formed on each of the surfaces of the negative electrode current collector 504 but is not limited to this. The negative electrode active material layer 505 may be formed on only one surface of the negative electrode current collector 504 as long as a coating film is formed so as to face the negative electrode active material layer 505 with the negative electrode current collector 504 sandwiched therebetween.

The negative electrode active material layer 505 may be pressed by a compression method such as a roll press method or a flat plate press method so as to be consolidated.

Through the above steps, the negative electrode 506 can be fabricated.

Note that the negative electrode active material layer 505 may be predoped (hereinafter, predoping). There is no particular limitation on the method for predoping the negative electrode active material layer 505. For example, it can be predoped electrochemically. For example, before the battery is assembled, the negative electrode active material layer 505 can be predoped with lithium in an electrolytic solution described later with the use of a lithium metal as a counter electrode.

[Fabricating Method of Positive Electrode]

Next, a fabricating method of the positive electrode 503 is described. For the fabricating method of the positive electrode 503, the fabricating method of the negative electrode 506 can be referred to.

First, a slurry for forming the positive electrode active material layer 502 is formed. The slurry can be formed in such a manner that the above-described positive electrode active material is used and a conductive additive, a binder, and the like are added thereto and mixed with a solvent, for example. As the solvent, the solvent described for the negative electrode active material layer 505 can be used.

The mixing is performed with a mixer as in the case of the negative electrode.

The positive electrode current collector 501 may be subjected to surface treatment as in the case of the negative electrode.

Then, the positive electrode slurry is applied onto the current collector.

Then, the slurry applied onto the positive electrode current collector 501 is dried by a method such as ventilation drying or reduced pressure (vacuum) drying, whereby the positive electrode active material layer 502 is formed. The drying is preferably performed using, for example, a hot wind at a temperature higher than or equal to 50° C. and lower than or equal to 160° C. Note that there is no particular limitation on the atmosphere.

Note that the positive electrode active material layer 502 may be formed over both surfaces or only one surface of the positive electrode current collector 501. Alternatively, partly, a region in which the positive electrode active material layer 502 is formed over both surfaces may be provided.

The positive electrode active material layer 502 may be pressed by a compression method such as a roll press method or a flat plate press method so as to be consolidated.

Through the above steps, the positive electrode active material layer 502 can be fabricated.

The thickness of the positive electrode active material layer 502 formed in such a manner is preferably greater than or equal to 5 µm and less than or equal to 300 µm, more preferably greater than or equal to 10 µm and less than or equal to 150 µm, for example. The active material load in the positive electrode active material layer 502 is preferably greater than or equal to 2 mg/cm$^2$ and less than or equal to 50 mg/cm$^2$, for example.

Here, the positive electrode active material layer 502 preferably contains graphene. Graphene is capable of making low-resistance surface contact and has extremely high conductivity even with a small thickness. Therefore, even a small amount of graphene can efficiently form a conductive path in an active material layer.

For example, in the case of using lithium-containing complex phosphate with an olivine type structure for the positive electrode active material, a lithium diffusion path is one-dimensional, so that lithium diffusion is slow. The average particle size of the active material is, for example, preferably greater than or equal to 5 nm and less than or equal to 1 µm so that the charge and discharge rate is increased. Alternatively, the specific surface area of the active material is, for example, preferably greater than or equal to 10 m$^2$/g and less than or equal to 50 m$^2$/g.

In the case where such an active material with a small average particle size, for example, an active material with an average particle size of 1 µm or less is used, the specific surface area of the active material is large and thus more conductive paths for connecting the active materials are needed. In such a case, it is particularly preferred that graphene with extremely high conductivity that can efficiently form a conductive path even in a small amount be used.

Next, a method for fabricating the positive electrode 503 is described.

Figure 12:
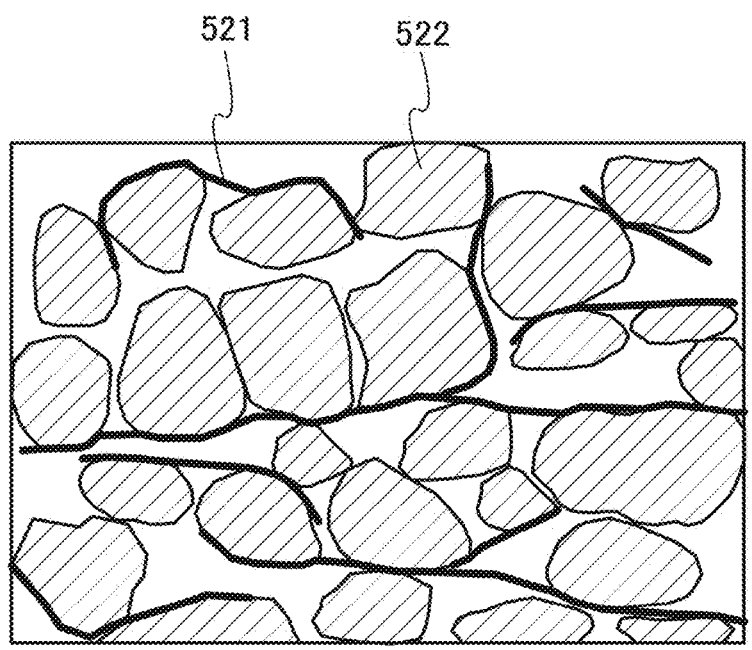
[FIG. 12] A diagram illustrating a cross-sectional view of a positive electrode active material layer.

FIG. 12 shows a longitudinal cross-sectional view of the positive electrode active material layer 502. The positive electrode active material layer 502 includes positive electrode active materials 522 in the form of particles, graphenes 521 as a conductive additive, and a binder (also referred to as a binder, not illustrated).

The sheet-like graphenes 521 are dispersed substantially uniformly in the positive electrode active material layer 502 as illustrated in FIG. 12 in the longitudinal cross section of the positive electrode active material layer 502. The graphenes 521 are schematically shown by thick lines in FIG. 12 but are actually thin films having a thickness of a single layer or a multi-layer of carbon molecules. The plurality of graphenes 521 are formed in such a way as to wrap, coat, or adhere onto the surfaces of the plurality of positive electrode active materials 522 in the form of particles, so that the graphenes 521 make surface contact with the positive electrode active materials 522 in the form of particles. Furthermore, the graphenes 521 are also in surface contact with each other; consequently, the plurality of graphenes 521 form a three-dimensional network for electric conduction.

This is because graphene oxide with extremely high dispersibility in a polar solvent is used for the formation of the graphenes 521. The solvent is volatilized and removed from a dispersion medium containing graphene oxide that is uniformly dispersed, and the graphene oxide is reduced to graphene; hence, the graphenes 521 remaining in the positive electrode active material layer 502 partly overlap with each other and are dispersed such that surface contact is made, thereby forming an electrical conduction path.

Thus, unlike a conventional conductive additive in the form of particles, such as acetylene black, which makes point contact with an active material, the graphene 521 is capable of making low-resistance surface contact; accordingly, the electrical conduction between the positive electrode active materials 522 in the form of particles and the graphenes 521 can be improved without an increase in the amount of a conductive additive. Thus, the proportion of the positive electrode active materials 522 in the positive electrode active material layer 502 can be increased. This can increase the discharge capacity of a storage battery.

Although the example of using graphene for the positive electrode is described, graphene may also be used for the negative electrode.

In the case where the positive electrode active material layer 502 includes a binder, the binder described above is used. Here, for example, PVdF has high resistance to oxidation and is stable even in the case where the reaction potential of the positive electrode is high particularly in the battery reaction of the positive electrode. Furthermore, for example, water-soluble polymers have high dispensability and can be evenly dispersed with small active material s. Thus, water-soluble polymers can function even in a smaller amount. Furthermore, a film containing water-soluble polymers that covers or is in contact with the surface of an active material can inhibit the decomposition of an electrolytic solution.

Note that graphene oxide is included at 0.1 wt % to 10 wt % inclusive, preferably 0.1 wt % to 5 wt % inclusive, more preferably 0.2 wt % to 1 wt % inclusive with respect to the total weight of the mixture of the graphene oxide, the positive electrode active material, the conductive additive, and the binder. In contrast, graphene obtained after the positive electrode paste is applied to a current collector and reduction is performed is included at least at 0.05 wt % to 5 wt % inclusive, preferably 0.05 wt % to 2.5 wt % inclusive, more preferably 0.1 wt % to 0.5 wt % inclusive with respect to the total weight of the positive electrode active material layer. This is because the weight of graphene is reduced to approximately half that of the graphene oxide by reducing graphene oxide.

Note that a polar solvent may be further added after the mixing to adjust the viscosity of the mixture. Mixing and addition of a polar solvent may be repeated more than once.

The positive electrode active material layer 502 may be pressed by a compression method such as a roll press method or a flat plate press method so as to be consolidated.

Next, an example of a method for fabricating a positive electrode in which graphene is used as a conductive additive is described. First, an active material, a binder, and graphene oxide are prepared.

The graphene oxide is a raw material of the graphenes 521 that serves as a conductive additive later. Graphene oxide can be formed by various synthesis methods such as a Hummers method, a Modified Hummers method, and oxidation of graphite. Note that a method for fabricating a storage battery electrode relating to the present invention is not limited by the degree of separation of graphene oxide.

For example, the Hummers method is a method for forming graphite oxide by oxidizing graphite such as scaly graphite. The formed graphite oxide is graphite that is oxidized in places and thus to which a functional group such as a carbonyl group, a carboxyl group, or a hydroxyl group is bonded. The crystallinity of the graphite is lost and the distance between layers is increased. Therefore, the layers can be easily separated by ultrasonic treatment or the like to obtain graphene oxide.

Furthermore, the length of one side (also referred to as a flake size) of the graphene oxide is greater than or equal to 50 nm and less than or equal to 100 µm, preferably greater than or equal to 800 nm and less than or equal to 20 µm. Particularly in the case where the flake size is smaller than the average particle size of the positive electrode active materials in the form of particles, the surface contact with a plurality of the positive electrode active materials 522 and connection between graphenes become difficult, resulting in difficulty in improving the electrical conductivity of the positive electrode active material layer 502.

A positive electrode paste is formed by adding a solvent to such graphene oxide described above, an active material, and a binder. As the solvent, water or a polar organic solvent such as N-methylpyrrolidone (NMP) or dimethylformamide can be used.

With the use of the active material layer including the active materials in the form of particles, graphene, and the binder in such a manner, a sheet-like graphene and the alloy-based material in the form of particles have two-dimensional contact to wrap the alloy-based material, and graphenes also have two-dimensional contact to overlap with each other; thus, an extensive network of three-dimensional electric conduction paths is established in the active material layer. For this reason, in contrast to the case where acetylene black (AB) or ketjen black (KB: registered trademark) in the form of particles, which are conventionally used as a conductive additive and have an electrical point contact, it is possible to form an active material layer with high electric conductivity.

Furthermore, graphene is preferably used because even in the case of using, for example, an active material with a small particle size, the conductive path can be maintained even after charges and discharges are repeatedly performed and favorable cycle characteristics can be achieved.

Furthermore, graphenes are bonded to each other, whereby net-like graphene (hereinafter referred to as a graphene net) can be formed. The graphene net covering the active material can function as a binder for binding particles. The amount of a binder can thus be reduced, or the binder does not have to be used. Therefore, the proportion of the active material in the electrode volume or electrode weight can be increased. That is to say, the capacity of the power storage device can be increased.

Then, graphene oxide is preferably reduced. The reduction can be performed by heat treatment or with the use of a reducing agent, for example.

An example of a reducing method using a reducing agent is described below. First, a reaction is caused in a solvent containing a reducing agent. Through this step, the graphene oxide contained in the active material layer is reduced to form the graphenes 521. Note that oxygen contained in the graphene oxide is not necessarily entirely released and may partly remain in the graphene. When the graphenes 521 contain oxygen, the proportion of oxygen in all the graphenes measured by XPS is higher than or equal to 2 atomic % and lower than or equal to 20 atomic %, preferably higher than or equal to 3 atomic % and lower than or equal to 15 atomic %. This reduction treatment is preferably performed at a temperature higher than or equal to room temperature and lower than or equal to 150° C.

As the reducing agent, ascorbic acid, hydrazine, dimethyl hydrazine, hydroquinone, sodium boron hydride ($NaBH_4$), tetra butyl ammonium bromide (TBAB), $LiAlH_4$, ethylene glycol, polyethylene glycol, N,N-diethylhydroxylamine, and a derivative thereof can be used.

A polar solvent can be used as the solvent. The material is not limited as long as it can dissolve the reducing agent. For example, one kind of water, methanol, ethanol, acetone, tetrahydrofuran (THF), dimethylformamide (DMF), N-methylpyrrolidone (NMP), and dimethyl sulfoxide (DMSO), or a mixed solution of two or more kinds can be used.

After that, washing and drying are performed. The drying is preferably performed under a reduced pressure (in vacuum) or in a reduction atmosphere. The drying step is preferably performed, for example, in vacuum at a temperature higher than or equal to 50° C. and lower than or equal to 160° C. for longer than or equal to 10 minutes and shorter than or equal to 48 hours. The drying allows evaporation, volatilization, or removal of the polar solvent and moisture in the positive electrode active material layer 502. The drying may be followed by pressing.

Alternatively, drying may be performed using a drying furnace or the like. In the case of using a drying furnace, drying is performed at a temperature of 30° C. to 200° C. inclusive for longer than or equal to 30 seconds and shorter than or equal to 20 minutes, for example. Alternatively, the temperature may be increased in stages.

Note that heating can facilitate the reduction reaction using the reducing agent. In addition, after drying following the chemical reduction, heating may further be performed.

In the case of not performing reduction with the use of a reducing agent, reduction can be performed by heat treatment. For example, it can be performed under a reduced pressure (in vacuum) at a temperature higher than or equal to 150° C. for longer than or equal to 0.5 hours and shorter than or equal to 30 hours.

Through the above steps, the positive electrode active material layer 502 in which the graphenes 521 are uniformly dispersed to the positive electrode active materials 522 can be formed.

Here, reduction is preferably performed on an electrode using graphene oxide. It is more preferred that reduction be performed using the condition that thermal reduction is performed after chemical reduction. Here, in thermal reduction, oxygen atoms are released in the form of, for example, carbon dioxide. In contrast, in chemical reduction, reduction is performed using a chemical reaction, whereby the proportion of carbon atoms that form a $sp^2$ bond of graphene can be increased. Furthermore, thermal reduction is preferably performed after chemical reduction, in which case the conductivity of formed graphene can be further increased.

Furthermore, the use of $LiFePO_4$ for the positive electrode allows fabrication of a highly safe storage battery that is stable to an external load such as overcharge. Thus, it is particularly excellent as a storage battery used for, for example, a mobile device to be carried, a wearable device to be worn on a body, and the like.

Here, the ratio of the total capacity of a positive electrode of a storage battery to the total capacity of a negative electrode of the storage battery is described. R defined by Mathematical Formula (5) below is the ratio of positive electrode capacity/negative electrode capacity. Here, positive electrode capacity means the total capacity of the positive electrode of the storage battery, and negative electrode capacity means the total capacity of the negative electrode of the storage battery.

[Mathematical Formula 5]

$$R = \frac{\text{positive electrode capacity}}{\text{negative electrode capacity}} \times 100[\%] \quad (5)$$

Here, for example, the theoretical capacity or the like may be used for calculation of the positive electrode capacity and the negative electrode capacity. Alternatively, capacity based on a measured value, or the like, may be used. For example, in the case where $LiFePO_4$ and graphite are used, 170 mAh/g and 372 mAh/g are used as respective capacities per weight of active material.

This embodiment can be implemented in combination with the other embodiments as appropriate.

Embodiment 4

In this embodiment, a variety of modes of power storage devices using one embodiment of the present invention are described.

[Structural Example of Storage Battery Using Wound Body]

Figure 13A:
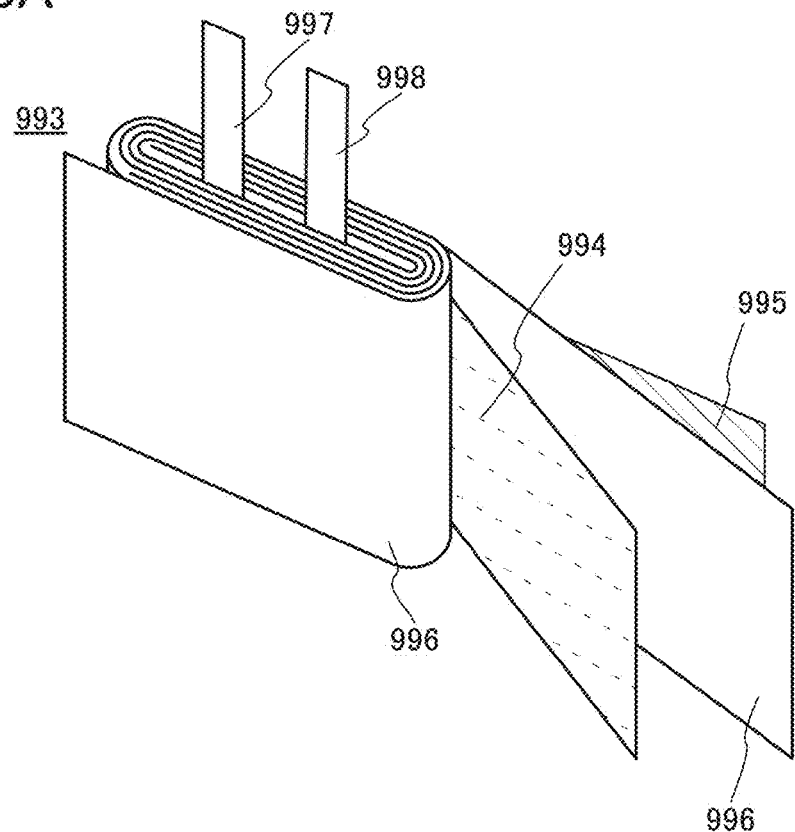
[FIG. 13] A diagram showing an example of a power storage device.

Next, FIG. 13 and FIG. 14 illustrate structural examples of a storage battery using a wound body that is a power storage device using one embodiment of the present invention. A wound body 993 illustrated in FIG. 13 includes a negative electrode 994, a positive electrode 995, and a separator 996.

The wound body 993 is obtained by winding a sheet of a stack in which the negative electrode 994 overlaps with the positive electrode 995 with the separator 996 sandwiched therebetween. The wound body 993 is covered with a square-type sealed container or the like; thus, a square-type secondary battery is fabricated.

Note that the number of stacks including the negative electrode 994, the positive electrode 995, and the separator 996 is designed as appropriate depending on capacity and element volume which are required. The negative electrode 994 is connected to a negative electrode current collector (not illustrated) via one of a lead electrode 997 and a lead electrode 998, and the positive electrode 995 is connected to a positive electrode current collector (not illustrated) via the other of the lead electrode 997 and the lead electrode 998.

Figure 13B:
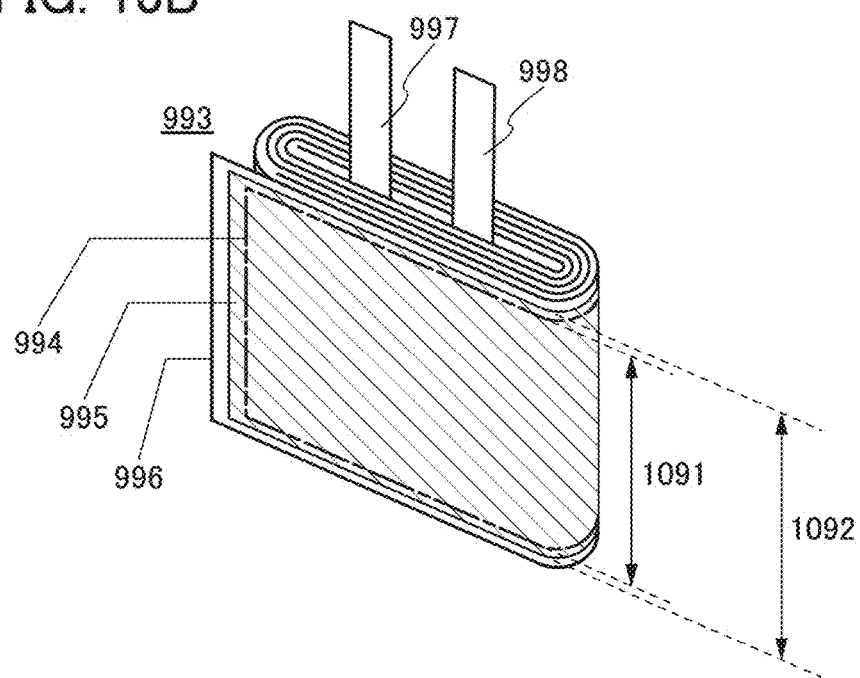

Here, the area of a region where the negative electrode 994 does not overlap with the positive electrode 995 is preferably as small as possible. FIG. 13(B) illustrates the example where a width 1091 of the negative electrode 994 in the wound body 993 is smaller than a width 1092 of the positive electrode 995. In addition, an end portion of the negative electrode 994 is located inward from the positive electrode 995. With such a structure, the negative electrode 994 can entirely overlap with the positive electrode 995 or the area of a region where the negative electrode 994 and the positive electrode 995 do not overlap with each other can be reduced.

Furthermore, in the case where the area of the positive electrode 995 is too larger than that of the negative electrode 994, an excess portion of the positive electrode 995 is large, which reduces the capacity of a storage battery per volume, for example. Thus, in the case where the end portion of the negative electrode 994 is located inward from the end portion of the positive electrode 995, the distance between the end portion of the positive electrode 995 and the end portion of the negative electrode 994 is preferably 3 mm or less, more preferably 0.5 mm or less, still more preferably 0.1 mm or less. Alternatively, the difference between the widths of the positive electrode 995 and the negative electrode 994 is preferably 6 mm or less, more preferably 1 mm or less, still more preferably 0.2 mm or less.

Alternatively, it is preferred that the widths 1091 and 1092 be approximately equal values and the end portion of the negative electrode 994 be substantially aligned with the end portion of the positive electrode 995.

Furthermore, when the negative electrode 994 has a structure in which a pair of negative electrode active material layers facing each other with a negative electrode current collector sandwiched therebetween is provided, a region where the negative electrode current collector is in contact with an electrolytic solution is reduced, which allows the first reaction to occur appropriately while inhibiting the second reaction described above.

Furthermore, the second reaction might cause formation of a coating film on the surface of the negative electrode. The formed coating film serves as a passivating film in some cases. This passivating film may allow inhibition of a further decomposition reaction of ions other than lithium ions by charge or discharge. Accordingly, the coating film may be able to inhibit a decrease in the capacity of the power storage device.

Figure 14A:
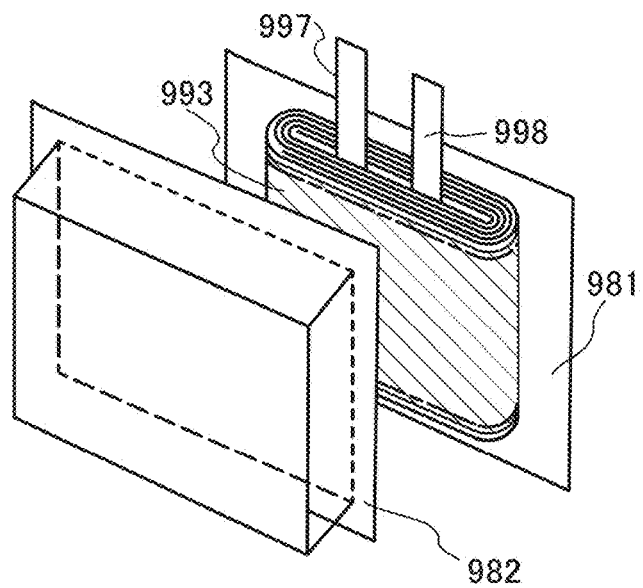
[FIG. 14] A diagram showing an example of a power storage device.
Figure 14B:
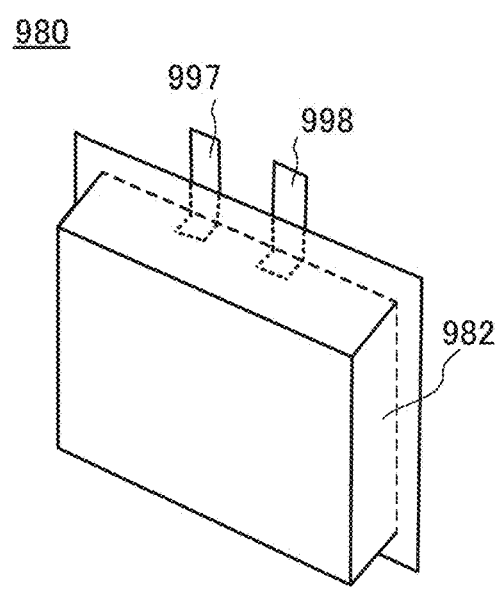

In a storage battery 990 illustrated in FIGS. 14(A) and 14(B), the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is impregnated with an electrolytic solution inside the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied, and a flexible storage battery can be fabricated.

Furthermore, although FIGS. 14(A) and 14(B) illustrate an example of using two films, the wound body 993 may be placed in a space formed by bending one film.

Furthermore, a flexible power storage device in which a resin material or the like is used for an exterior body and a sealed container can be fabricated instead of a power storage device in which only a thin storage battery has flexibility. However, in the case where a resin material is used for the exterior body and the sealed container, a conductive material is used for a portion connected to the outside.

Figure 15A:
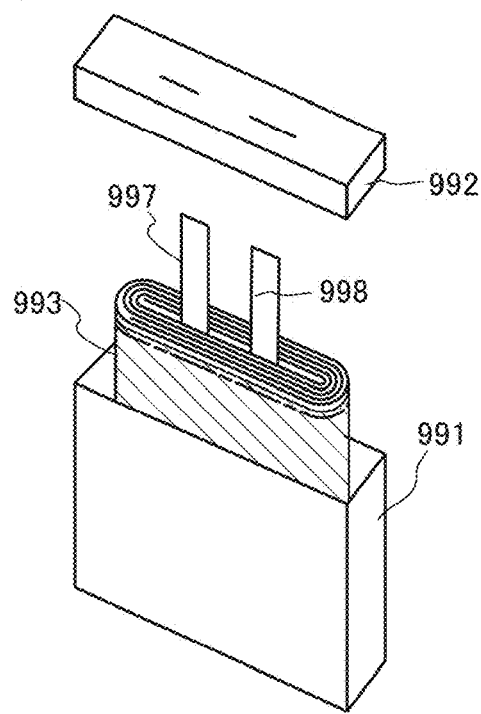
[FIG. 15] A diagram showing an example of a power storage device.

FIG. 15 illustrates an example of a thin storage battery that is different from FIG. 14. The wound body 993 illustrated in FIG. 15(A) is the same as that illustrated in FIG. 13 and FIG. 14(A), and the detailed description thereof is omitted.

Figure 15B:
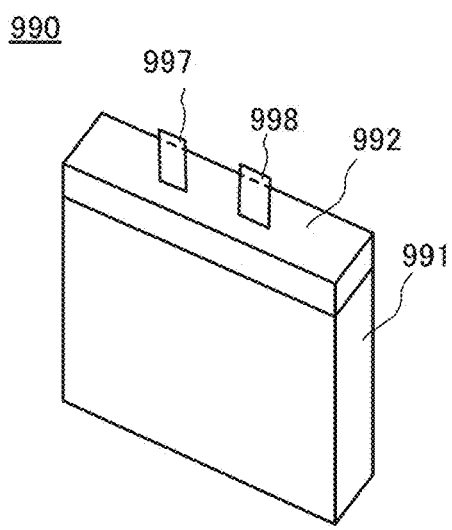

In the storage battery 990 illustrated in FIGS. 15(A) and 15(B), the wound body 993 is packed in an exterior body 991. The wound body 993 includes the lead electrode 997 and the lead electrode 998, and is impregnated with an electrolytic solution inside the exterior body 991 and an exterior body 992. For example, a metal material such as aluminum or a resin material can be used for the exterior bodies 991 and 992. With the use of a resin material as a material of the exterior bodies 991 and 992, the exterior bodies 991 and 992 can be changed in their forms when external force is applied, and a flexible thin storage battery can be fabricated.

[Cylindrical Storage Battery]

Figure 16A:
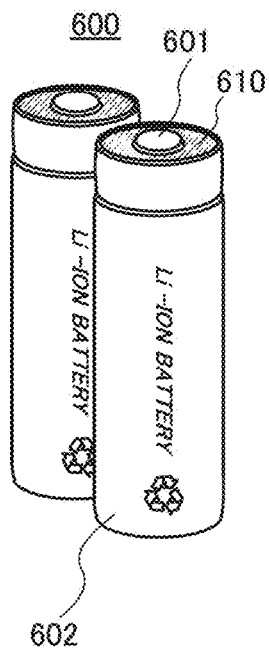
[FIG. 16] A diagram illustrating a cylindrical storage battery.

Next, a cylindrical storage battery is shown as an example of a power storage device using a wound body as in FIG. 13 to FIG. 15. The cylindrical storage battery is described with reference to FIG. 16. As illustrated in FIG. 16(A), a cylindrical storage battery 600 includes a positive electrode cap (battery cap) 601 on the top surface and a battery can (outer can) 602 on the side surface and bottom surface. The positive electrode cap and the battery can (outer can) 602 are insulated from each other by a gasket (insulating gasket) 610.

Figure 16B:
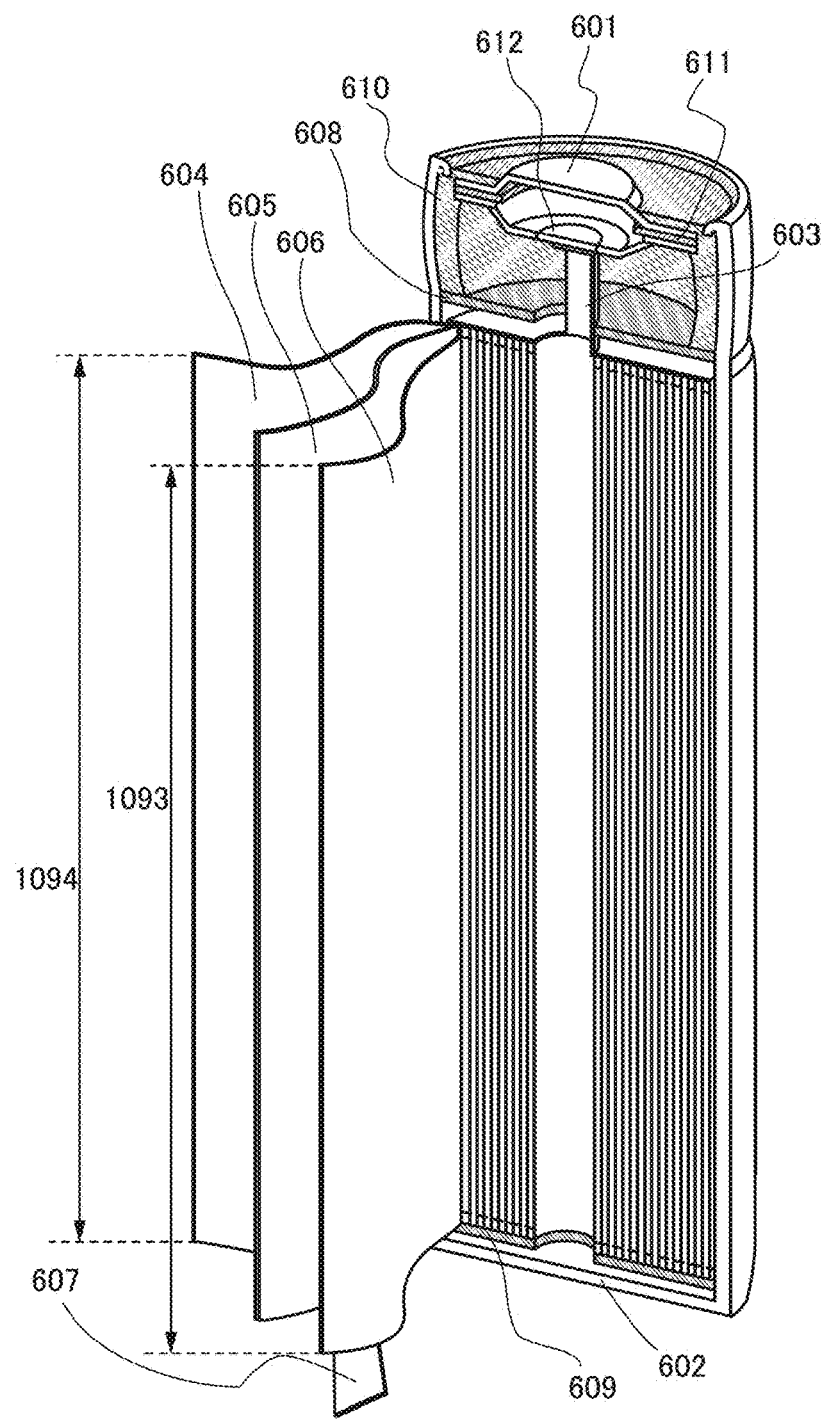

FIG. 16(B) is a diagram schematically illustrating a cross section of the cylindrical storage battery. Inside the battery can 602 having a hollow cylindrical shape, a battery element in which a strip-like positive electrode 604 and negative electrode 606 are wound with a separator 605 sandwiched therebetween is provided. Although not illustrated, the battery element is wound around a center pin. One end of the battery can 602 is close and the other end thereof is open. For the battery can 602, a metal having a corrosion-resistant property to an electrolytic solution, such as aluminum or titanium, an alloy of these, or an alloy of these and another metal (e.g., stainless steel or the like) can be used. Furthermore, covering with aluminum or the like is preferably performed in order to prevent corrosion due to the electrolytic solution. Inside the battery can 602, the battery element in which the positive electrode, the negative electrode, and the separator are wound is sandwiched between a pair of insulating plates 608 and 609 which face each other. Furthermore, a nonaqueous electrolytic solution (not illustrated) is injected inside the battery can 602 provided with the battery element. A nonaqueous electrolytic solution that is similar to those of the coin-type storage battery can be used.

The positive electrode 604 and the negative electrode 606 can be fabricated in a manner similar to that of the positive electrode and the negative electrode of the thin storage battery described above. Furthermore, since the positive electrode and the negative electrode used for the cylindrical storage battery are wound, active materials are preferably formed on both surfaces of the current collectors. A positive electrode terminal (positive electrode current collecting lead) 603 is connected to the positive electrode 604, and a negative electrode terminal (negative electrode current collecting lead) 607 is connected to the negative electrode 606. For both the positive electrode terminal 603 and the negative electrode terminal 607, a metal material such as aluminum can be used. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC (Positive Temperature Coefficient) element 611. The safety valve mechanism 612 cuts off electrical connection between the positive electrode cap 601 and the positive electrode 604 when the internal pressure of the battery exceeds a predetermined threshold value. Furthermore, the PTC element 611, which serves as a thermally sensitive resistor element whose resistance increases as temperature rises, limits the amount of current by increasing the resistance, in order to prevent abnormal heat generation. Barium titanate ($BaTiO_3$)-based semiconductor ceramic can be used for the PTC element.

Here, the area where the negative electrode 606 does not overlap with the positive electrode 604 is preferably as small as possible. For example, an end portion of the negative electrode 994 is located inward from an end portion of the positive electrode 995. Furthermore, the distance between the end portion of the positive electrode 604 and the end portion of the negative electrode 606 is preferably 3 mm or less, more preferably 0.5 mm or less, still more preferably 0.1 mm or less. Alternatively, the difference between a width 1093 of the positive electrode 604 and a width 1094 of the negative electrode 606 is preferably 6 mm or less, more preferably 1 mm or less, still more preferably 0.2 mm or less.

Alternatively, it is preferred that the widths 1093 and 1094 be approximately equal values and the end portion of the negative electrode 606 be substantially aligned with the end portion of the positive electrode 604.

Furthermore, when the negative electrode 994 has a structure in which a pair of negative electrode active material layers facing each other with a negative electrode current collector sandwiched therebetween is provided, a region where the negative electrode current collector is in contact with an electrolytic solution is reduced, which allows the first reaction to occur appropriately while inhibiting the second reaction described above Furthermore, the second reaction might cause formation of a coating film on the surface of the negative electrode. The formed coating film serves as a passivating film in some cases. This passivating film may allow inhibition of a further decomposition reaction of ions other than lithium ions by charge or discharge. Accordingly, the coating film may be able to inhibit a decrease in the capacity of the power storage device.

[Coin-Type Storage Battery]

Figure 17A:
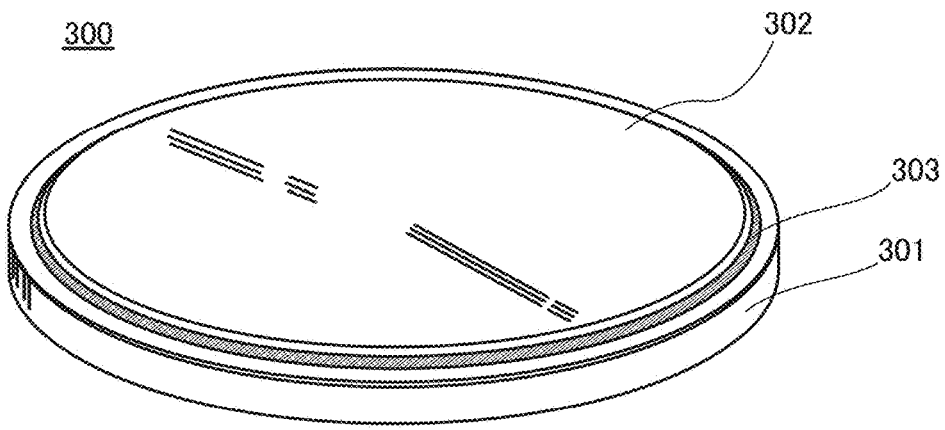
[FIG. 17] A diagram illustrating a coin-type storage battery.
Figure 17B:
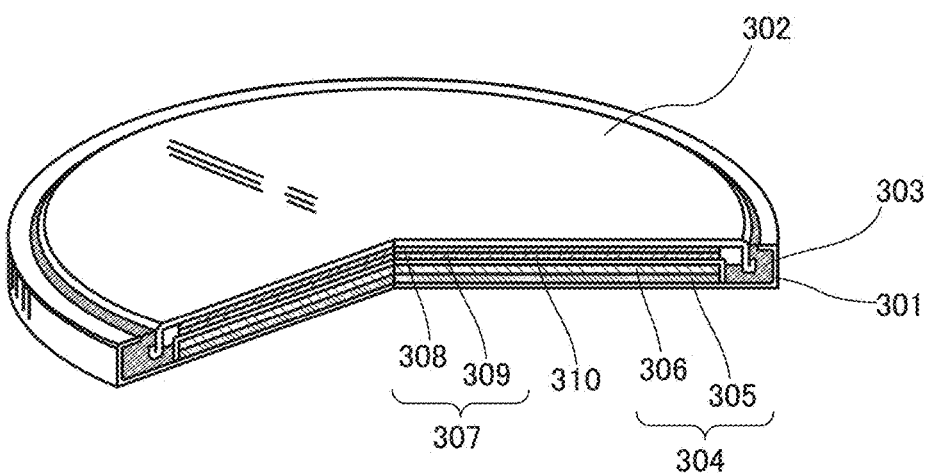
Figure 17C:
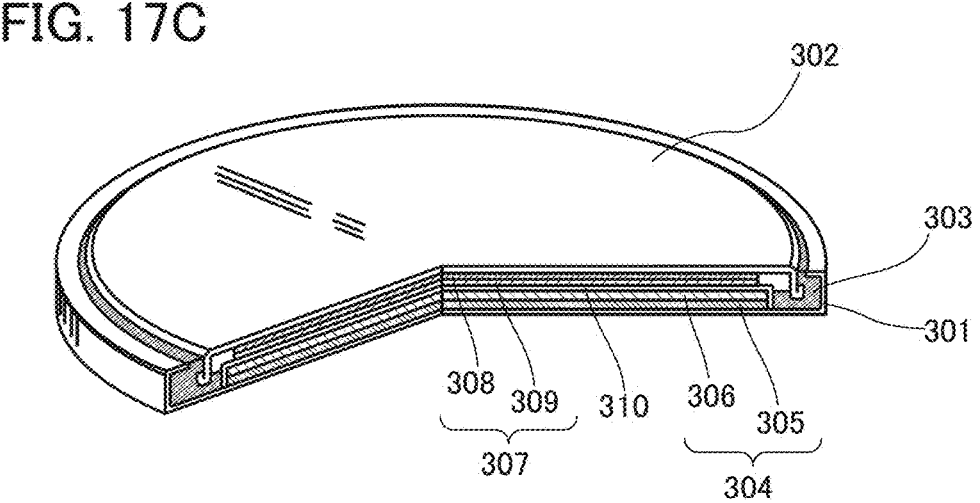

Next, an example of a coin-type storage battery, which is a power storage device using one embodiment of the present invention, is described as an example of a power storage device using FIG. 17. FIG. 17(A) is an external view of a coin-type (single-layer flat type) storage battery, and FIGS. 17(B) and 17(C) are examples of cross-sectional views thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The description of the positive electrode active material layer 502 can be referred to for the positive electrode active material layer 306.

Furthermore, a negative electrode 307 is formed with a negative electrode current collector 308 and a negative electrode active material layer 309 provided in contact with the negative electrode current collector 308. The description of the negative electrode active material layer 505 can be referred to for the negative electrode active material layer 309. In addition, the description of the separator 507 can be referred to for the separator 310. In addition, the description of the electrolytic solution 508 can be referred to for the electrolytic solution.

Note that only one surface of each of the positive electrode 304 and the negative electrode 307 used for the coin-type storage battery 300 is provided with an active material layer.

It is preferred that the shape and area of the positive electrode 304 be preferably substantially the same as those of the negative electrode 307 and an end portion of the positive electrode 304 be substantially aligned with an end portion of the negative electrode 307. FIG. 17(B) illustrates an example where the end portion of the positive electrode 304 is aligned with the end portion of the negative electrode 307.

Alternatively, it is preferred that the area of the negative electrode 307 be larger than that of the positive electrode 304 and the end portion of the positive electrode 304 be located inward from the end portion of the negative electrode 307. FIG. 17(C) illustrates an example where the end portion of the positive electrode 304 is located inward from the end portion of the negative electrode 307.

For the positive electrode can 301 and the negative electrode can 302, a metal having a corrosion-resistant property to an electrolytic solution, such as aluminum or titanium, an alloy of these, or an alloy of these and another metal (e.g., stainless steel or the like) can be used. Furthermore, covering with aluminum or the like is preferably performed in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are impregnated with the electrolytic solution and as illustrated in FIGS. 17(B) and 17(C), the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 sandwiched therebetween, so that the coin-type storage battery 300 can be fabricated.

Note that in this embodiment, the coin-type storage battery, the cylindrical storage battery, and the thin storage battery are shown as storage batteries; however, other storage batteries with a variety of shapes, such as a sealed storage battery and a square-type storage battery, can be used. Furthermore, a structure in which a plurality of positive electrodes, negative electrodes, and separators are stacked or a structure in which a positive electrode, a negative electrode, and a separator are wound may be employed.

[Structural Example of Power Storage System]

Structural examples of power storage systems are described using FIG. 18, FIG. 19, and FIG. 20. Here, a power storage system refers to, for example, a device including a power storage device. The power storage system described in this embodiment includes a storage battery that is a power storage device using one embodiment of the present invention.

Figure 18A:
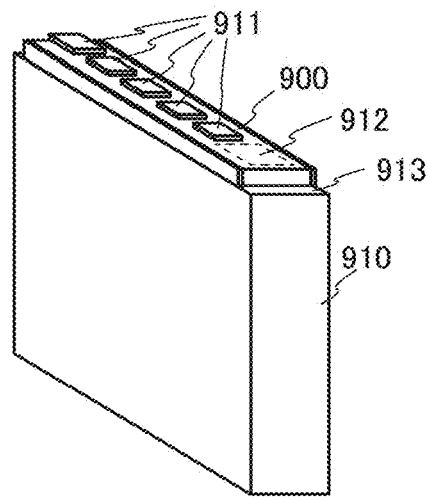
[FIG. 18] A diagram illustrating an example of a power storage system.
Figure 18B:
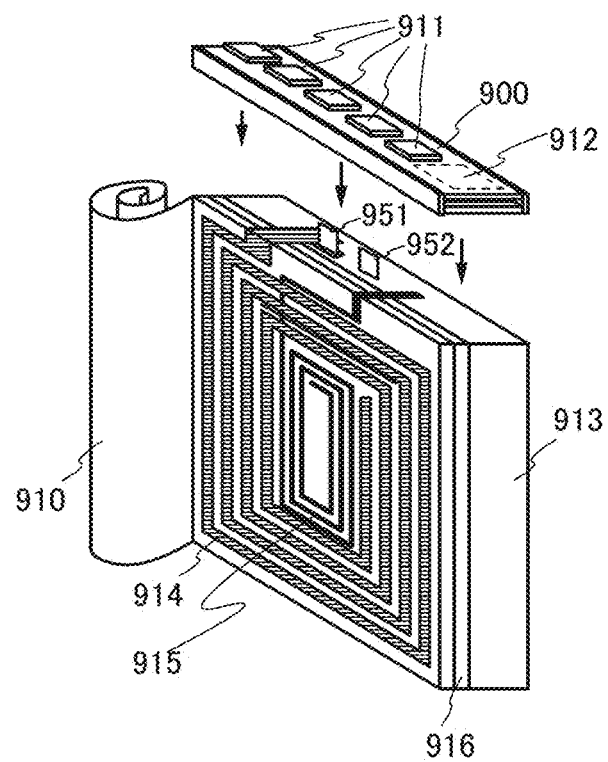

FIGS. 18(A) and 18(B) are views showing external views of a power storage system. The power storage system includes a circuit board 900 and a storage battery 913. A label 910 is attached to the storage battery 913. As shown in FIG. 18(B), the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 may be provided to serve as a control signal input terminal, a power supply terminal, and the like.

The circuit 912 may be provided on the rear surface of the circuit board 900. Note that the shape of each of the antennas 914 and 915 is not limited to a coil shape and may be a linear shape or a plate shape. Further, an antenna such as a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors included in a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the antennas 914 and 915 and the storage battery 913. The layer 916 has a function of shielding an electromagnetic field by the storage battery 913. As the layer 916, for example, a magnetic body can be used.

Note that the structure of the power storage system is not limited to FIG. 18.

For example, as shown in FIGS. 19(A-1) and 19(A-2), a pair of opposite surfaces of the storage battery 913 illustrated in FIGS. 18(A) and 18(B) may be provided with respective antennas. FIG. 19(A-1) is an external view from the direction of one side of the pair of surfaces, and FIG. 19(A-2) is an external view from the direction of the other side of the pair of surfaces. Note that for portions similar to those in FIGS. 18(A) and 18(B), the description of the power storage system illustrated in FIGS. 18(A) and 18(B) can be referred to as appropriate.

As illustrated in FIG. 19(A-1), the antenna 914 is provided on one of the pair of surfaces of the storage battery 913 with the layer 916 sandwiched therebetween, and as illustrated in FIG. 19(A-2), the antenna 915 is provided on the other of the pair of surfaces of the storage battery 913 with a layer 917 sandwiched therebetween. The layer 917 may have a function of shielding an electromagnetic field by the storage battery 913. As the layer 917, for example, a magnetic body can be used.

With the above structure, both of the antennas 914 and 915 can be increased in size.

Alternatively, as illustrated in FIGS. 19(B-1) and 19(B-2), a pair of opposite surfaces of the storage battery 913 illustrated in FIGS. 18(A) and 18(B) may be provided with different antennas. FIG. 19(B-1) is an external view from the direction of one side of the pair of surfaces, and FIG. 19(B-2) is an external view from the direction of the other side of the pair of surfaces. Note that for portions similar to those in the power storage system illustrated in FIGS. 18(A) and 18(B), the description of the power storage system illustrated in FIGS. 18(A) and 18(B) can be referred to as appropriate.

As illustrated in FIG. 19(B-1), the antennas 914 and 915 are provided on one of the pair of surfaces of the storage battery 913 with the layer 916 sandwiched therebetween, and as illustrated in FIG. 19(A-2), an antenna 918 is provided on the other of the pair of surfaces of the storage battery 913 with the layer 917 sandwiched therebetween. The antenna 918 has a function of communicating data with an external device, for example. An antenna with a shape that can be applied to the antennas 914 and 915, for example, can be applied as the antenna 918. As a system for communication using the antenna 918 between the power storage system and another device, a response method that can be used between the power storage system and another device, such as NFC, can be applied.

Figure 20A:
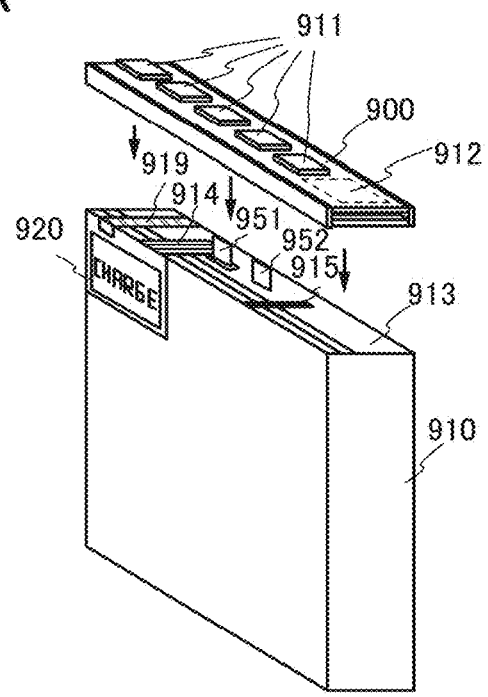
[FIG. 20] A diagram illustrating an example of a power storage system.

Alternatively, as illustrated in FIG. 20(A), the storage battery 913 illustrated in FIGS. 18(A) and 18(B) may be provided with a display device 920. The display device 920 is electrically connected to the terminal 911 via a terminal 919. Note that it is possible that the label 910 is not provided in a portion where the display device 920 is provided. Note that for portions similar to those of the power storage system illustrated in FIGS. 18(A) and 18(B), the description of the power storage system illustrated in FIGS. 18(A) and 18(B) can be referred to as appropriate.

The display device 920 may display, for example, an image showing whether charge is being carried out, an image showing the amount of stored power, or the like. As the display device 920, electronic paper, a liquid crystal display device, an electroluminescent (also referred to as EL) display device, or the like can be used. For example, the use of electronic paper can reduce power consumption of the display device 920.

Figure 20B:
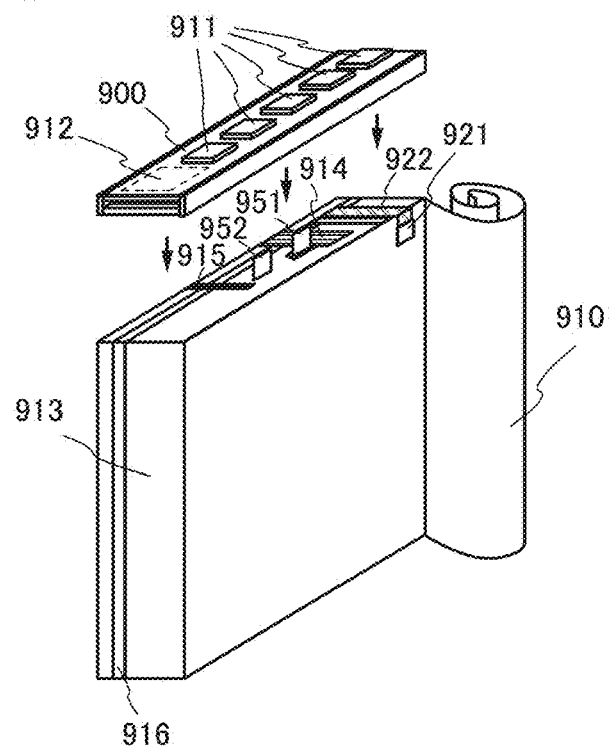

Alternatively, as illustrated in FIG. 20(B), the storage battery 913 illustrated in FIGS. 18(A) and 18(B) may be provided with a sensor 921. The sensor 921 is electrically connected to the terminal 911 via a terminal 922. Note that for portions similar to those of the power storage system illustrated in FIGS. 18(A) and 18(B), the description of the power storage system illustrated in FIGS. 18(A) and 18(B) can be referred to as appropriate.

As the sensor 921, that including a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be detected and stored in a memory inside the circuit 912.

The electrode of one embodiment of the present invention is used in the storage battery and the power storage system that are described in this embodiment; thus, the capacity of the storage battery and the power storage system can be increased. Furthermore, energy density can be increased. Moreover, reliability can be increased. Furthermore, life can be increased.

This embodiment can be implemented in appropriate combination with the other embodiments.

Embodiment 5

In this embodiment, an example of an electronic device including a flexible storage battery that is a power storage device using one embodiment of the present invention is described.

FIG. 21 illustrates examples of electronic devices including the flexible storage batteries described in the above embodiment. Examples of electronic devices using power storage devices including television devices with flexible forms (also referred to as televisions or television receivers), monitors of computers or the like, digital cameras, and digital video cameras, digital photo frames, mobile phones (also referred to as mobile phones or mobile phone devices), portable game machines, portable information terminals, audio reproducing devices, and large game machines such as pachinko machines.

In addition, a power storage device with a flexible form can be incorporated along a curved inside/outside wall surface of a house or a building or a curved interior/exterior surface of a car.

Figure 21A:
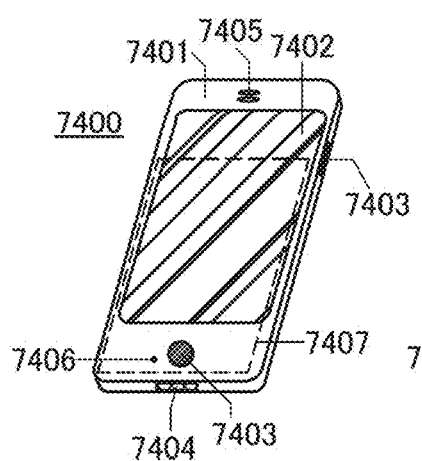
[FIG. 21] A diagram illustrating an example of an electronic device.

FIG. 21(A) illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 21B:
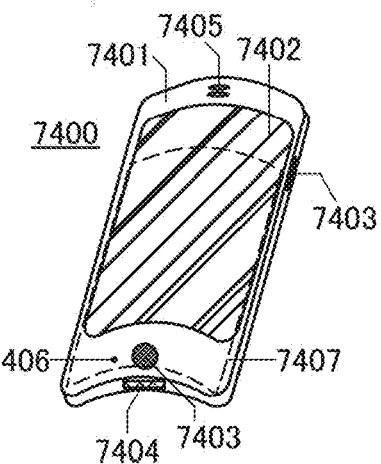
Figure 21C:
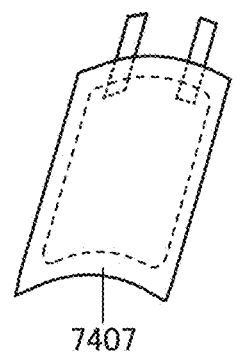

FIG. 21(B) illustrates the state where the mobile phone 7400 that is curved. When the whole mobile phone 7400 is curved by being changed in form by the external force, the power storage device 7407 included therein is also bent. In addition, FIG. 21(C) illustrates the state of the bent power storage device 7407. The power storage device 7407 is a thin storage battery. The power storage device 7407 is fixed in a state of being curved. Note that the power storage device 7407 includes a lead electrode 7408 electrically connected to a current collector 7409. The current collector 7409 is, for example, copper foil, and partly alloyed with gallium to improve adhesion between the current collector 7409 and an active material layer in contact with the current collector 7409, and the power storage device 7407 can have high reliability in a state of being bent.

Figure 21D:
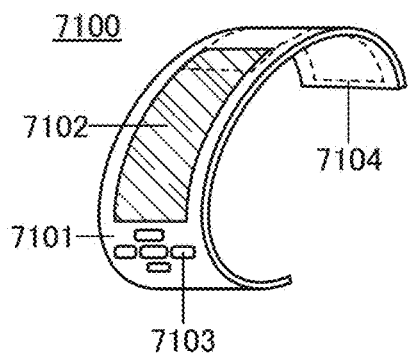
Figure 21E:
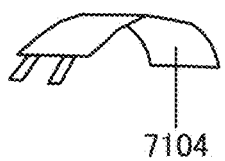

FIG. 21(D) illustrates an example of a bangle-type display device. A portable display device 7100 includes a housing 7101, a display portion 7102, an operation button 7103, and a power storage device 7104. In addition, FIG. 21(E) illustrates the state of the bent power storage device 7104. When the power storage device 7104 is worn on a user's arm while being bent, the housing changes its form and the curvature of a part or the whole of the power storage device 7104 is changed. Note that the degree of curvature of a curve at a point that is expressed by the radius of a corresponding circle is the radius of curvature, and the reciprocal of the radius of curvature is called curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high.

Figure 21F:
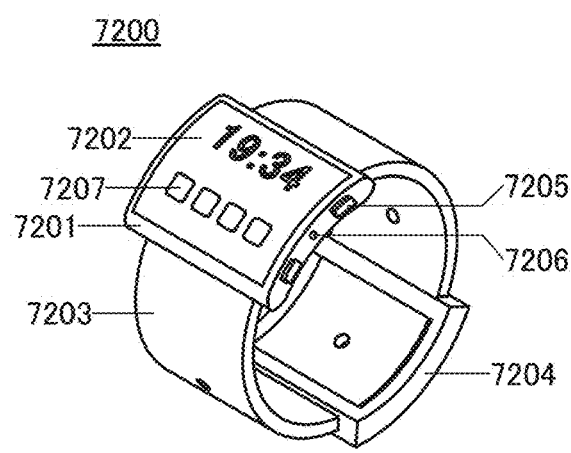

FIG. 21(F) illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and display can be performed along the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off operations, on/off operations of wireless communication, execution and cancellation of a silent mode, and execution and cancellation of a power saving mode can be performed. For example, the functions of the operation button 7205 can be set freely by setting the operating system incorporated in the portable information terminal 7200.

Furthermore, the portable information terminal 7200 can employ near field communication that is a communication method based on a communication standard. For example, mutual communication with a headset capable of wireless communication allows hands-free calling.

Moreover, the portable information terminal 7200 includes the input output terminal 7206, and data can be directly transmitted to and received from another information terminal via a connector. In addition, charge via the input output terminal 7206 is also possible. Note that the charging operation may be performed by wireless power feeding without using the input output terminal 7206.

The display portion 7202 of the portable information terminal 7200 is provided with a power storage device including an electrode member of one embodiment of the present invention. For example, the power storage device 7104 illustrated in FIG. 21(E) that is in the state of being curved can be incorporated in the housing 7201, or the power storage device 7104 can be incorporated in the band 7203 such that it can be curved.

Figure 21G:
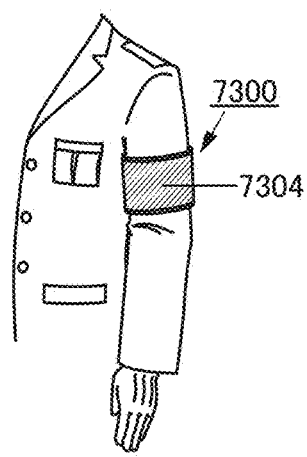

FIG. 21(G) illustrates an example of an armband-type display device. A display device 7300 includes a display portion 7304 and the power storage device of one embodiment of the present invention. The display device 7300 can include a touch sensor in the display portion 7304 and can also serve as a portable information terminal.

The display surface of the display portion 7304 is curved, and display can be performed along the curved display surface. Furthermore, a display state of the display device 7300 can be changed by, for example, near field communication, which is based on a communication standard.

Furthermore, the display device 7300 includes an input output terminal, and data can be directly transmitted to and received from another information terminal via a connector. In addition, charge via the input output terminal is possible. Note that the charging operation may be performed by wireless power feeding without using the input output terminal.

This embodiment can be implemented in appropriate combination with any of the other embodiments.

Embodiment 6

In this embodiment, examples of electronic devices that can include power storage devices are described.

Figure 22A:
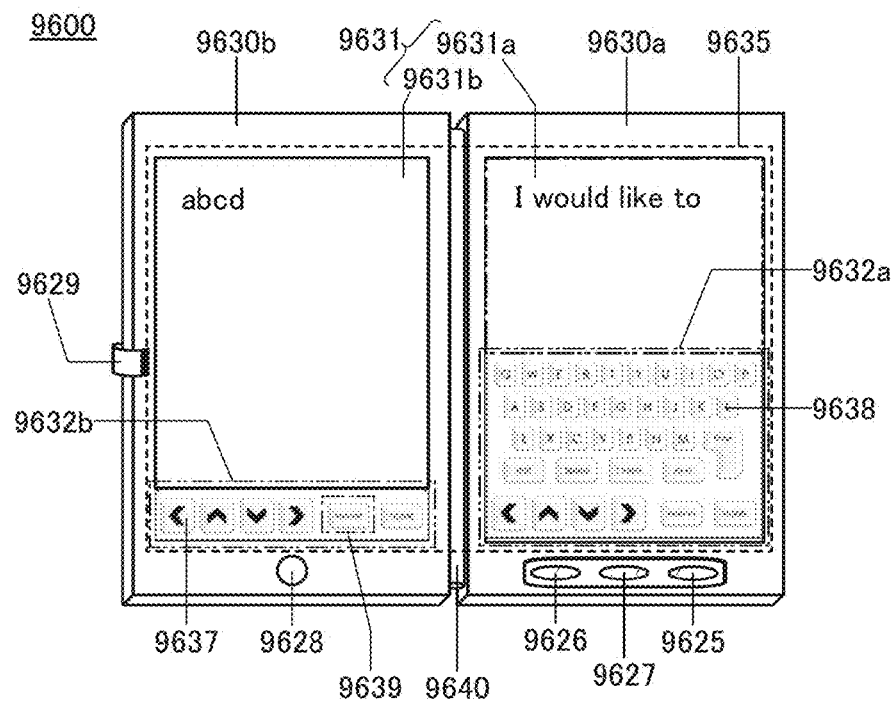
[FIG. 22] A diagram illustrating an example of an electronic device.
Figure 22B:
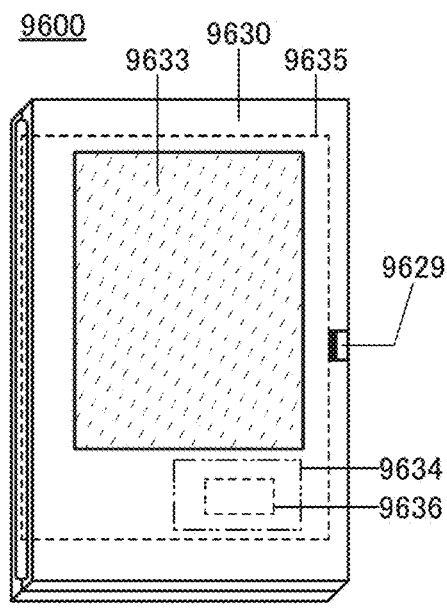

FIGS. 22(A) and 22(B) illustrate an example of a tablet type terminal that can be folded in half. A tablet type terminal 9600 illustrated in FIGS. 22(A) and 22(B) includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 22(A) illustrates the tablet type terminal 9600 that is opened, and FIG. 22(B) illustrates the tablet type terminal 9600 that is closed.

The tablet type terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a, and data can be input by touching operation keys 9638 that are displayed. Note that for example, half of the area of the display portion 9631a has only a display function and the other half of the area has a touch panel function; however, the structure is not limited thereto. All the area of the display portion 9631a may have a touch panel function. For example, all the area of the display portion 9631a can display a keyboard and serve as a touch panel, and the display portion 9631b can be used as a display screen.

Furthermore, as for the display portion 9631b, part of the display portion 9631b can be a touch panel region 9632b as in the display portion 9631a. Furthermore, when the position where a keyboard display switching button 9639 is displayed on the touch panel is touched with a finger, a stylus, or the like, a keyboard can be displayed on the display portion 9631b.

Furthermore, touch input can be performed in the touch panel region 9632a and the touch panel region 9632b at the same time.

Furthermore, the display mode changing switch 9626 allows switching the direction of display such as landscape display and portrait display and selecting a switch of black-and-white display and color display, and the like. The power saving mode changing switch 9625 can optimize display luminance in accordance with the amount of external light in use which is detected with an optical sensor incorporated in the tablet type terminal 9600. In addition to the optical sensor, other detecting devices such as sensors for detecting inclination, such as a gyroscope or an acceleration sensor, may be incorporated in the tablet type terminal.

Furthermore, although FIG. 22(A) illustrates an example where the display portion 9631a and the display portion 9631b have the same display area, without particular limitation, one of them and the other may have different sizes and different display qualities. For example, one of them may be a display panel capable of displaying higher definition images than the other.

FIG. 22(B) is a closed state, and the tablet type terminal includes the housing 9630, a solar cell 9633, and a charge and discharge control circuit 9634 including a DC-DC converter 9636. Furthermore, the power storage unit of one embodiment of the present invention is used as the power storage unit 9635.

Note that the tablet type terminal 9600 can be folded in half; thus, it can be folded such that the housings 9630a and 9630b overlap with each other when not in use. Folding it can protect the display portions 9631a and 9631b, which increases the durability of the tablet type terminal 9600. In addition, the power storage unit 9635 using the power storage unit of one embodiment of the present invention has flexibility and can be repeatedly bent without a significant decrease in charge and discharge capacity. Thus, a highly reliable tablet type terminal can be provided.

Furthermore, other than that, the tablet type terminal illustrated in FIGS. 22(A) and 22(B) can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet type terminal, can supply electric power to a touch panel, a display portion, an image signal processing portion, and the like. Note that the solar cell 9633 is favorable because it can be provided on one or both surfaces of the housing 9630 and the power storage unit 9635 can be charged efficiently. The use of a lithium-ion battery as the power storage unit 9635 brings an advantage such as reduction in size.

Figure 22C:
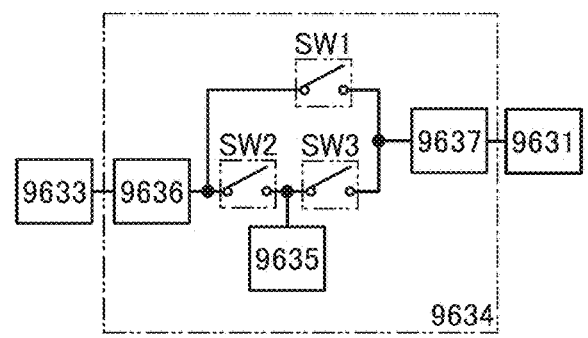

The structure and operation of the charge and discharge control circuit 9634 illustrated in FIG. 22(B) are described by showing a block diagram in FIG. 22(C). The solar cell 9633, the power storage unit 9635, the DC-DC converter 9636, a converter 9637, switches SW1 to SW3, and the display portion 9631 are illustrated in FIG. 22(C), and the power storage unit 9635, the DC-DC converter 9636, the converter 9637, and the switches SW1 to SW3 correspond to the charge and discharge control circuit 9634 illustrated in FIG. 22(B).

First, an example of operation when electric power is generated by the solar cell 9633 using external light is described. The voltage of electric power generated by the solar cell is raised or lowered by the DC-DC converter 9636 to a voltage for charging the power storage unit 9635. In addition, when the display portion 9631 is operated with the electric power from the solar cell 9633, the switch SW1 is turned on and the voltage of the electric power is raised or lowered by the converter 9637 to a voltage needed for the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, without particular limitation, the power storage unit 9635 may be charged using another power generation means such as a piezoelectric element (piezoelectric element) or a thermoelectric conversion element (Peltier element). For example, charge may be performed with a non-contact power transmission module that performs charge by transmitting and receiving electric power wirelessly (without contact), or a combination of other charge means.

Figure 23:
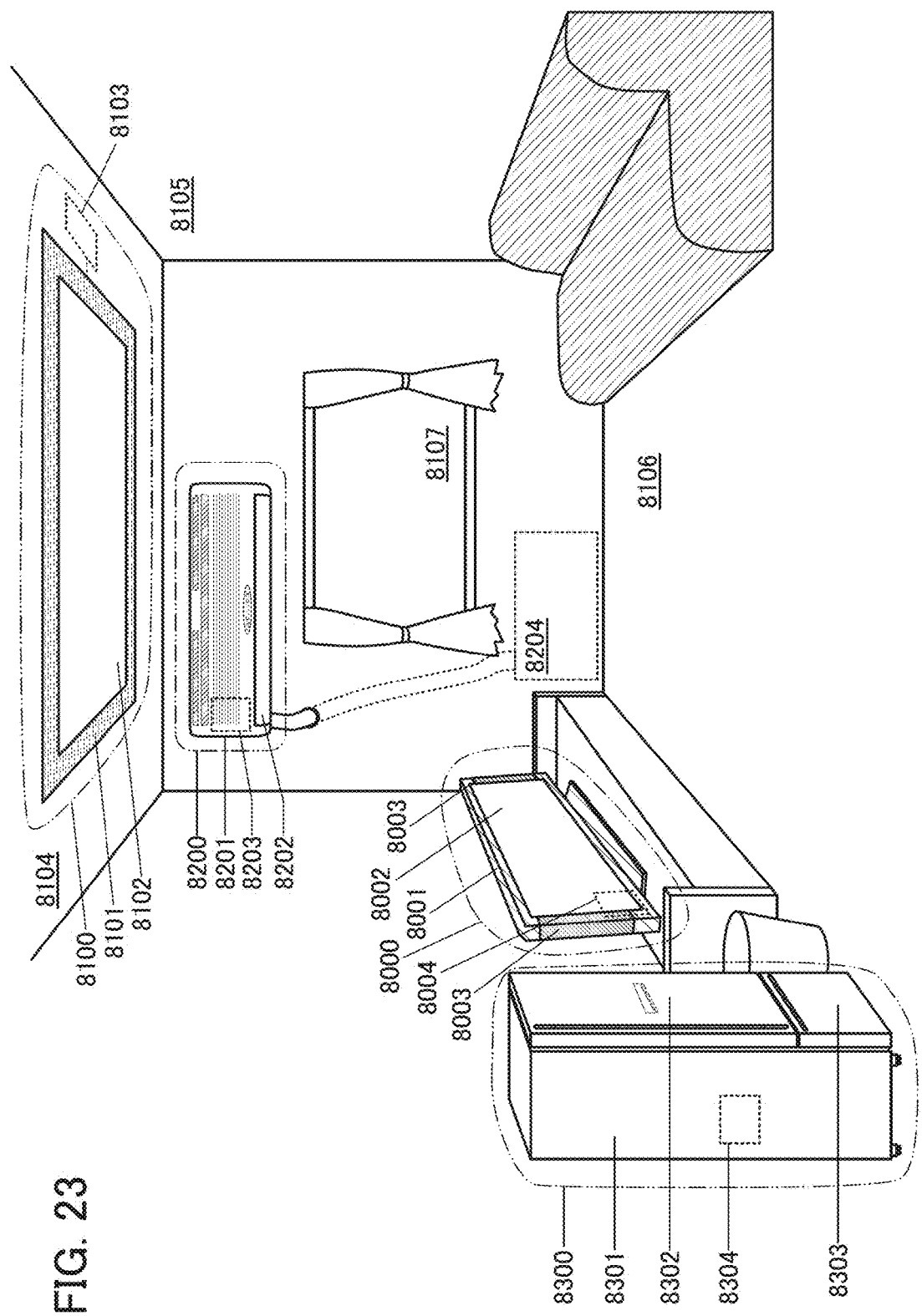
[FIG. 23] A diagram illustrating an example of an electronic device.

FIG. 23 illustrates other examples of electronic devices. In FIG. 23, a display device 8000 is an example of an electronic device using a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 relating to one embodiment of the present invention is provided in the housing 8001. The display device 8000 can receive electric power from a commercial power supply and can use electric power stored in the power storage device 8004. Thus, the display device 8000 can be used with the use of the power storage device 8004 relating to one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a DMD (Digital Micromirror Device), a PDP (Plasma Display Panel), or a FED (Field Emission Display) can be used for the display portion 8002.

Note that the display device includes all of display devices for information display for personal computers, advertisement displays, and the like besides TV broadcast reception.

In FIG. 23, an installation lighting device 8100 is an example of an electronic device using a power storage device 8103 relating to one embodiment of the present invention. Specifically, the lighting device 8100 includes a housing 8101, a light source 8102, the power storage device 8103, and the like. Although FIG. 23 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply and can use electric power stored in the power storage device 8103. Thus, the lighting device 8100 can be used with the use of power storage device 8103 relating to one embodiment of the present invention as an uninterruptible power supply even when electric power cannot be supplied from a commercial power supply due to power failure or the like.

Note that although the installation lighting device 8100 provided in the ceiling 8104 is illustrated in FIG. 23 as an example, the power storage device relating to one embodiment of the present invention can be used in an installation lighting device provided in, for example, a wall 8105, a floor 8106, a window 8107, or the like other than the ceiling 8104 and can be used in a tabletop lighting device or the like.

In addition, as the light source 8102, an artificial light source which obtains light artificially by using electric power can be used. Specifically, an incandescent lamp, a discharge lamp such as a fluorescent lamp, and light-emitting elements such as an LED and an organic EL element are given as examples of the artificial light source.

In FIG. 23, an air conditioner including an indoor unit 8200 and an outdoor unit 8204 is an example of an electronic device using a power storage device 8203 relating to one embodiment of the present invention. Specifically, the indoor unit 8200 includes a housing 8201, a blast outlet 8202, the power storage device 8203, and the like. Although FIG. 23 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive supply of electric power from a commercial power supply and can use electric power stored in the power storage device 8203. Particularly in the case where the power storage devices 8203 are provided in both the indoor unit 8200 and the outdoor unit 8204, the air conditioner can be operated with the use of the power storage device 8203 relating to one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 23 as an example, the power storage device relating to one embodiment of the present invention can be used in an integral-type air conditioner in which the functions of an indoor unit and an outdoor unit are included in one housing.

In FIG. 23, an electric refrigerator-freezer 8300 is an example of an electronic device using a power storage device 8304 relating to one embodiment of the present invention. Specifically, the electric refrigerator-freezer 8300 includes a housing 8301, a door for a refrigerator 8302, a door for a freezer 8303, the power storage device 8304, and the like. The power storage device 8304 is provided in the housing 8301 in FIG. 23. The electric refrigerator-freezer 8300 can receive electric power from a commercial power supply and can use electric power stored in the power storage device 8304. Thus, the electric refrigerator-freezer 8300 can be used with the use of the power storage device 8304 relating to one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device relating to one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a supply source of a commercial power supply (referred to as a usage rate of electric power) is low, electric power is stored in the power storage device, whereby an increase in the usage rate of electric power can be suppressed in a time period other than the above time period. For example, in the case of the electric refrigerator-freezer 8300, electric power is stored in the power storage device 8304 in night time when the temperature is low and the door for a refrigerator 8302 and the door for a freezer 8303 are not opened or closed. In addition, in daytime when the temperature is high and the door for a refrigerator 8302 and the door for a freezer 8303 are opened and closed, the power storage device 8304 is used as an auxiliary power supply; thus, the usage rate of electric power in daytime can be reduced.

This embodiment can be implemented in combination with the other embodiments as appropriate.

Embodiment 7

In this embodiment, examples of vehicles on which power storage devices are mounted are described.

In addition, mounting power storage devices on vehicles enables production of a next-generation clean energy vehicle such as hybrid electric vehicles (HEV), electric vehicles (EV), or plug-in hybrid electric vehicles (PHEV).

Figure 24A:
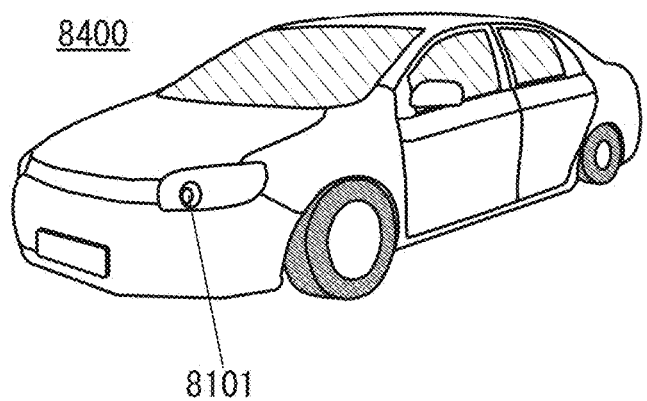
[FIG. 24] A diagram illustrating an example of an electronic device.

FIG. 24 illustrates an example of a vehicle using one embodiment of the present invention. An automobile 8400 illustrated in FIG. 24(A) is an electric vehicle that uses an electric motor as a power source for driving. Alternatively, it is a hybrid vehicle capable of appropriately selecting and using the electric motor and the engine. The use of one embodiment of the present invention can provide a high-mileage vehicle as a power source for driving. Furthermore, the automobile 8400 includes the power storage device. The power storage device is capable of not only driving the electric motor but also supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

Figure 24B:
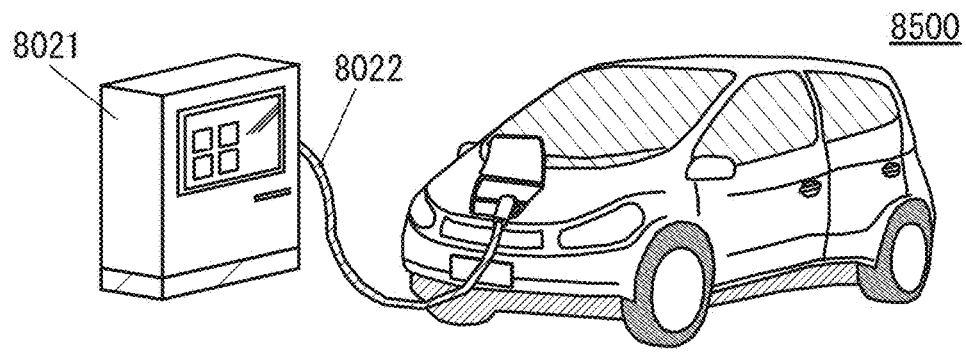

The automobile 8500 illustrated in FIG. 24(B) can be charged when the power storage device included in the automobile 8500 is supplied with electric power from external charging equipment by a plug-in system, a contactless power feeding system, or the like. In FIG. 24(B), a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device 8024 included in the automobile 8500 can be charged by being supplied with electric power from outside. The charge can be performed by converting AC electric power into DC electric power through a converter such as an AC-DC converter.

Furthermore, although not illustrated, a power receiving device can be mounted on the vehicle, and charge can be performed by supplying electric power from an aboveground power transmitting device without contact. In the case of the contactless power feeding system, by fitting a power transmitting device in a road or an exterior wall, charge can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power without contact, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. Making the power storage device itself compact and lightweight contributes to a reduction in the weight of a vehicle, and thus increases the driving distance. Furthermore, the power storage device included in the vehicle can be used as a power supply source for objects other than the vehicle. In this case, the use of a commercial power source can be avoided at peak time of electric power demand.

This embodiment can be implemented in appropriate combination with the other embodiments.

Example 1

In this example, the thin storage battery described in the above embodiment was fabricated as a power storage device using one embodiment of the present invention, and the characteristics thereof were evaluated.

A pair of the positive electrode 503 and the negative electrode 506 was used in the thin storage battery. Note that the area of a surface of the positive electrode 503 on the negative electrode 506 side was set to be substantially equal to the area of a surface of the negative electrode 506 on the positive electrode 503 side.

[Fabrication of Electrodes]

First, fabrication of the positive electrode and the negative electrode is described.

First, the composition and fabricating conditions of the negative electrode active material layer are described. Spherical natural graphite having a specific surface area of 6.3 m²/g and a particle size of 15 μm was used as an active material. As binders, CMC-Na (sodium carboxymethyl cellulose) and SBR were used. The polymerization degree of CMC-Na that was used was 600 to 800, and the viscosity of a 1% CMC-Na aqueous solution was in the range from 300 mPa·s to 500 mPa·s. The composition of a slurry for fabricating the electrode was graphite: CMC-Na:SBR=97: 1.5:1.5 (wt %).

Figure 25:
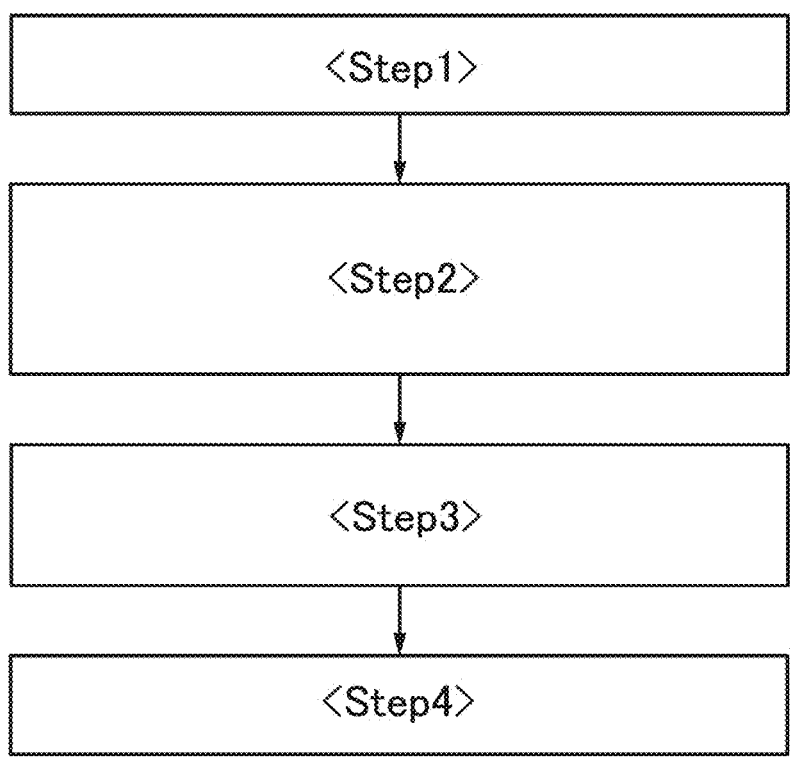
[FIG. 25] A diagram illustrating a method for fabricating an electrode.

Next, formation of the slurry for the negative electrode is described using a flow in FIG. 25.

First, an aqueous solution was prepared in such a manner that CMC-Na was uniformly dissolved in pure water (Step 1).

Next, a CMC-Na aqueous solution and an active material were mixed and then kneaded into a thick paste using a mixer, so that a first mixture was obtained (Step 2). Here, kneading into a thick paste means mixing with a high viscosity.

Then, a 50 wt % SBR aqueous dispersion liquid was added to the mixture and mixing was performed with a mixer, so that a second mixture was obtained (Step 3).

After that, pure water serving as a solvent was added to the mixture until a predetermined viscosity was obtained, and mixing was performed (Step 4). Through the above steps, the slurry was formed.

Next, the formed slurry was applied to a current collector with the use of a blade. The operating speed of the blade was set to 10 mm/sec. In addition, an 18-μm-thick rolled copper foil was used as the current collector.

Next, the current collector to which the slurry was applied was dried on a hot plate at 50° C. in an air atmosphere for 30 minutes. After that, further drying was performed at 100° C. under a reduced pressure for 10 hours. Through the above steps, the negative electrode active material layer was formed on one surface or both surfaces of the current collector.

Next, the composition and manufacturing conditions of the positive electrode are described. LiFePO$_4$ with a specific surface area of 9.2 m²/g was used as an active material, PVdF was used as a binder, and graphene was used as a conductive additive. Note that graphene was obtained by reducing graphene oxide, which was used to form the slurry, after application of the electrode. The composition of the slurry for fabrication of the electrode was set to LiFePO$_4$: graphene oxide:PVdF=94.4:0.6:5.0 (wt %).

Figure 26:
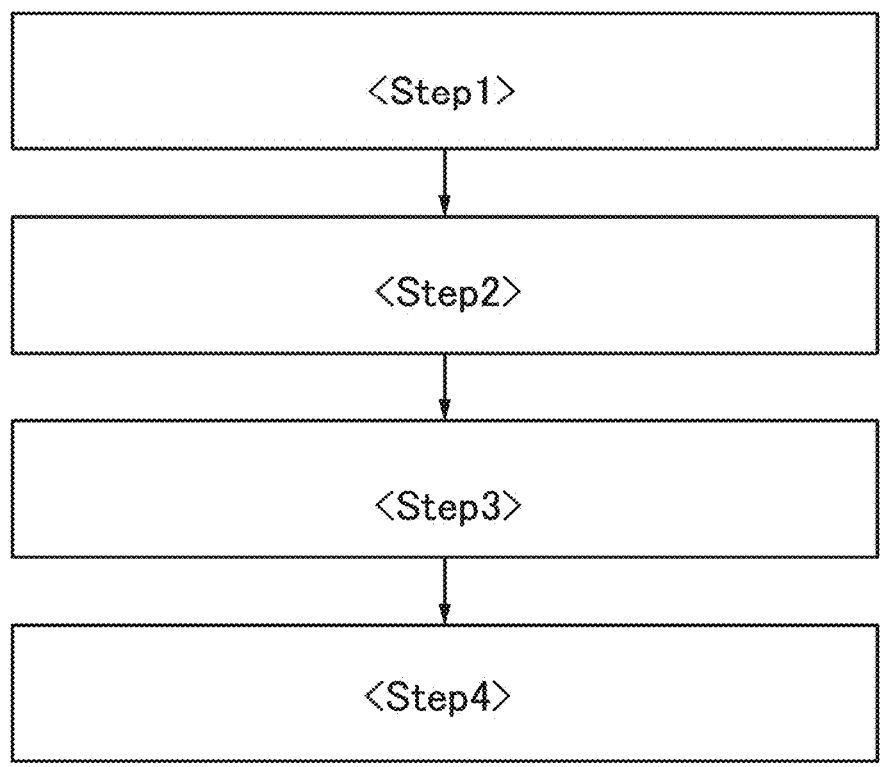
[FIG. 26] A diagram illustrating a method for fabricating a slurry.

Next, a method for forming the slurry for the positive electrode is described using a flow in FIG. 26.

First, graphene oxide powder and NMP serving as a solvent were mixed with a mixer, so that the first mixture was obtained (Step 1).

Next, the active material was added to the first mixture and the mixture was kneaded into a thick paste with a mixer, so that the second mixture was obtained (Step 2). By kneading the mixture into a thick paste, the cohesion of the active material can be weakened and graphene oxide can be dispersed more uniformly.

Next, PVdF was added to the second mixture and mixing was performed with a mixer, so that a third mixture was obtained (Step 3).

Next, the solvent NMP was added to the third mixture and mixing was performed with a mixer (Step 4). Through the above steps, the slurry was formed.

Then, the formed slurry was applied to an aluminum current collector (20 μm) subjected to undercoating in advance. The application was performed with a continuous coating device at a coating speed of 1 m/min. After that, drying was performed using a drying furnace. Drying conditions were at 80° C. and for 4 minutes. Then, reduction for the electrode was performed.

For the reduction conditions, chemical reduction was first performed, followed by thermal reduction. First, conditions for chemical reduction are described. For a solution used for the reduction, a solvent in which NMP and water were mixed at 9:1 was used as a solvent, and ascorbic acid and LiOH were added to the solvent to have a concentration of 77 mmol/L and 73 mmol/L, respectively. The reduction treatment was performed at 60° C. for 1 hour. After that, washing with ethanol was performed, and drying was performed in a reduced pressure atmosphere at room temperature. Next, conditions for thermal reduction are described. After the chemical reduction, the thermal reduction was performed. The thermal reduction treatment was performed at 170° C. in a reduced pressure atmosphere for 10 hours.

Next, the positive electrode active material layer was pressed by a roll press method so as to be consolidated. Through the above steps, the positive electrode was fabricated.

Table 1 shows the active material load, the thickness, and the density of the negative electrode active material layer and the positive electrode active material layer that were formed. The values shown in Table 1 are the average, the maximum, and the minimum of measurement values of each of the electrodes used in fabricating storage batteries. Note that the value when the active material layers were formed on both surfaces of the current collector is twice that of the active material layer shown in the table.

TABLE 1

| | | average | max. | min. |
|---|---|---|---|---|
| Positive electrode active material layer | Thickness [µm] | 57 | 60 | 54 |
| | Load [mg/cm2] | 9.4 | 10.3 | 8.9 |
| | Density [g/cc] | 1.7 | 1.9 | 1.6 |
| Negative electrode active material layer | Thickness [µm] | 54 | 60 | 48 |
| | Load [mg/cm2] | 4.5 | 4.8 | 4.0 |
| | Density [g/cc] | 0.9 | 0.9 | 0.8 |

Next, in the electrolytic solution, 1-butyl-3-methylimidazolium bis(fluorosulfonyl)amide (BMI-FSA) represented by the following structural formula was used as a solvent and lithium bis(fluorosulfonyl)amide (Li(FSO$_2$)$_2$N, abbreviation: LiFSA) was used as an electrolyte. LiFSA was dissolved in BMI-FSA, so that two kinds of electrolytic solutions having LiFSA concentrations of 1 mol/L and 1.8 mol/L were prepared.

[Chemical Formula 13]

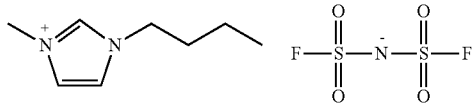

As the separator, a 50-µm-thick solvent-spun regenerated cellulosic fiber (TF40, produced by NIPPON KODOSHI CORPORATION) was used. The separator was formed to have a rectangular shape with a size of 24 mm×45 mm (in the vertical and horizontal directions) by cutting. As an exterior body, an aluminum foil covered with a resin layer was used.

[Fabrication of Storage Batteries]

Figure 27:
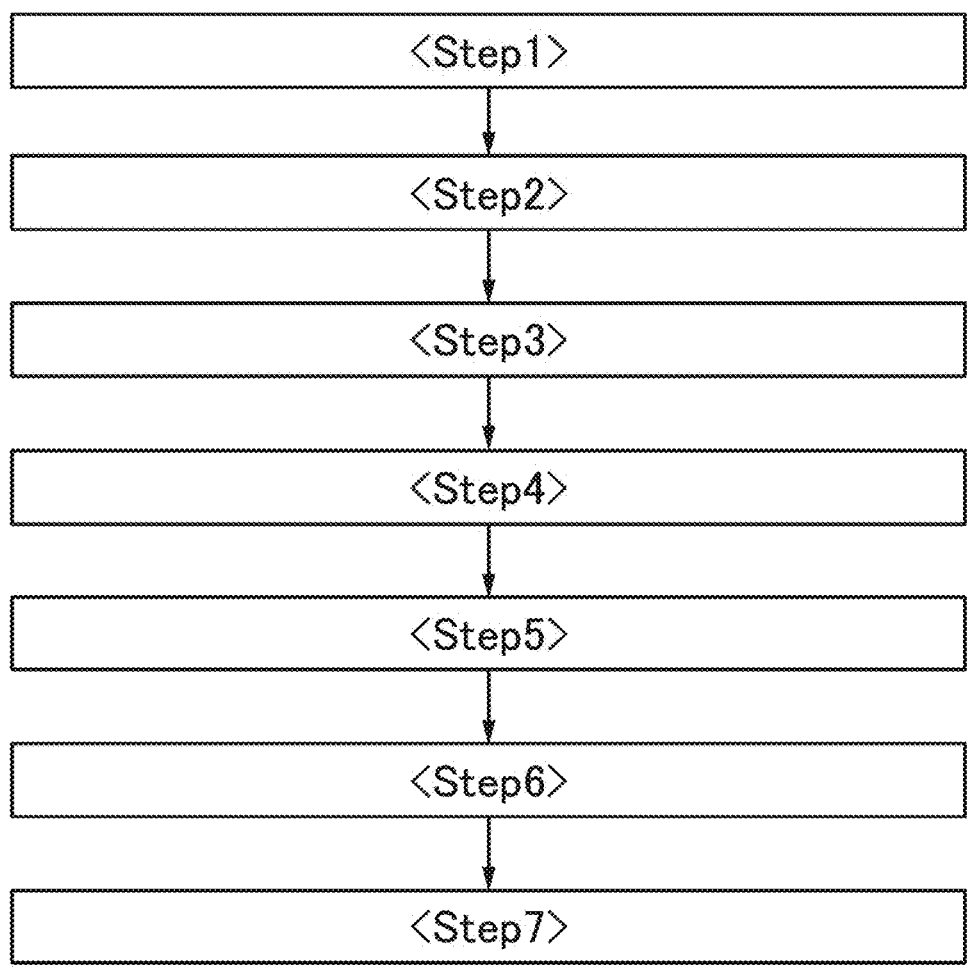
[FIG. 27] A diagram illustrating a method for fabricating storage battery.

Next, thin storage batteries were fabricated. A fabricating method for the thin storage battery is described using a flow in FIG. 27. First, the formed positive electrode and negative electrode were cut. In addition, the separator was cut (Step 1).

Then, the positive electrode active material and the negative electrode active material in tab regions were removed to expose the current collectors (Step 2).

Next, the exterior body was folded in half so that the positive electrode, the separator, and the negative electrode that were stacked were sandwiched (Step 3). At this time, the positive electrode and the negative electrode were stacked such that the positive electrode active material layer and the negative electrode active material layer faced each other.

Then, sides except a side for introduction of an electrolytic solution of three sides of the exterior body were bonded to each other by heating (Step 4). At this time, the sealing layers provided for the lead electrodes were positioned so as to overlap with the sealing portion of the exterior body.

After the two sides of the exterior body were bonded to each other, the exterior body and the positive electrode, the separator, and the negative electrode wrapped by the exterior body were dried (Step 5). Drying conditions were under a reduced pressure, at 80° C., and for 10 hours.

Next, an electrolytic solution was introduced in an argon gas atmosphere from one side that was not sealed (Step 6). After that, the one side of the exterior body was sealed by heating in a reduced pressure atmosphere (Step 7). Through the above steps, Thin Storage Batteries A were fabricated.

[Evaluation 1 of Storage Batteries]

The charge and discharge cycles of the fabricated storage batteries were evaluated. Note that the evaluation was performed at a temperature of 100° C. Constant current charge was performed under the charging condition that the upper limit was 4 V. In addition, constant current discharge was performed under the discharging condition that the lower limit was 2 V. The charge and the discharge were performed at a rate of approximately 0.3 C. Note that for calculation of the rate, 1 C was set to 170 mA/g, which was the current value per weight of the positive electrode active material.

Figure 28:
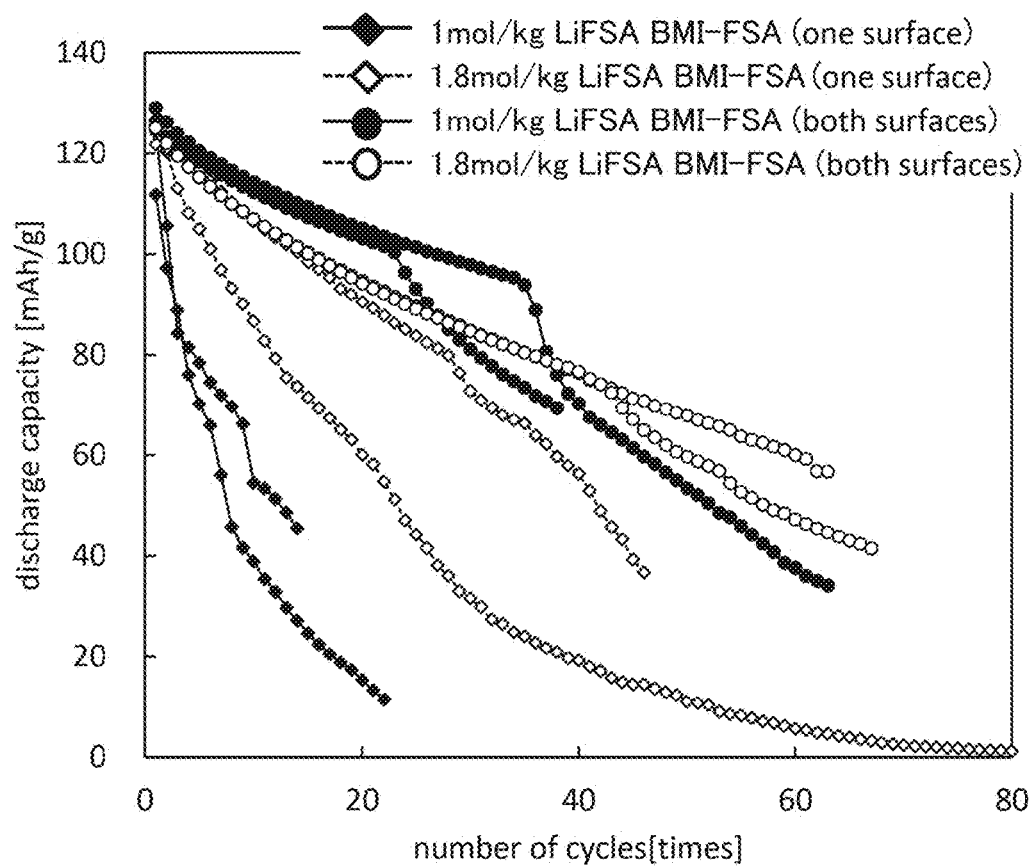
[FIG. 28] A diagram illustrating an evaluation result of a storage battery.

FIG. 28 shows the charge and discharge cycle characteristics of the storage batteries. In the graph, the horizontal axis represents the number of cycles, and the vertical axis represents discharge capacity.

As for the discharge cycle characteristics of the storage batteries in which the active material layers were formed on both surfaces of the current collector, the number of cycles until when an inflection point at which capacities greatly decrease during cycles is observed was able to be increased for both the conditions. It is presumed that forming the active material layers on both surfaces of the current collector reduces a reaction between the current collector and the electrolytic solution.

In addition, only the condition of an electrolytic solution was changed, and evaluation was performed. In the electrolytic solution, P13-FSA represented by the following structural formula was used as a solvent and LiFSA was used as an electrolyte. LiFSA was dissolved in P13-FSA to prepare two kinds of electrolytic solutions with LiFSA concentrations of 1 mol/kg and 1.8 mol/kg.

[Chemical Formula 14]

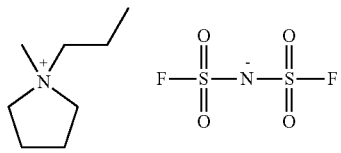

Thin Storage Batteries B were fabricated through the aforementioned steps, and the charge and discharge cycles of the fabricated storage batteries were evaluated.

Figure 29:
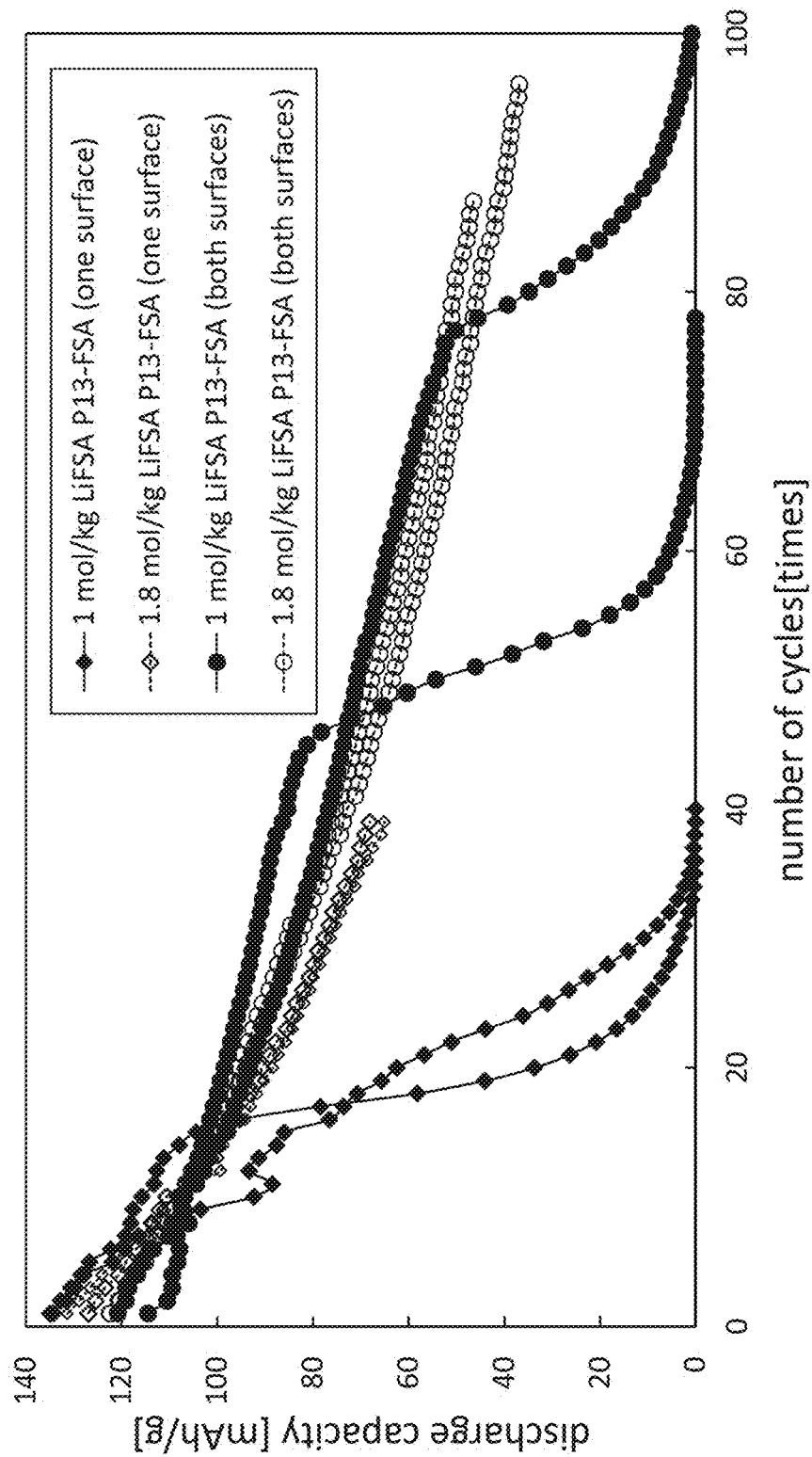
[FIG. 29] A diagram illustrating an evaluation result of a storage battery.

FIG. 29 shows the charge and discharge cycle characteristics of the storage batteries. In the graph, the horizontal axis represents the number of cycles, and the vertical axis represents discharge capacity. As for the discharge cycle characteristics of the storage batteries in which the active material layers were formed on both surfaces of the current collector, the number of cycles until when an inflection point at which capacities greatly decrease during cycles is observed was able to be increased for both the conditions. In addition, it was found out that a higher LiFSA concentration leads to a smaller reduction in discharge capacity.

[Evaluation 2 of Storage Battery]

Furthermore, the discharge characteristics of Thin Storage Battery A were evaluated under several temperature conditions. As the measurement temperatures, several temperature conditions, 25° C., 10° C., 0° C., −10° C., and −25° C., were employed. Note that a constant-current mode was employed for the charging method of the measurement, and constant current charge was performed at a rate of approximately 0.1 C, and then discharge was performed at a rate of approximately 0.2 C. Note that the temperature in the charge was 25° C.

In addition, the discharge characteristics of Thin Storage Battery C, which was obtained by changing only the electrolyte of the electrolytic solution in Thin Storage Battery A to lithium bis(trifluoromethanesulfonyl)amide (Li(CF$_3$SO$_2$)$_2$N, abbreviation: LiTFSA), were evaluated under several temperature conditions. Note that the electrolyte concentration of both Thin Storage Battery A and Thin Storage Battery C was 1 mol/kg.

Figure 30:
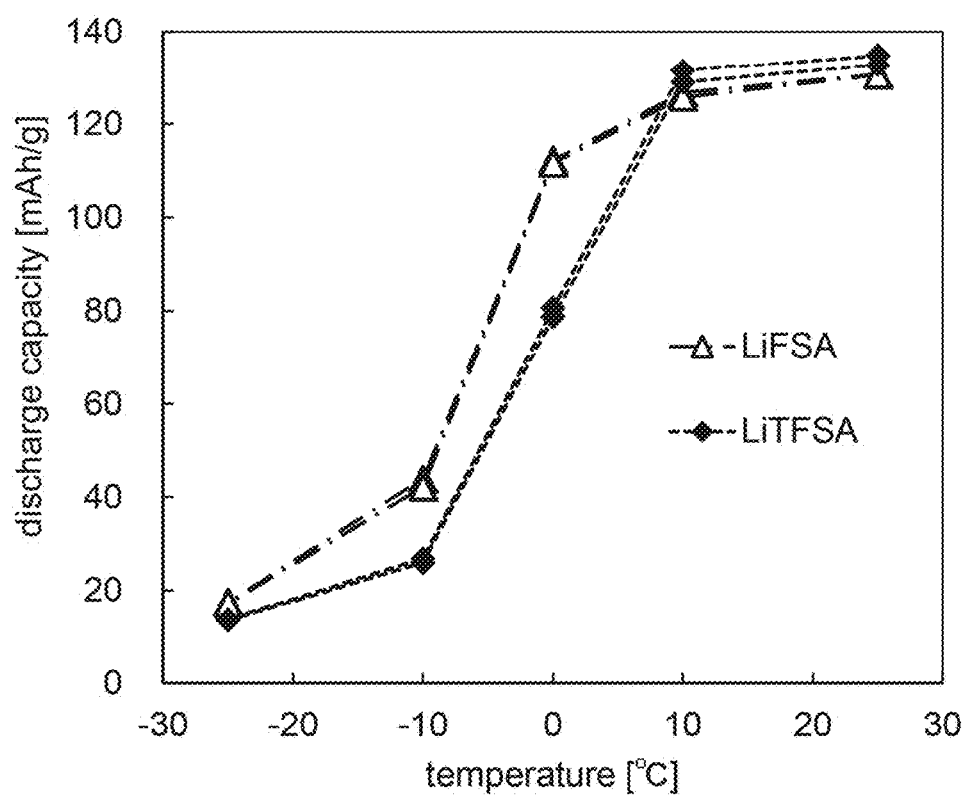
[FIG. 30] A diagram illustrating an evaluation result of a storage battery.

FIG. 30 shows the evaluation results. Note that in FIG. 30, the horizontal axis represents temperature [° C.] and the vertical axis represents discharge capacity [mAh/g].

As shown in FIG. 30, it was found out that the discharge capacity under a low-measurement temperature environment (at 0° C.) is 60% or more of the discharge capacity at 25° C. In particular, it was found out that the discharge capacity of the storage battery using LiFSA as an electrolyte at a measurement temperature of 0° C. is 85% or more of the discharge capacity at 25° C.

By the above evaluation, it was found out that the storage batteries used in this example operate in environments at higher than or equal to −25° C. and lower than or equal to 100° C.

[Disassembly and Observation of Storage Battery]

Here, Thin Storage Battery A in which only one surface of the current collector of the negative electrode is provided with the active material layer and Thin Storage Battery A in which both surfaces of the current collector of the negative electrode are provided with the active material layers were disassembled and observed. The disassembly was performed in an argon atmosphere. The negative electrode taken out after the disassembly was washed with heavy acetonitrile, and then, evacuation to a vacuum was performed and acetonitrile was dried. FIG. 31 shows the observation results.

Figure 31A:
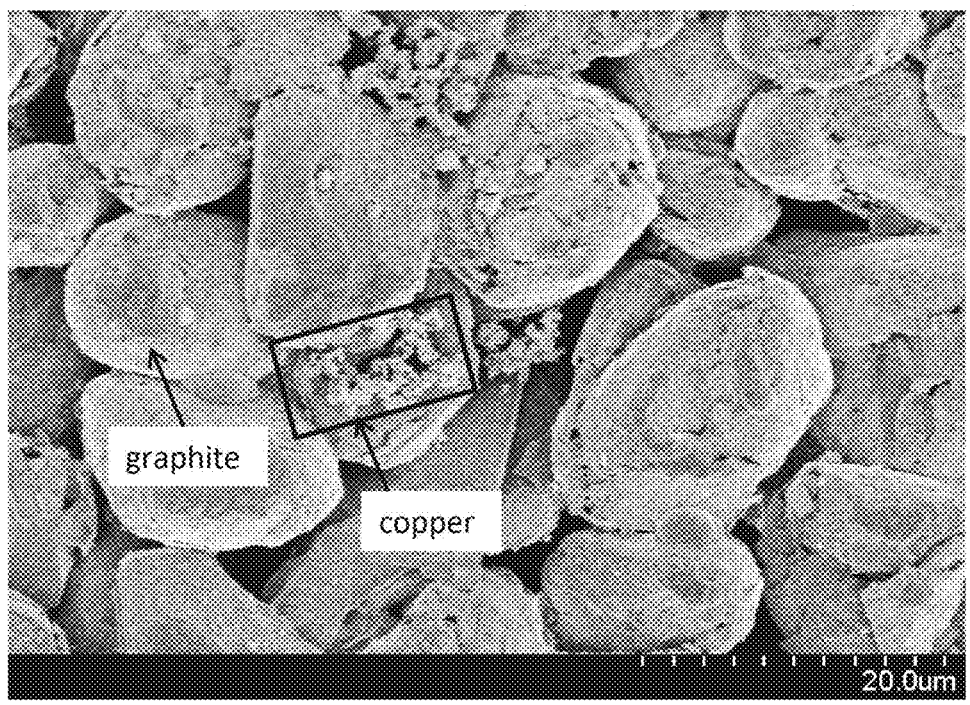
[FIG. 31] A diagram illustrating an observation result of a storage battery.
Figure 31B:
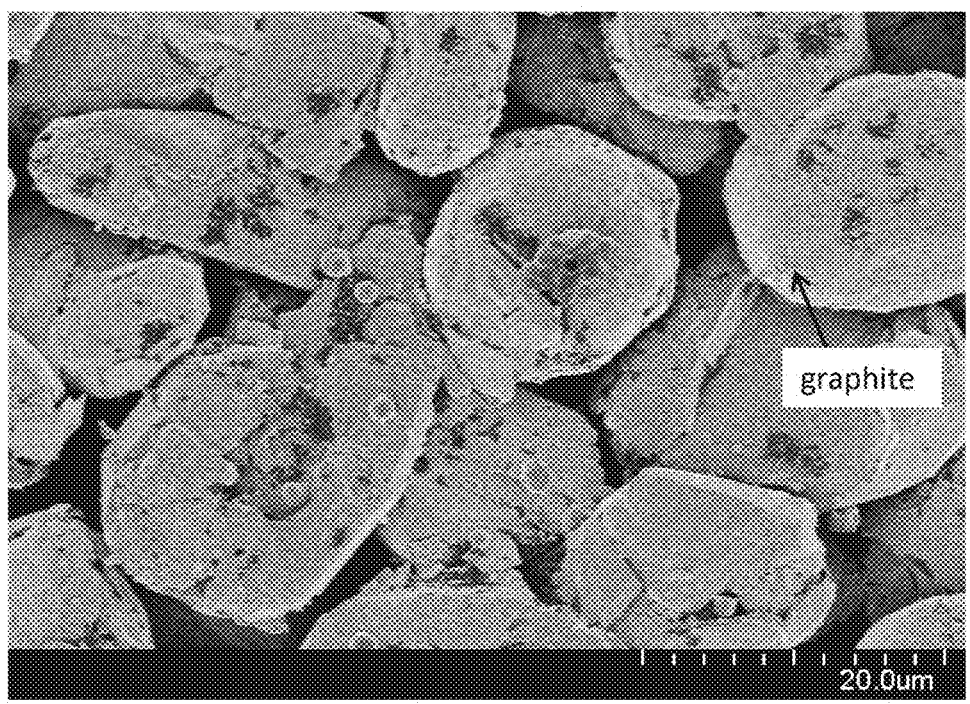

FIG. 31(A) is a SEM (Scanning Electron Microscopy) photograph of the negative electrode of the storage battery in which only one surface of the current collector of the negative electrode is provided with the active material layer, and FIG. 31(B) is a SEM photograph of the negative electrode of the storage battery in which both surfaces of the current collector of the negative electrode are provided with the active material layers. Furthermore, copper deposition on the graphite surface was examined by EDX (Energy Dispersive X-ray Spectrometry).

As shown in FIG. 31(A), it was found out that copper, which is the negative electrode current collector, reacts with the electrolytic solution and dissolves, and copper is deposited on the graphite surface. In addition, as shown in FIG. 31(B), it was found out that copper deposition on the graphite surface is inhibited compared with FIG. 31(A). Thus, providing both the surfaces of the current collector of the negative electrode with the active material layers allowed inhibition of copper dissolution, resulting in inhibition of copper deposition on the graphite surface.

Example 2

In this example, description is given of differential scanning calorimetry (DSC measurement: Differential Scanning Calorimetry) and thermogravimetry-differential thermal analysis (TG-DTA analysis: Thermogravimetry-Differential Thermal Analysis) of an electrolytic solution contained in the power storage device that is one embodiment of the present invention.

Samples formed in this example are as follows.
(Sample 1)

In an electrolytic solution of Sample 1, BMI-FSA was used as a solvent and LiFSA was used as an electrolyte. LiFSA was dissolved in BMI-FSA to prepare an ionic liquid electrolytic solution with a LiFSA concentration of 1 mol/kg.
(Sample 2)

In an electrolytic solution of Sample 2, BMI-FSA was used as a solvent and LiFSA was used as an electrolyte. LiFSA was dissolved in BMI-FSA to prepare an ionic liquid electrolytic solution with a LiFSA concentration of 1.8 mol/kg.
(Sample 3)

In an electrolytic solution of Sample 3, a mixed liquid in which ethylene carbonate (EC) and diethyl carbonate (DEC) were mixed at a volume ratio of 1:1 was used as a solvent and lithium hexafluorophosphate (abbreviation: LiPF$_6$) was used as an electrolyte. LiPF$_6$ was dissolved in the mixed liquid to prepare an organic electrolytic solution with a LiPF$_6$ concentration of 0.87 mol/kg.

Next, a measurement method for DSC measurement is described. In the measurement method, the samples were each cooled by decreasing a temperature from room temperature to around −120° C. at a temperature decreasing rate of −10° C./min in an air atmosphere, and then heated by increasing the temperature from around −120° C. to 100° C. at a temperature increasing rate of 10° C./min.

Figure 33A:
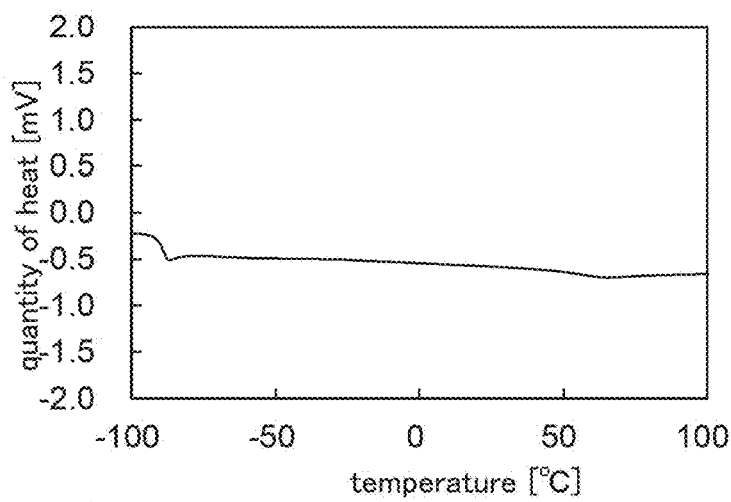
[FIG. 33] A diagram showing a result of differential scanning calorimetry measurement of a sample of Example.
Figure 33B:
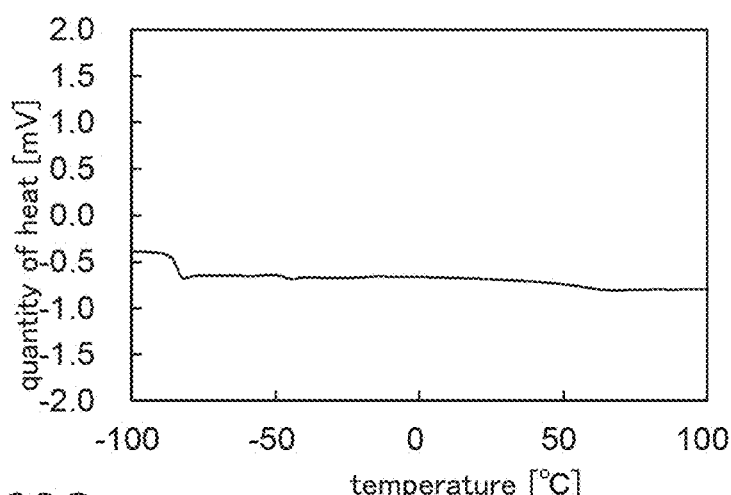
Figure 33C:
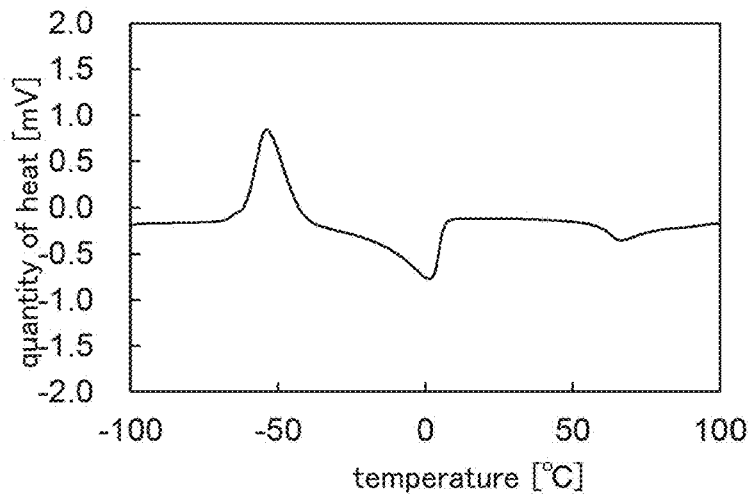

DSC measurement results of Sample 1, Sample 2, and Sample 3 are shown in FIGS. 33(A), 33(B), and 33(C), respectively. Note that in FIGS. 33(A) to 33(C), the vertical axis represents quantity of heat [mW], and the horizontal axis represents temperature [° C.].

As for Sample 1 and Sample 2, shifts of the base lines at a reaction start temperature of approximately −90° C. and behaviors by heat at approximately 65° C. were able to be seen in FIGS. 33(A) and 33(B). In addition, as for Sample 3, an exothermic reaction that starts at approximately −69° C. and has a peak top at approximately −54° C., an endothermic reaction that is immediately after the exothermic reaction and has a peak top at approximately 1° C., and an endothermic reaction that starts at approximately 57° C. and has a peak top at approximately 66° C. were seen in FIG. 33(C).

Next, a TG-DTA analysis measurement method is described. Measurement methods for Sample 1, Sample 2, and Sample 3 are different.

In the TG-DTA analysis measurement method for Sample 1 and Sample 2, sampling was performed for each sample in an argon atmosphere, a temperature was increased to 600° C. at a temperature increasing rate of 10° C./min in a helium atmosphere, and measurement was performed.

In the TG-DTA analysis measurement method for Sample 3, samples were left in an argon atmosphere for two hours, samples that have no more weight decrease at room temperature were sampled, a temperature was increased to 500° C. at a temperature increasing rate of 2° C./min in a helium atmosphere, and measurement was performed.

Figure 34A:
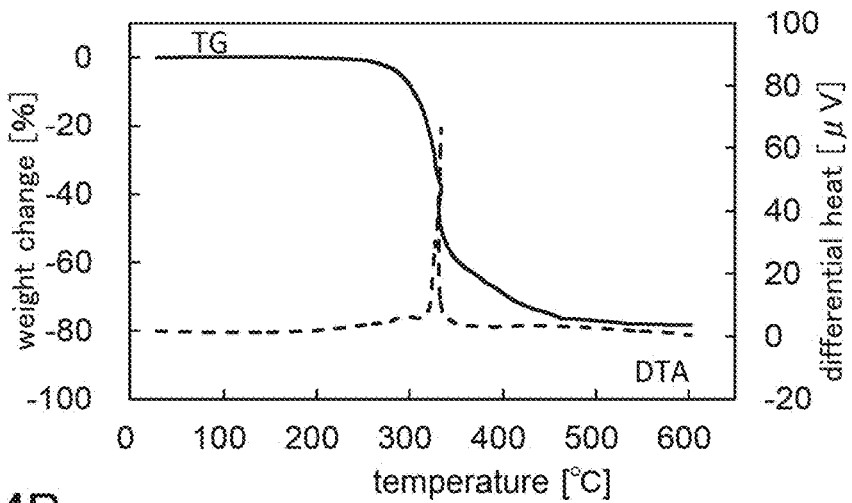
[FIG. 34] A diagram showing a result of thermogravimetry-differential thermal analysis of a sample of Example.
Figure 34B:
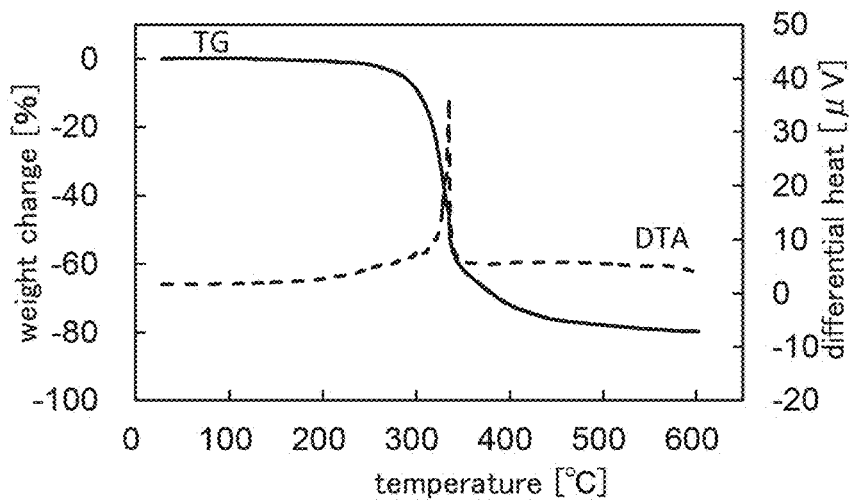
Figure 34C:
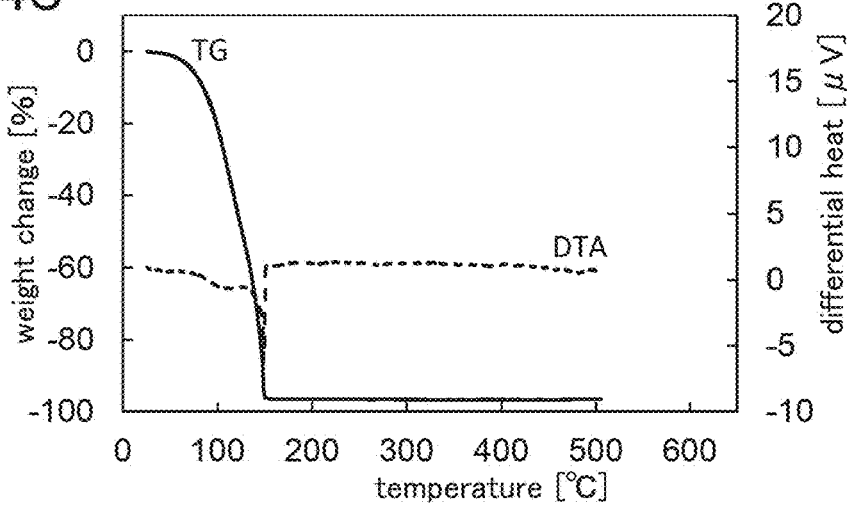

TG-DTA analysis results of Sample 1, Sample 2, and Sample 3 are shown in FIGS. 34(A), 34(B), and 34(C), respectively. Note that in FIGS. 34(A) to 34(C), the first vertical axis represents weight change [%], the second vertical axis represents differential heat in differential thermal analysis (DTA) (electric motive force of a thermocouple ($\mu$V)), and the horizontal axis represents temperature [° C.]. In addition, in FIGS. 34(A) to 34(C), the solid line represents a result of thermogravimetry (TG) and the dotted line represents a result of differential heat (DTA).

From the thermogravimetry (TG) curve shown in FIG. 34(A), it was found out that the weight was decreased from the initial weight by approximately 78% at temperatures up to approximately 600° C. In addition, in the differential heat (DTA) curve, exothermic reactions that have peak tops at approximately 301° C., approximately 327° C., and approximately 334° C. were seen.

From the thermogravimetry (TG) curve shown in FIG. 34(B), it was found out that the weight was decreased from the initial weight by approximately 80% at temperatures up to approximately 600° C. In addition, in the differential heat (DTA) curve, exothermic reactions that have peak tops at approximately 285° C., approximately 301° C., approximately 318° C., and approximately 335° C. were seen.

From the thermogravimetry (TG) curve shown in FIG. 34(C), it was found out that the weight was decreased from the weight after still standing by approximately 97% at temperatures up to approximately 500° C. In addition, in the differential heat (DTA) curve, endothermic reactions that have peak tops at approximately 110° C. and approximately 149° C. were seen.

Furthermore, like the above Sample 3, Sample 3 was subjected to TG-DTA analysis measurement with the use of a measurement container in which a lid of a simple closed container has a pinhole with a diameter of approximately 0.2 mm.

(Sample 4)

In addition, in an electrolytic solution, a mixed liquid in which ethylene carbonate (EC) and diethyl carbonate (DEC) were mixed at a volume ratio of 3:7 was used as a solvent and lithium hexafluorophosphate (abbreviation: $LiPF_6$) was used as an electrolyte. $LiPF_6$ was dissolved in the mixed liquid to prepare an organic electrolytic solution with a $LiPF_6$ concentration of 0.87 mol/kg, as Sample 4.

In the TG-DTA analysis measurement method for Sample 4, like the above Sample 3, it was subjected to TG-DTA analysis measurement with the use of a measurement container in which a lid of a simple closed container has a pinhole with a diameter of approximately 0.2 mm.

Figure 40A:
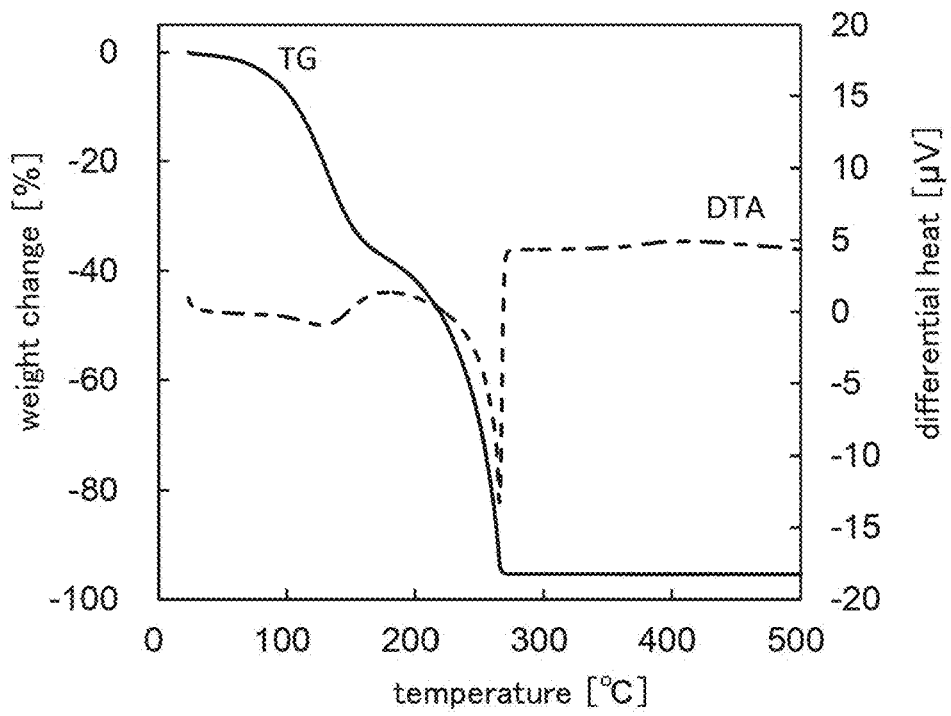
[FIG. 40] A diagram showing a result of thermogravimetry-differential thermal analysis of a sample of Example.
Figure 40B:
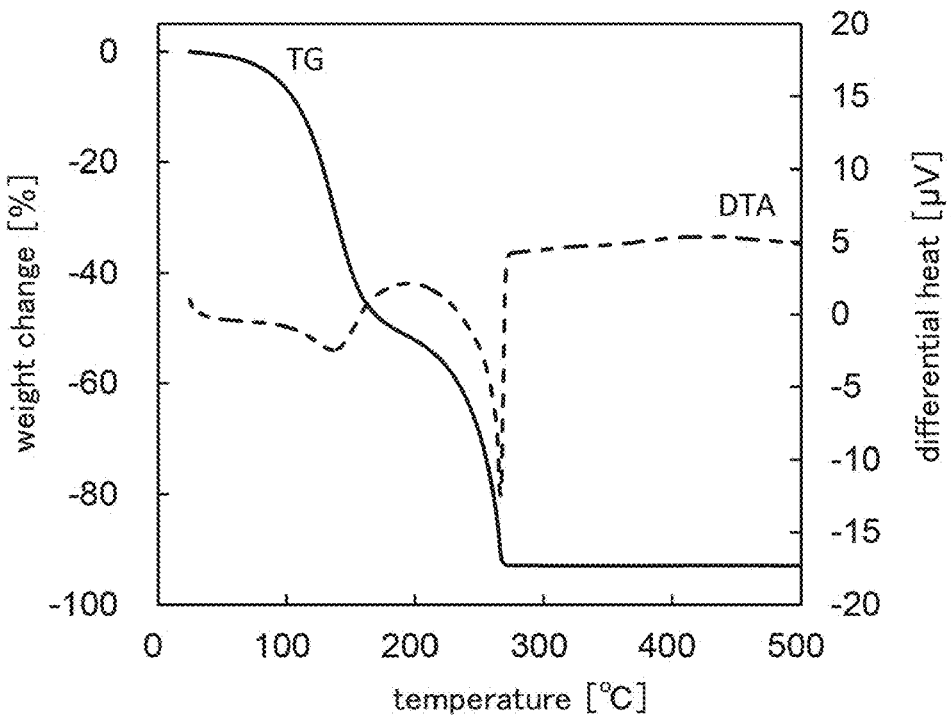

A result of TG-DTA analysis of Sample 3 with the use of a measurement container in which a lid of a simple closed container has a pinhole with a diameter of approximately 0.2 mm is shown in FIG. 40(A), and a TG-DTA analysis result of Sample 4 is shown in FIG. 40(B). Note that in FIGS. 40(A) and 40(B), the first vertical axis represents weight change [%], the second vertical axis represents differential heat in differential thermal analysis (DTA) (electric motive force of a thermocouple ($\mu$V)), and the horizontal axis represents temperature [° C.]. In addition, in FIGS. 40(A) and 40(B), the solid line represents a result of thermogravimetry (TG) and the dotted line represents a result of differential heat (DTA).

From the thermogravimetry (TG) curve shown in FIG. 40(A), it was found out that the weight was decreased from the weight after still standing by approximately 95% at temperatures up to approximately 500° C. In addition, in the differential heat (DTA) curve, an endothermic reaction whose peak starts at 101° C. and that has a peak top at approximately 130° C. and an endothermic reaction whose peak starts at 258° C. and that has a peak top at approximately 265° C. were seen.

From the thermogravimetry (TG) curve shown in FIG. 40(B), it was found out that the weight was decreased from the weight after still standing by approximately 93% at temperatures up to approximately 500° C. In addition, in the differential heat (DTA) curve, an endothermic reaction whose peak starts at 104° C. and that has a peak top at approximately 136° C. and an endothermic reaction whose peak starts at 258° C. and that has a peak top at approximately 266° C. were seen.

It was found from FIGS. 34(A) to 34(C) and FIGS. 40(A) and 40(B) that the use of the ionic liquid electrolytic solution as an electrolytic solution inhibits a weight decrease more and allows higher thermal stability than the use of an organic electrolytic solution.

Example 3

In this example, the thin storage battery described in the above embodiment was fabricated as a power storage device using one embodiment of the present invention, and the characteristics thereof were evaluated.

<Fabrication of Storage Battery>

First, the thin storage battery of the above embodiment shown in FIG. 5 was fabricated.

The thin storage battery of this example includes the positive electrode 503, the negative electrode 506, the separator 507, the exterior body 509, the positive electrode lead electrode 510, and the negative electrode lead electrode 511.

Figure 38:
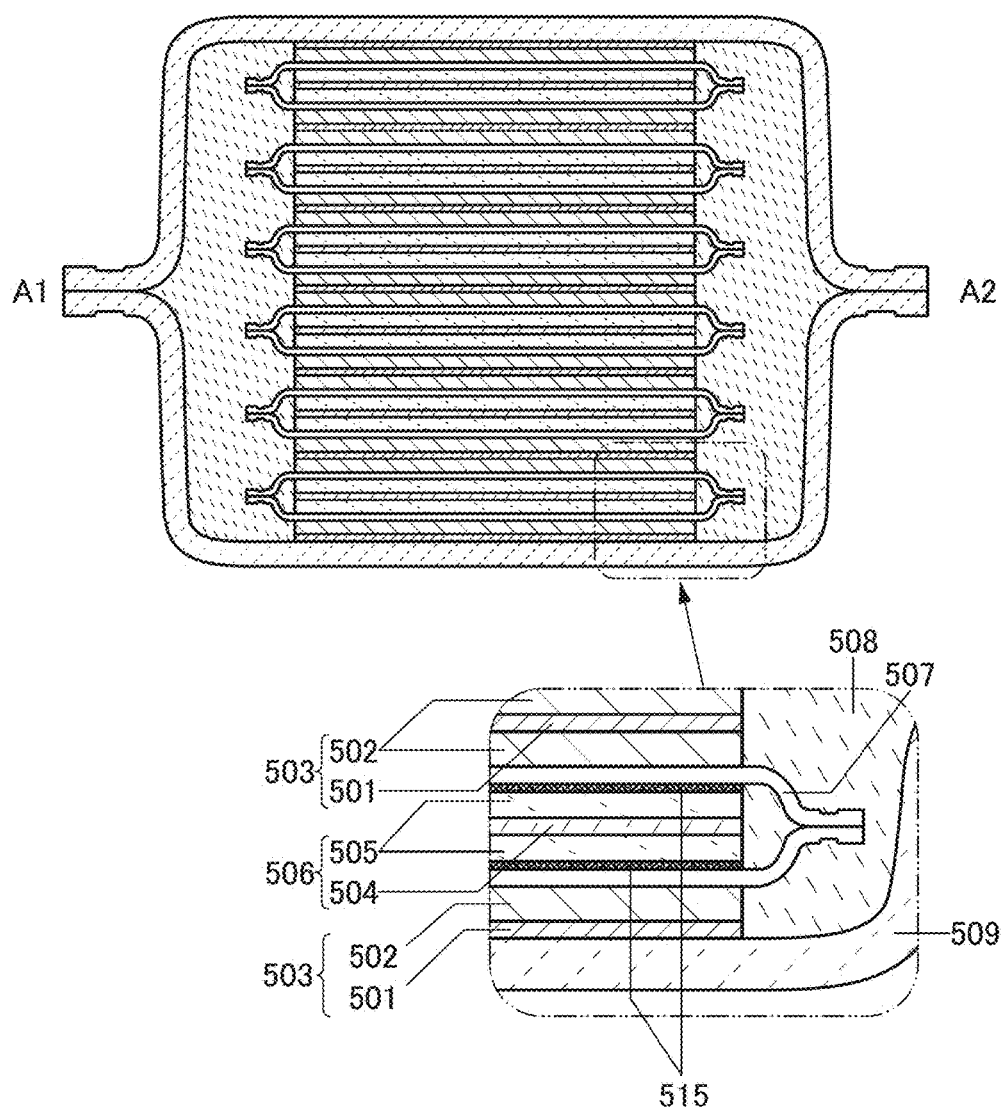
[FIG. 38] A cross-sectional view illustrating a thin storage battery.
Figure 39:
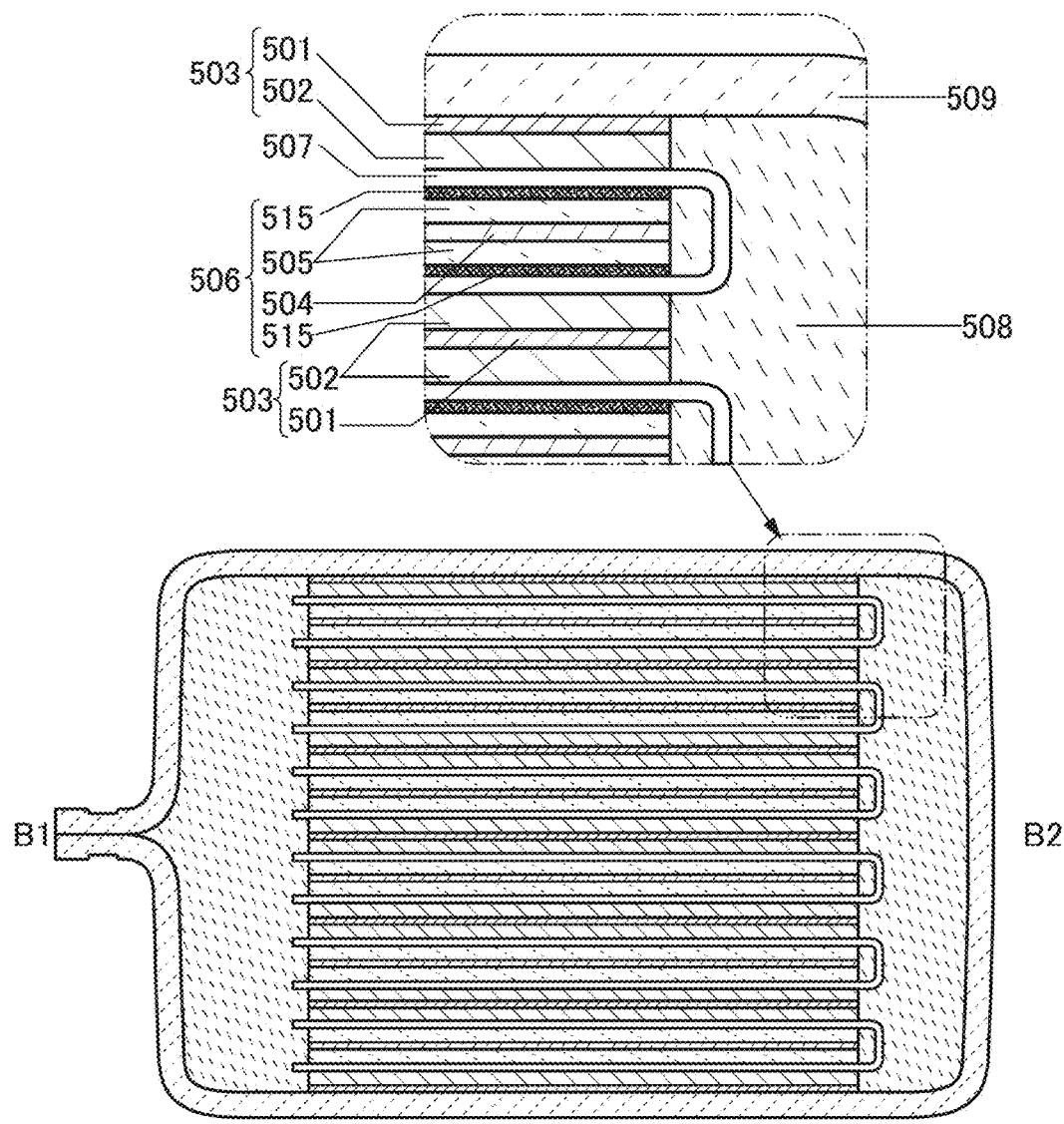
[FIG. 39] A cross-sectional view illustrating a thin storage battery.

In this example, a layered structure of a positive electrode and a negative electrode in FIG. 5(A) is described using drawings. A cross-sectional view of a thin power storage device used in this example is shown. FIG. 38 shows the cross-sectional view along dashed-dotted line A1-A2 in FIG. 5(A). In addition, FIG. 39 shows a cross-sectional view along dashed-dotted line B1-B2 in FIG. 5(A).

In the thin storage battery of this example, two positive electrodes 503 in which the positive electrode active material layer 502 is provided on one surface of the positive electrode current collector 501, five positive electrodes 503 in which the positive electrode active material layers 502 are provided on both surfaces of the positive electrode current collector 501, and six negative electrodes 506 in which the negative electrode active material layers 505 are provided on both surfaces of the negative electrode current collector 504 were used. A surface of the positive electrode 503 which is on the negative electrode 506 side and a surface of the negative electrode 506 which is on the positive electrode 503 side had substantially the same area.

The separator 507 was folded in half such that the negative electrode 506 is sandwiched. An end portion of the separator 507 was provided to be positioned outward from end portions of the positive electrode 503 and the negative electrode 506.

The inside of the exterior body 509 was filled with the electrolytic solution 508.

A method for fabricating the thin storage battery of this example is described below.

First, fabrication of the positive electrode and the negative electrode is described.

The composition and fabricating conditions of the negative electrode active material layer are described. Spherical natural graphite having a specific surface area of 6.3 $m^2/g$ and a particle size of 15 μm was used as an active material. As binders, CMC-Na (sodium carboxymethyl cellulose) and styrene-butadiene rubber (SBR) were used. The polymerization degree of CMC-Na that was used was 600 to 800, and the viscosity of a 1% aqueous solution of CMC-Na was in the range from 300 mPa·s to 500 mPa·s. The composition of a slurry for fabricating the electrode was graphite:CMC-Na: SBR=97:1.5:1.5 (wt %).

Next, formation of a paste for the negative electrode is described.

First, the active material was weighed and CMC-Na powder was added thereto, and a first mixture was obtained.

Next, water was added to the first mixture and kneading into a thick paste was performed with a mixer, and a second mixture was obtained. The weight of water added here was 38% of the total weight of the mixture. Here, kneading into a thick paste means mixing with a high viscosity.

Next, an SBR aqueous dispersion liquid was added to the second mixture, water was further added, and mixing was performed with a mixer, and a third mixture was obtained.

Pure water serving as a dispersion medium was then added to the third mixture until a predetermined viscosity was obtained, and mixing was performed with a mixer, so that a fourth mixture was obtained.

Next, degasification was performed in a reduced-pressure atmosphere. Specifically, the pressure in the mixer containing the fourth mixture was reduced and degasification was performed. The pressure was set so that a pressure difference from the atmospheric pressure was 0.096 MPa or less. Through the above steps, the paste was formed.

Next, the paste was applied to the negative electrode current collector with the use of a continuous coating device. An 18-μm-thick rolled copper foil was used as the negative electrode current collector. The coating speed was set to 0.75 m/min.

Next, the negative electrode current collector to which the paste was applied was dried using a drying furnace. Drying was performed in an air atmosphere at 50° C. for 120 seconds, and then, at 80° C. for 120 seconds. Furthermore, drying was performed in a reduced-pressure atmosphere at 100° C. for 10 hours. Through the above steps, the negative electrode active material layers were formed on both surfaces of the negative electrode current collector.

Next, the composition and fabricating conditions of the positive electrode are described. $LiFePO_4$ with a specific surface area of 9.2 $m^2/g$ was used as an active material, PVDF was used as a binder, and acetylene black (AB) was used as a conductive additive. The composition of a paste for fabricating the electrode was as follows: $LiFePO_4$:AB: PVDF=85:7:8 (wt %).

Next, a method for forming a paste for the positive electrode is described.

First, PVDF and AB were mixed with a mixer, and a first mixture was obtained.

Next, the active material was added to the first mixture and mixing was performed with a mixer, and a second mixture was obtained.

Next, NMP serving as a dispersion medium was added to the second mixture and mixing was performed with a mixer, and a third mixture was obtained.

Next, the third mixture was mixed with a mixer in a reduced-pressure atmosphere. Through the above steps, the paste was formed.

Then, the formed paste was applied to the positive electrode current collector. An aluminum current collector (20 μm) covered with an undercoat in advance was used as the positive electrode current collector. The application was performed with a continuous coating device at a coating speed of 1 m/min. After that, drying was performed using a drying furnace. The drying conditions were at 80° C. and for 4 minutes.

Then, the positive electrode active material layer was pressed by a roll press method so as to be consolidated. After that, drying was performed in a reduced-pressure atmosphere at 170° C. for 10 hours. Through the above steps, the positive electrode active material layer was formed on one or both of surfaces of the positive electrode current collector.

In the electrolytic solution, BMI-FSA shown in Example 1 was used as a solvent and LiFSA was used as an electrolyte. LiFSA was dissolved in BMI-FSA to prepare an electrolytic solution with a LiFSA concentration of 1.8 mol/kg.

In this example, an ionic liquid was used as a solvent of an electrolytic solution. The ionic liquid that was used in this example has an extremely high flash point of 300° C. or higher, and does not catch fire even in a high-temperature environment. Therefore, it can be favorably used for a secondary battery which is operated in a high-temperature environment.

Measurement results of a flash point of the electrolytic solution used in this example are described. For the measurement of the flash point, evaluation was performed using flash point tests employing a rapid equilibrium closed cup method. First, a sample was placed in a sample cup and heated for 1 minute. Then, a burner was brought close to the sample and kept in the position for 2.5 seconds or more, and whether it caught fire or not was checked. The evaluation of the flash point was performed at 50° C. to 300° C., and different samples were heated to different temperatures. In the tests, the electrolytic solution did not catch fire even when heated at 300° C.; thus, the flash point of the electrolytic solution was found to be 300° C. or higher.

As a separator, 50-μm-thick solvent-spun regenerated cellulosic fiber (TF40, produced by NIPPON KODOSHI CORPORATION) was used. In addition, as an exterior body, a film of aluminum whose both surfaces were covered with a resin layer was used.

[Fabrication of Storage Battery]

Next, a positive electrode, a negative electrode, and a separator were cut to fabricate a thin storage battery. The separator was folded in half after the cutting, and two sides were fixed to obtain the form of a bag.

Then, the positive electrode active material and the negative electrode active material on tab regions were removed to expose the current collectors.

Next, the exterior body was folded in half such that the positive electrode, the separator, and the negative electrode that were stacked were sandwiched. In that case, the positive electrode and the negative electrode were stacked such that the positive electrode active material layer and the negative electrode active material layer faced each other. By stacking one of the positive electrode and the negative electrode that is in a bag-like separator and the other alternately, the positive electrode and the negative electrode were stacked alternately such that the separator was sandwiched therebetween.

Then, sides except a side for introduction of an electrolytic solution of three sides of the exterior body were bonded to each other by heating. At this time, the sealing layers provided for the lead electrodes were positioned so as to overlap with the sealing portion of the exterior body.

After the exterior body was sealed at the two sides, the exterior body and the positive electrode, the separator, and the negative electrode that were wrapped by the exterior body were dried. The drying conditions were under a reduced pressure, at 80° C., and for 10 hours.

Then, in an argon gas atmosphere, the electrolytic solution was introduced from one side that was not sealed. After that, the one side of the exterior body was sealed by heating in a reduced-pressure atmosphere. Through the above steps, the thin secondary battery was fabricated.

Next, the storage battery was subjected to aging.

First, constant current charge was performed at a rate of 0.01 C at 25° C. The charging condition was an upper limit of 3.2 V. Here, the rate was calculated using the theoretical capacitance of $LiFePO_4$ which is a positive electrode active material (170 mAh/g) as a reference.

In an argon atmosphere, the exterior body was cut at one side to open, and degasification was performed. Then, the one side of the exterior body that was opened was sealed again in a reduced-pressure atmosphere.

Next, constant current charge was performed at a rate of 0.05 C at 25° C. The charging condition was an upper limit of 4.0 V. Then, constant current charge was performed at a rate of 0.2 C at 25° C. The discharging condition was a lower limit of 2.0 V. Moreover, charge and discharge were performed twice at a rate of 0.2 C at 25° C. The charging condition was an upper limit of 4.0 V and the discharging condition was a lower limit of 2.0 V.

The charge and discharge characteristics of the thin storage battery after the above aging treatment were measured.

In the following description, the rate was calculated using 135 mAh/g as a reference. Constant current charge was performed under the charging condition that the upper limit was 4 V. Furthermore, constant current discharge was performed under the discharging condition that the lower limit was 2 V. The initial charge and discharge were performed at a rate of approximately 0.1 C, and then, the second to 201th charge and discharge were performed at a rate of approximately 0.3 C and the above was performed repeatedly.

Figure 35A:
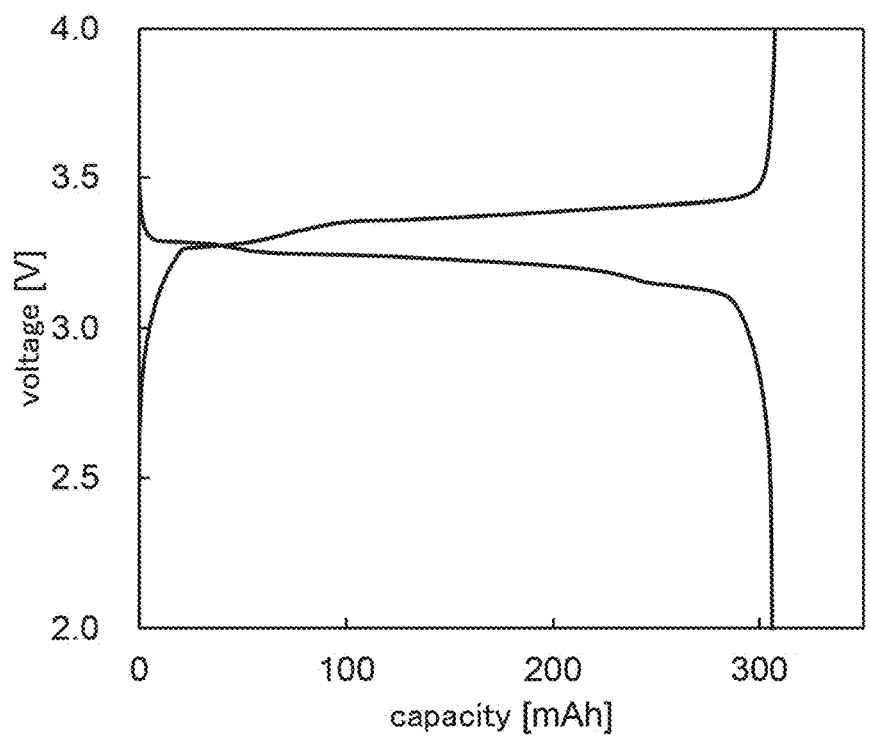
[FIG. 35] A diagram illustrating an evaluation result of a storage battery.

In addition, FIG. 35(A) shows results of the second charge and discharge characteristics. In the graph, the horizontal axis represents capacity and the vertical axis represents voltage. The charge capacity was 307.5 mAh, and the discharge capacity was 306.1 mAh.

Figure 35B:
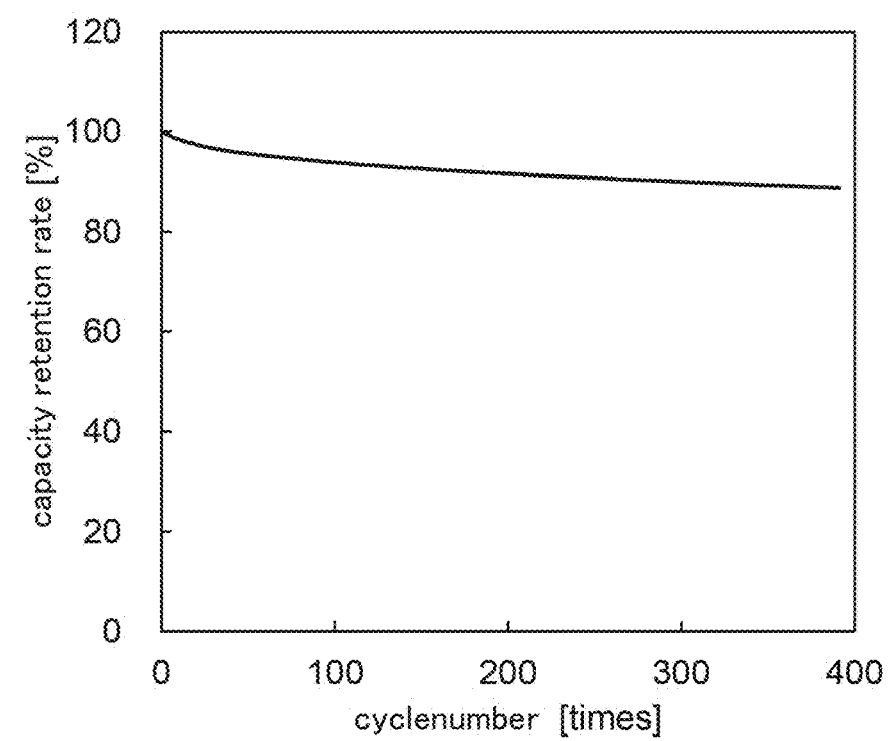

FIG. 35(B) shows the charge and discharge cycle characteristics of the thin storage battery. In the graph, the horizontal axis represents the number of cycles and the vertical axis represents capacity retention rate. As shown in FIG. 35(B), it was confirmed that approximately 90% of the initial discharge capacity is maintained even in the vicinity of the 400th cycle.

Figure 36A:
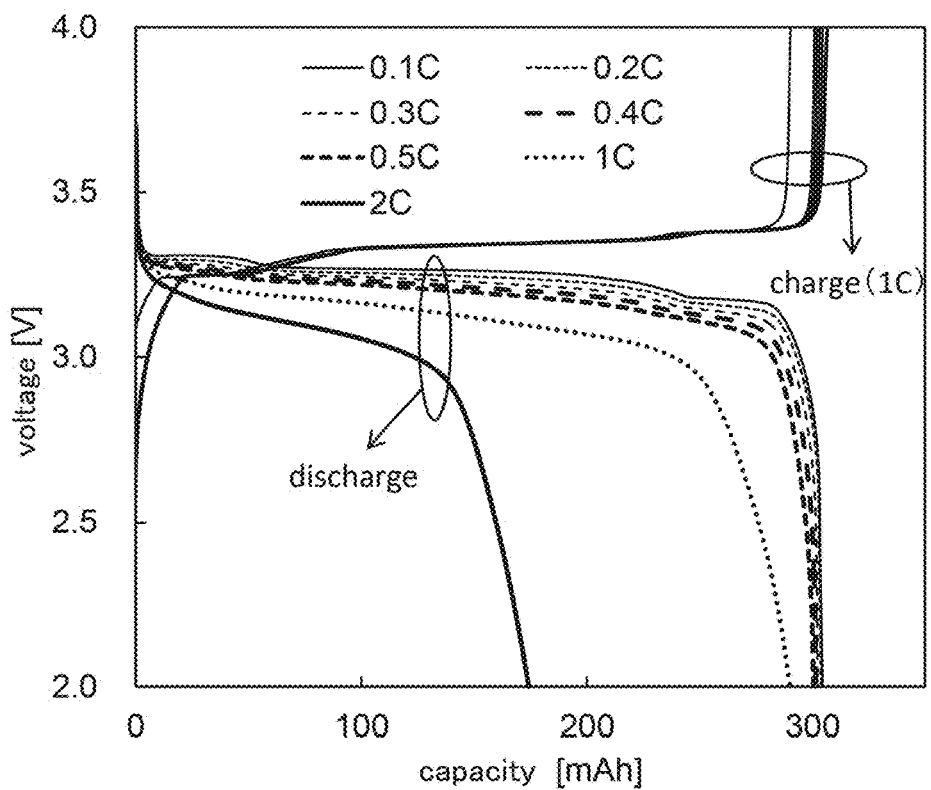
[FIG. 36] A diagram illustrating an evaluation result of a storage battery.
Figure 36B:
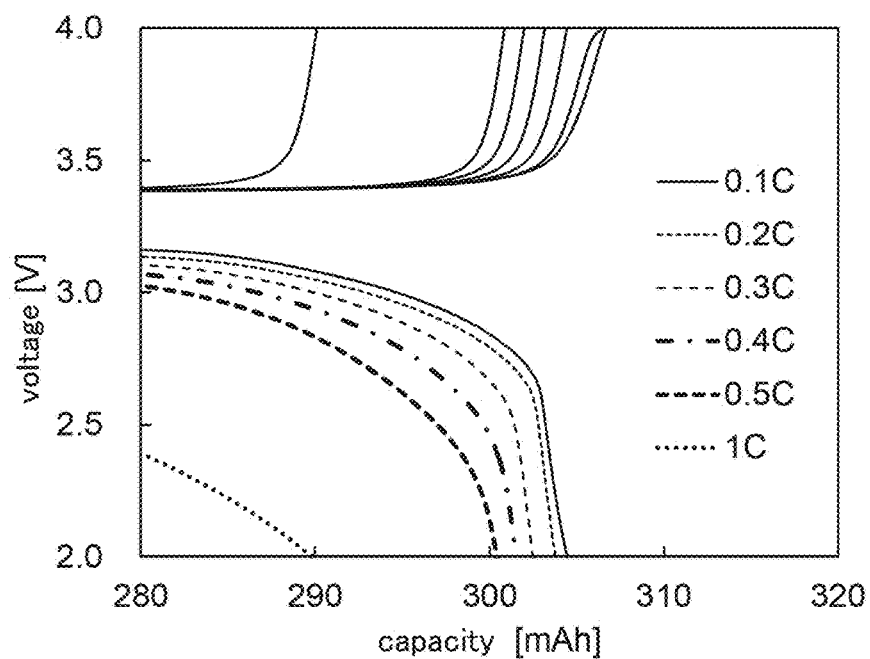

Furthermore, the rate characteristics of the thin storage battery were measured. The measurement was performed with a charge-discharge measuring instrument (produced by TOYO SYSTEM Co., LTD.) in a constant temperature bath at 25° C. Charge was performed at 0.1 C under the condition that the upper limit was 4 V, and discharge was performed at 0.1 C, 0.2 C, 0.3 C, 0.4 C, 0.5 C, 1 C, and 2 C. FIGS. 36(A) and 36(B) show the charge and discharge characteristics at the rates. Note that FIG. 36(B) is an enlarged view of part of FIG. 36(A). In the graph, the horizontal axis represents capacity and the vertical axis represents voltage. In addition, FIG. 37 and Table 2 show discharge capacities and capacity retention rates with respect to the rates.

TABLE 2

| Rate | Discharge capacity [mAh] | Capacity retention rate [%] |
|---|---|---|
| 0.1 | 304 | 100 |
| 0.2 | 304 | 99.8 |
| 0.3 | 302 | 99.4 |
| 0.4 | 301 | 99.0 |
| 0.5 | 300 | 98.7 |
| 1 | 290 | 95.2 |
| 2 | 174 | 57.2 |

Figure 37:
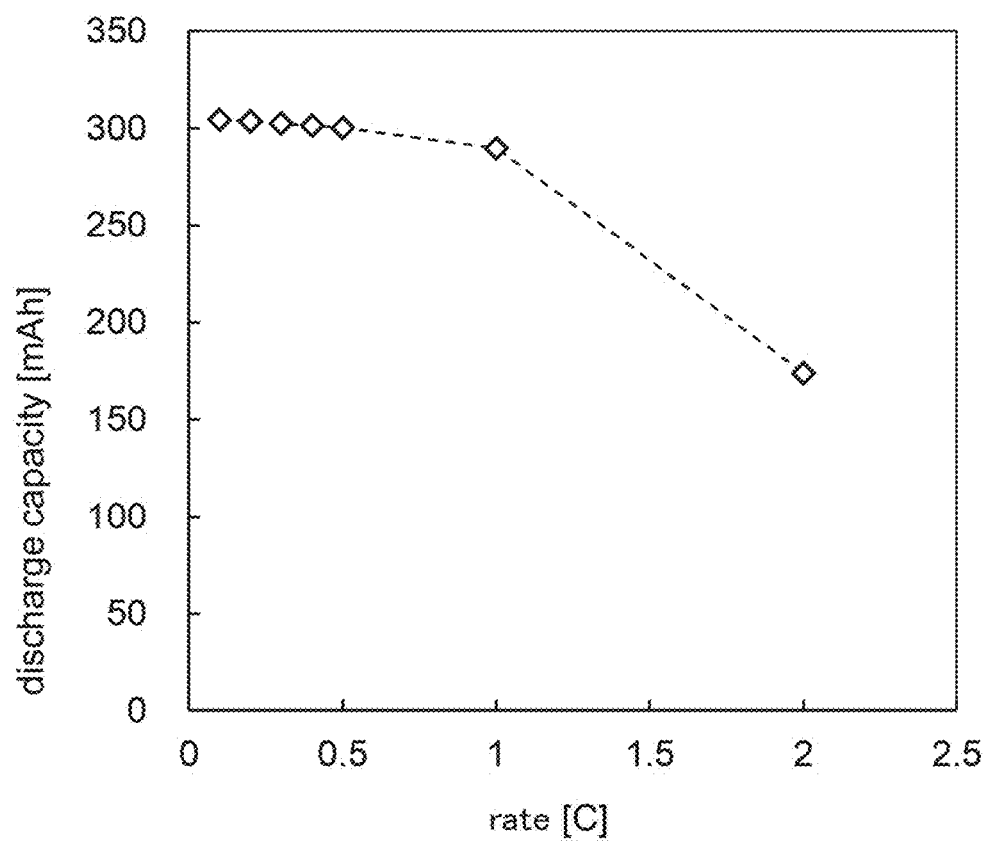
[FIG. 37] A diagram illustrating an evaluation result of a storage battery.

It was found from FIG. 36 and FIG. 37 that a decrease in discharge capacity is small when the rate is 0.1 C to 1 C.

REFERENCE NUMERALS 115 sealing layer
118 bonding portion
119 inlet
261 region
262 region
281 tab region
282 tab region
300 storage battery
301 positive electrode can
302 negative electrode can
303 gasket
304 positive electrode
305 positive electrode current collector
306 positive electrode active material layer
307 negative electrode
308 negative electrode current collector
309 negative electrode active material layer
310 separator
500 power storage device
501 positive electrode current collector
502 positive electrode active material layer
502a positive electrode active material layer
502b positive electrode active material layer
503 positive electrode
503a positive electrode
504 negative electrode current collector
505 negative electrode active material layer
505a negative electrode active material layer 505b negative electrode active material layer
506 negative electrode
506a negative electrode
507 separator
508 electrolytic solution
509 exterior body
510 positive electrode lead electrode
511 negative electrode lead electrode
512 bonding portion
513 curved portion
514 bonding portion
515 coating film
515a coating film
515b coating film
521 graphene
522 positive electrode active material
600 storage battery
601 positive electrode cap
602 battery can
603 positive electrode terminal
604 positive electrode
605 separator
606 negative electrode
607 negative electrode terminal
608 insulating plate
609 insulating plate
611 PTC element
612 safety valve mechanism
900 circuit board
910 label
911 terminal
912 circuit
913 storage battery
914 antenna
915 antenna
916 layer
917 layer
918 antenna
919 terminal
920 display device
921 sensor
922 terminal
951 terminal
952 terminal
981 film
982 film
990 storage battery
991 exterior body
992 exterior body
993 wound body
994 negative electrode
995 positive electrode
996 separator
997 lead electrode
998 lead electrode
1122 charger
1123 charger
7100 portable display device
7101 housing
7102 display portion
7103 operation button
7104 power storage device
7200 portable information terminal
7201 housing
7202 display portion
7203 band
7204 buckle
7205 operation button
7206 input-output terminal
7207 icon
7300 display device
7304 display portion
7400 mobile phone
7401 housing
7402 display portion
7403 operation button
7404 external connection port
7405 speaker
7406 microphone
7407 power storage device
7408 lead electrode
7409 current collector
8000 display device
8001 housing
8002 display portion
8003 speaker portion
8004 power storage device
8021 charging apparatus
8022 cable
8024 power storage device
8100 lighting device
8101 housing
8102 light source
8103 power storage device
8104 ceiling
8105 wall
8106 floor
8107 window
8200 indoor unit
8201 housing
8202 blast outlet
8203 power storage device
8204 outdoor unit
8300 electric refrigerator-freezer
8301 housing
8302 door for a refrigerator
8303 door for a freezer
8304 power storage device
8400 automobile
8401 headlight
8500 automobile
9600 tablet type terminal
9625 switch
9626 switch
9627 power switch
9628 operation switch
9629 fastener
9630 housing
9630a housing
9630b housing
9631 display portion
9631a display portion
9631b display portion
9632a region
9632b region
9633 solar cell
9634 charge and discharge control circuit
9635 power storage unit
9636 DC-DC converter
9637 converter
9638 operation key
9639 button
9640 movable portion

The invention claimed is:

1. A power storage device comprising:
a positive electrode;
a separator;
a negative electrode; and
an electrolytic solution,
wherein the separator is provided between the positive electrode and the negative electrode,
wherein the positive electrode includes a positive electrode active material layer and a positive electrode current collector,
wherein the negative electrode includes a negative electrode current collector, a first negative electrode active material layer facing the positive electrode active material layer with the separator sandwiched therebetween, a second negative electrode active material layer facing the first negative electrode active material layer with the negative electrode current collector sandwiched therebetween, a first coating film in contact with the first negative electrode active material layer, and a second coating film in contact with the second negative electrode active material layer,
wherein the first coating film is formed by reaction between the electrolytic solution and the first negative electrode active material layer, and
wherein the electrolytic solution includes an alkali metal salt and an ionic liquid.

2. The power storage device according to claim 1,
wherein the first coating film includes at least one of an element included in the first negative electrode active material layer and an element included in the electrolytic solution, and
wherein the second coating film includes at least one of an element included in the second negative electrode active material layer and an element included in the electrolytic solution.

3. The power storage device according to claim 1,
wherein the ionic liquid includes a cation containing a heteroaromatic ring.

4. The power storage device according to claim 1,
wherein the ionic liquid includes an imidazolium cation.

5. The power storage device according to claim 1,
wherein the ionic liquid includes a butylmethylimidazolium cation.

6. The power storage device according to claim 1,
wherein the power storage device operates within at least one of a temperature range of −25° C. to 10° C. and a temperature range of 40° C. to 100° C.

7. An electronic device comprising the power storage device according to claim 1.

8. A power storage device comprising:
a positive electrode;
a separator;
a negative electrode; and
an electrolytic solution,
wherein the separator is provided between the positive electrode and the negative electrode,
wherein the positive electrode includes a positive electrode active material layer and a positive electrode current collector,
wherein the negative electrode includes a negative electrode current collector, a first negative electrode active material layer facing the positive electrode active material layer with the separator sandwiched therebetween, a second negative electrode active material layer facing the first negative electrode active material layer with the negative electrode current collector sandwiched therebetween, a first coating film in contact with the first negative electrode active material layer, and a second coating film in contact with the second negative electrode active material layer,
wherein the first coating film is formed by reaction between the electrolytic solution and the first negative electrode active material layer,
wherein the electrolytic solution includes an alkali metal salt and an ionic liquid, and
wherein the positive electrode overlaps with the negative electrode, and an end portion of the negative electrode is aligned with or located inward from an end portion of the positive electrode.

9. The power storage device according to claim 8,
wherein the first coating film includes at least one of an element included in the first negative electrode active material layer and an element included in the electrolytic solution, and
wherein the second coating film includes at least one of an element included in the second negative electrode active material layer and an element included in the electrolytic solution.

10. The power storage device according to claim 8,
wherein the ionic liquid includes a cation containing a heteroaromatic ring.

11. The power storage device according to claim 8,
wherein the ionic liquid includes an imidazolium cation.

12. The power storage device according to claim 8,
wherein the ionic liquid includes a butylmethylimidazolium cation.

13. The power storage device according to claim 8,
wherein the power storage device operates within at least one of a temperature range of −25° C. to 10° C. and a temperature range of 40° C. to 100° C.

14. An electronic device comprising the power storage device according to claim 8.

15. A power storage device comprising:
a separator;
a first electrode;
a second electrode; and
an electrolytic solution,
wherein the separator is provided between the first electrode and the second electrode,
wherein the first electrode includes an active material layer and a current collector,
wherein the first electrode includes a pair of coating films between which the current collector is sandwiched,
wherein the active material layer includes a region in contact with the current collector,
wherein the active material layer includes a region in contact with at least one of the pair of coating films,
wherein each of the pair of coating films is formed by reaction between the electrolytic solution and the active material layer, and
wherein the electrolytic solution includes an alkali metal salt and an ionic liquid.

16. The power storage device according to claim 15,
wherein the pair of coating films includes at least one of an element included in the active material layer and an element included in the electrolytic solution.

17. The power storage device according to claim 15,
wherein the ionic liquid includes a cation containing a heteroaromatic ring.

18. The power storage device according to claim 15,
wherein the ionic liquid includes an imidazolium cation.

19. The power storage device according to claim 15, wherein the ionic liquid includes a butylmethylimidazolium cation.

20. The power storage device according to claim 15, wherein the power storage device operates within at least one of a temperature range of −25° C. to 10° C. and a temperature range of 40° C. to 100° C.

21. An electronic device comprising the power storage device according to claim 15.

22. A power storage device comprising:
a separator;
a first electrode;
a second electrode; and
an electrolytic solution,
wherein the separator is provided between the first electrode and the second electrode,
wherein the first electrode includes an active material layer and a current collector,
wherein the first electrode includes a pair of coating films between which the current collector is sandwiched,
wherein the active material layer includes a region in contact with the current collector,
wherein the active material layer includes a region in contact with at least one of the pair of coating films,
wherein each of the pair of coating films is formed by reaction between the electrolytic solution and the active material layer,
wherein the electrolytic solution includes an alkali metal salt and an ionic liquid, and
wherein the second electrode overlaps with the first electrode, and an end portion of the first electrode is aligned with or located inward from an end portion of the second electrode.

23. The power storage device according to claim 22, wherein the pair of coating films includes at least one of an element included in the active material layer and an element included in the electrolytic solution.

24. The power storage device according to claim 22, wherein the ionic liquid includes a cation containing a heteroaromatic ring.

25. The power storage device according to claim 22, wherein the ionic liquid includes an imidazolium cation.

26. The power storage device according to claim 22, wherein the ionic liquid includes a butylmethylimidazolium cation.

27. The power storage device according to claim 22, wherein the power storage device operates within at least one of a temperature range of −25° C. to 10° C. and a temperature range of 40° C. to 100° C.

28. An electronic device comprising the power storage device according to claim 22.

* * * * *